United States Patent
Koo et al.

(10) Patent No.: US 11,546,632 B2
(45) Date of Patent: Jan. 3, 2023

(54) METHOD AND DEVICE FOR PROCESSING VIDEO SIGNAL BY USING INTRA-PREDICTION

(71) Applicant: LG ELECTRONICS INC., Seoul (KR)

(72) Inventors: Moonmo Koo, Seoul (KR); Jaehyun Lim, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/415,707

(22) PCT Filed: Dec. 19, 2019

(86) PCT No.: PCT/KR2019/018117
§ 371 (c)(1),
(2) Date: Jun. 17, 2021

(87) PCT Pub. No.: WO2020/130680
PCT Pub. Date: Jun. 25, 2020

(65) Prior Publication Data
US 2022/0078483 A1     Mar. 10, 2022

Related U.S. Application Data

(60) Provisional application No. 62/782,295, filed on Dec. 19, 2018.

(51) Int. Cl.
*H04N 19/593*     (2014.01)
*H04N 19/11*     (2014.01)
(Continued)

(52) U.S. Cl.
CPC ........... *H04N 19/593* (2014.11); *H04N 19/11* (2014.11); *H04N 19/136* (2014.11);
(Continued)

(58) Field of Classification Search
None
See application file for complete search history.

(56) References Cited

U.S. PATENT DOCUMENTS 11,297,315 B2\*   4/2022   Choi .................... H04N 19/132
2015/0365692 A1   12/2015   Liu et al.
(Continued)

FOREIGN PATENT DOCUMENTS

KR    10-2018-0085526 A    7/2018
WO    2018/030599 A1    2/2018
WO    2018/174402 A1    9/2018

*Primary Examiner* — Chikaodili E Anyikire
(74) *Attorney, Agent, or Firm* — Dentons US LLP

(57) ABSTRACT

Embodiments in the present specification provide a video signal processing method and device. A method of processing a video signal according to an embodiment in the present specification comprises the steps of: acquiring an intra-prediction mode for a current block from the video signal; determining a modified intra-prediction mode from the intra-prediction mode for the current block on the basis of the width and height of and the intra-prediction mode for the current block; and applying a transform determined on the basis of the modified intra-prediction mode. The accuracy of prediction can be further improved by deriving a modified intra-prediction mode according to a wide-angle intra-prediction mode according to the shape of and an intra-prediction mode for a current block.

11 Claims, 47 Drawing Sheets

| Set | Index | Hor. | Ver. | Intra Pred mode |
|---|---|---|---|---|
| Set 0 | 0 | DST-7 | DST-7 | 0 |
|  | 1 | DCT-5 | DST-7 |  |
|  | 2 | DST-7 | DCT-5 |  |
|  | 3 | DCT-5 | DCT-5 |  |
| Set 1 | 0 | DST-7 | DST-7 | 1, 3, 5, 7, 9, 11, 13, 23, 25, 27, 29, 31, 33, 35, 37, 39, 41, 43, 45, 55, 57, 59, 61, 63, 65 |
|  | 1 | DST-1 | DST-7 |  |
|  | 2 | DST-7 | DST-1 |  |
|  | 3 | DST-1 | DST-1 |  |
| Set 2 | 0 | DST-7 | DST-7 | 2, 4, 6, 8, 10, 12, 24, 26, 28, 30, 32, 34, 36, 38, 40, 42, 44, 56, 58, 60, 64, 66 |
|  | 1 | DCT-8 | DST-7 |  |
|  | 2 | DST-7 | DCT-8 |  |
|  | 3 | DCT-8 | DCT-8 |  |
| Set 3 | 0 | DST-7 | DST-7 | 14, 15, 16, 17, 18, 19, 20, 21, 22 (Neighboring angles to horizontal directions) |
|  | 1 | DCT-5 | DST-7 |  |
|  | 2 | DST-7 | DCT-8 |  |
|  | 3 | DCT-5 | DCT-8 |  |
| Set 4 | 0 | DST-7 | DST-7 | 46, 47, 48, 49, 50, 51, 52, 53, 54 (Neighboring angles to vertical directions) |
|  | 1 | DCT-8 | DST-7 |  |
|  | 2 | DST-7 | DCT-5 |  |
|  | 3 | DCT-8 | DCT-5 |  |

(51) Int. Cl.
*H04N 19/136* (2014.01)
*H04N 19/159* (2014.01)
*H04N 19/176* (2014.01)
*H04N 19/196* (2014.01)
*H04N 19/61* (2014.01)

(52) U.S. Cl.
CPC ......... *H04N 19/159* (2014.11); *H04N 19/176* (2014.11); *H04N 19/197* (2014.11); *H04N 19/61* (2014.11)

(56) References Cited

U.S. PATENT DOCUMENTS

2018/0288439 A1 10/2018 Hsu et al.
2019/0387241 A1* 12/2019 Kim ................... H04N 19/46
2021/0392371 A1* 12/2021 Lee .................... H04N 19/105

\* cited by examiner

[FIG. 1]
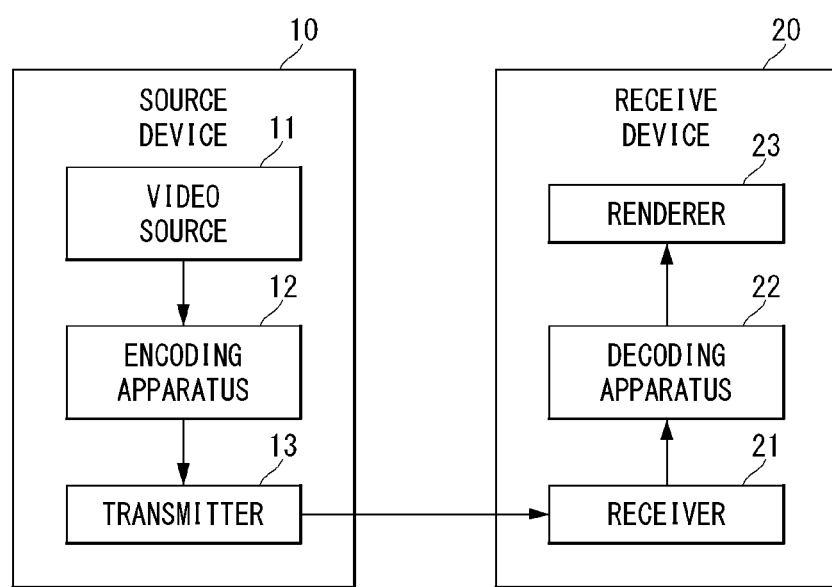

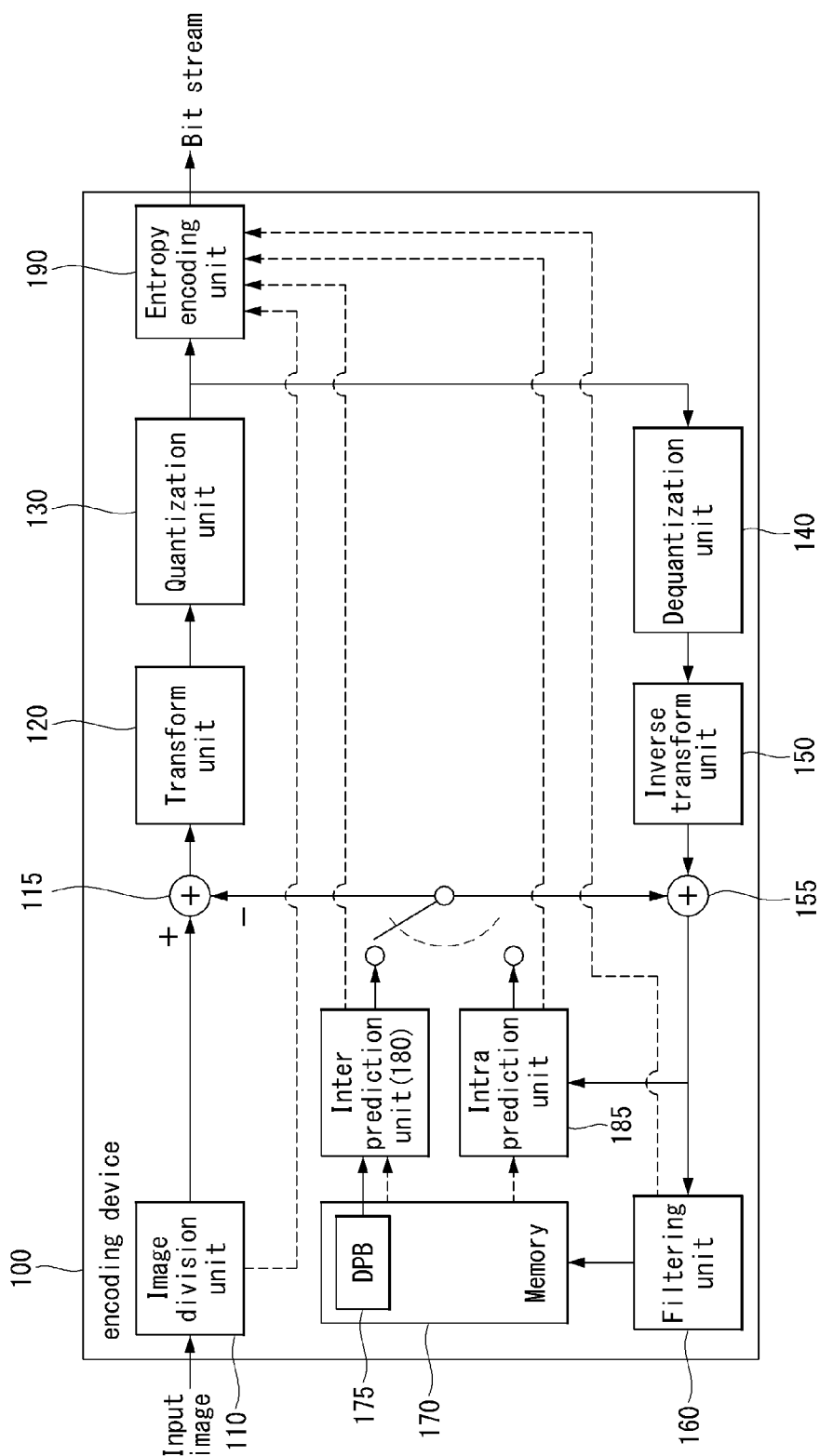
[FIG. 2]

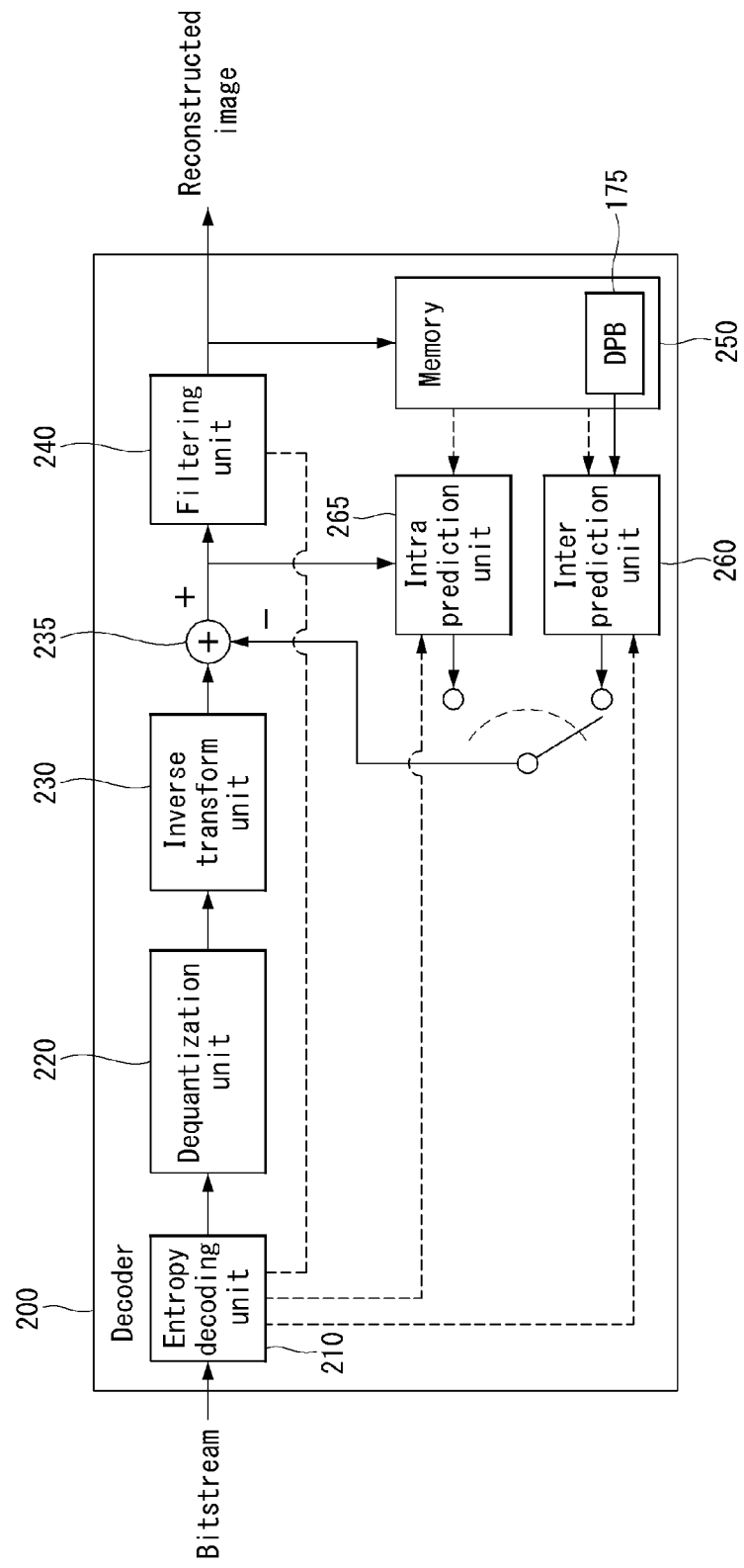
[FIG. 3]

[FIG. 4]
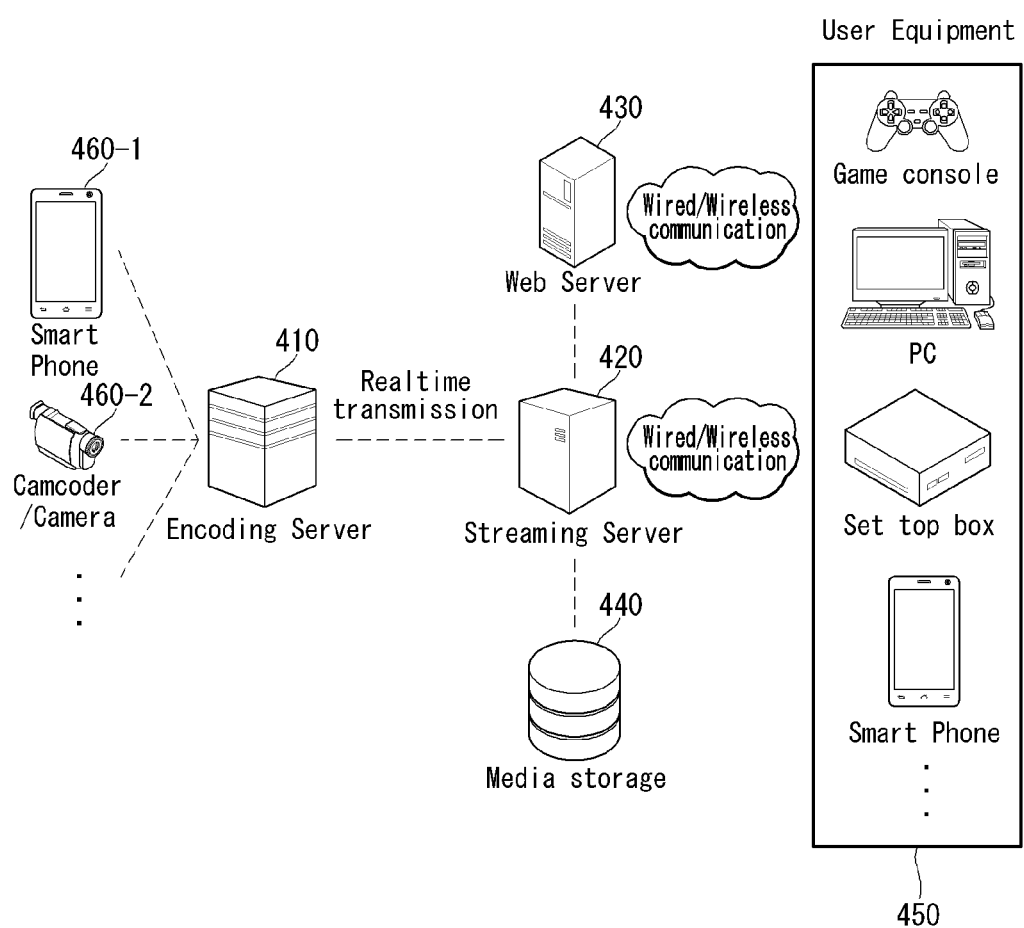

[FIG. 5]
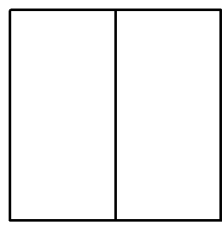
SPLIT_BT_VER
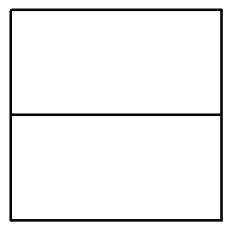
SPLIT_BT_HOR
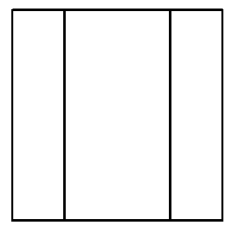
SPLIT_TT_VER
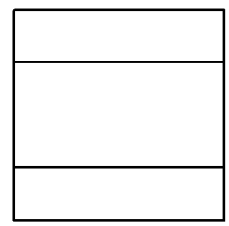
SPLIT_TT_HOR

[FIG. 6]
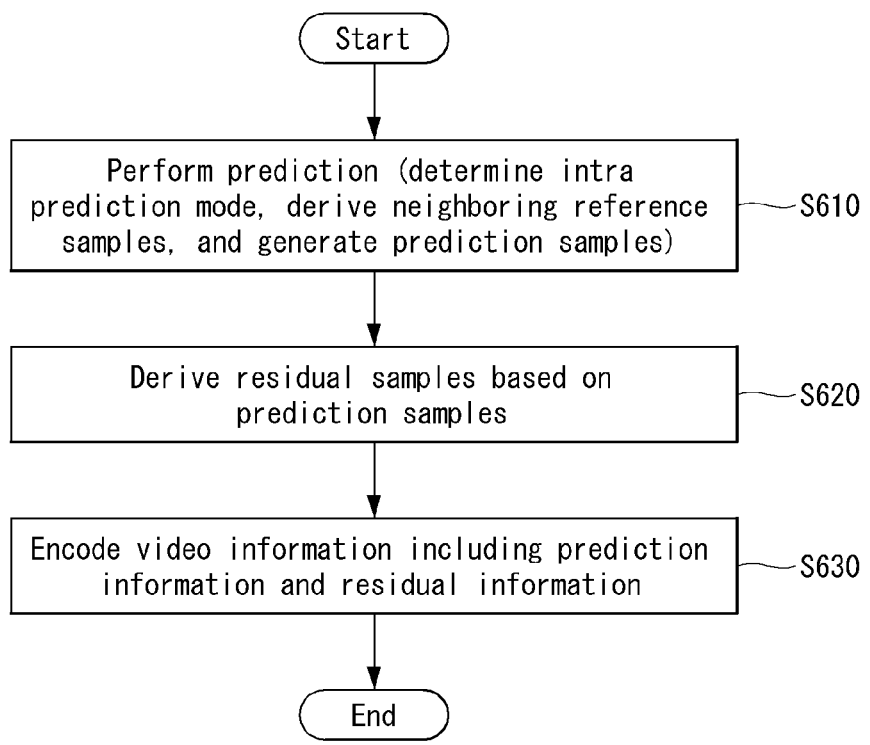

[FIG. 7]
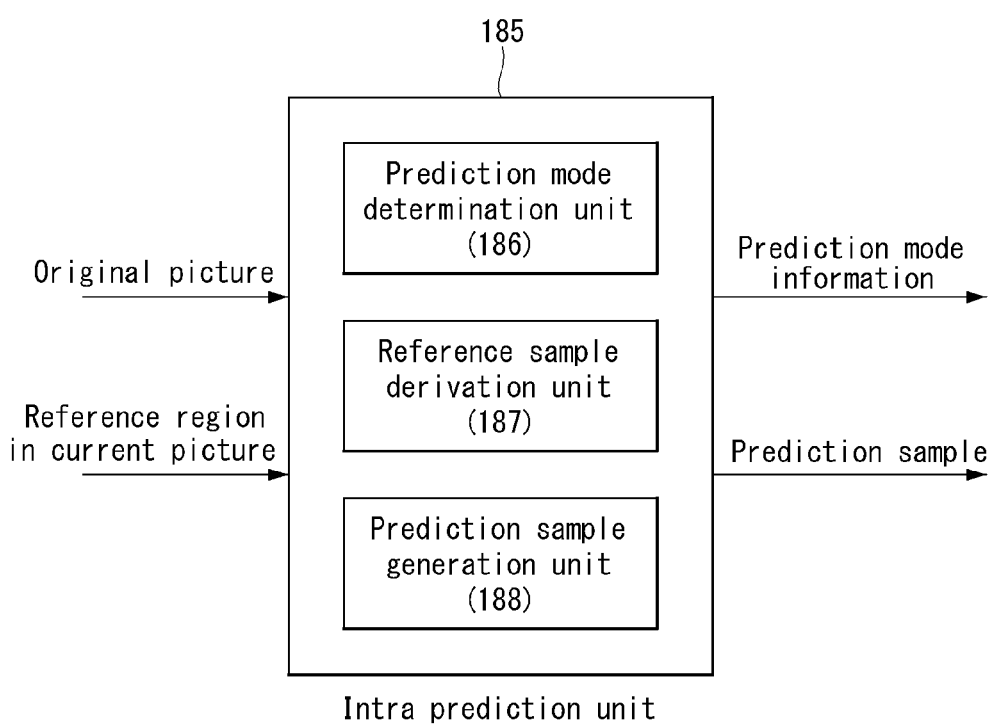

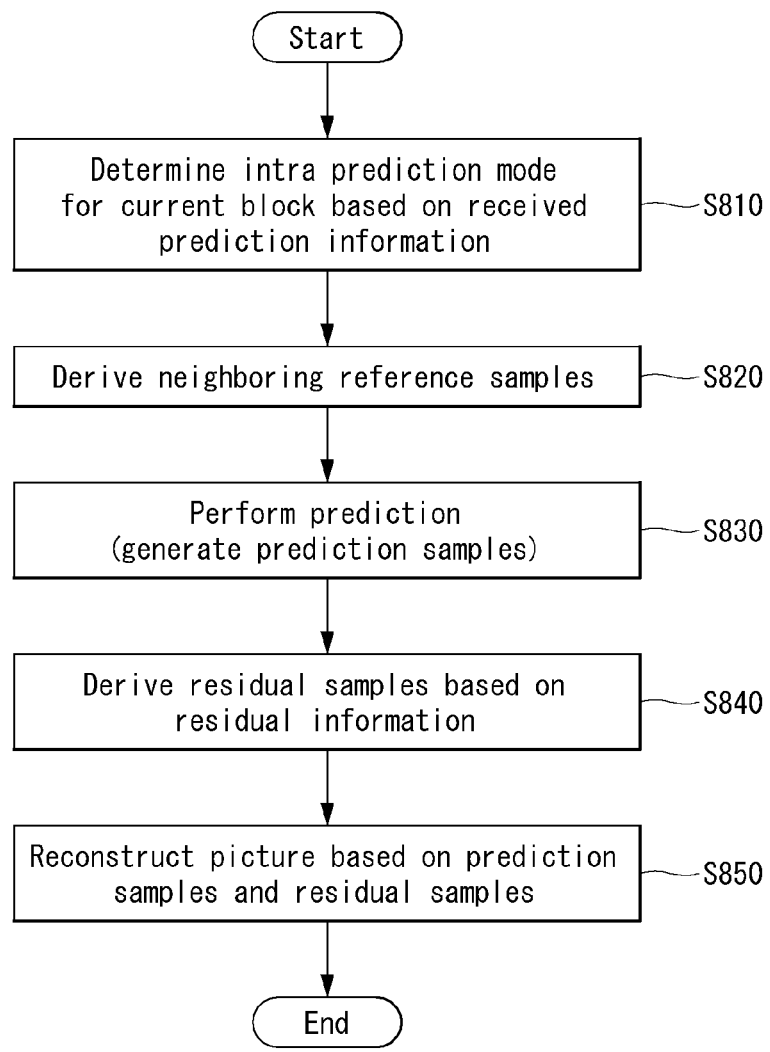
[FIG. 8]

[FIG. 9]
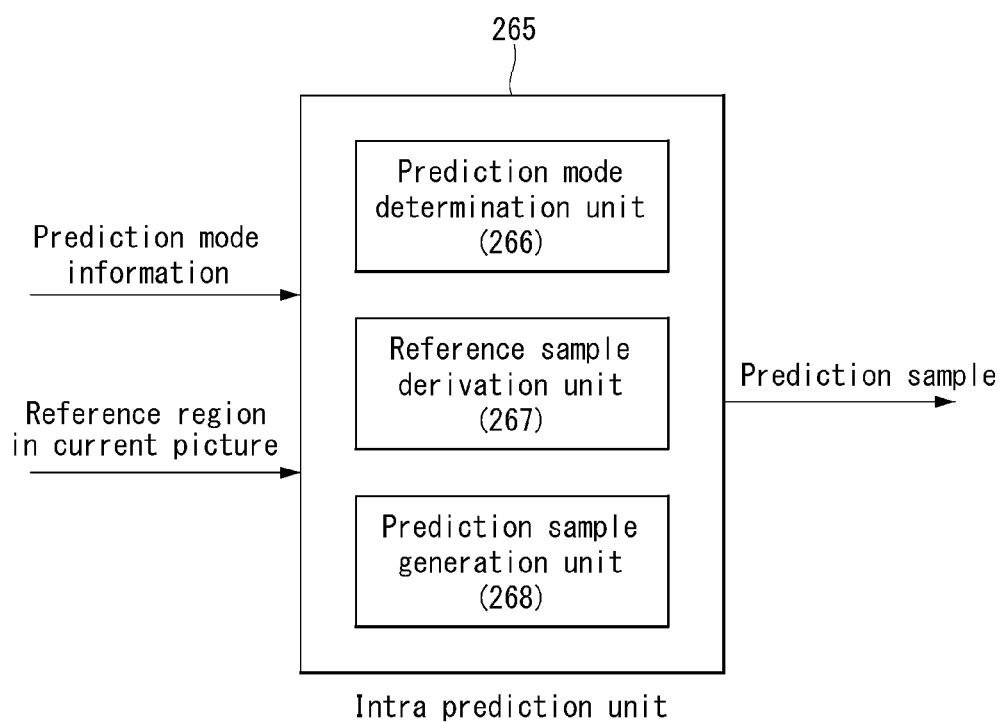

[FIG. 10]
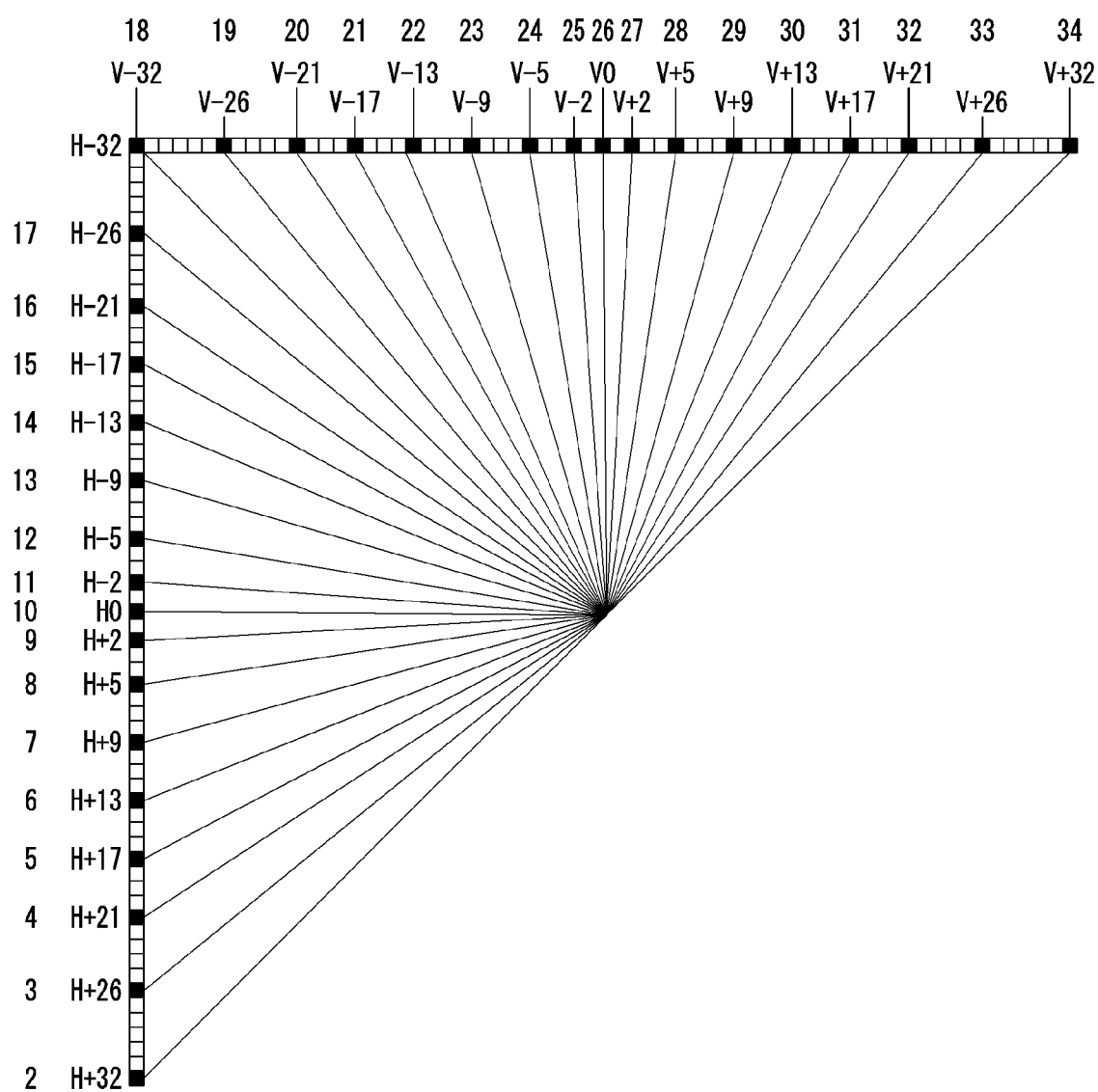

[FIG. 11]
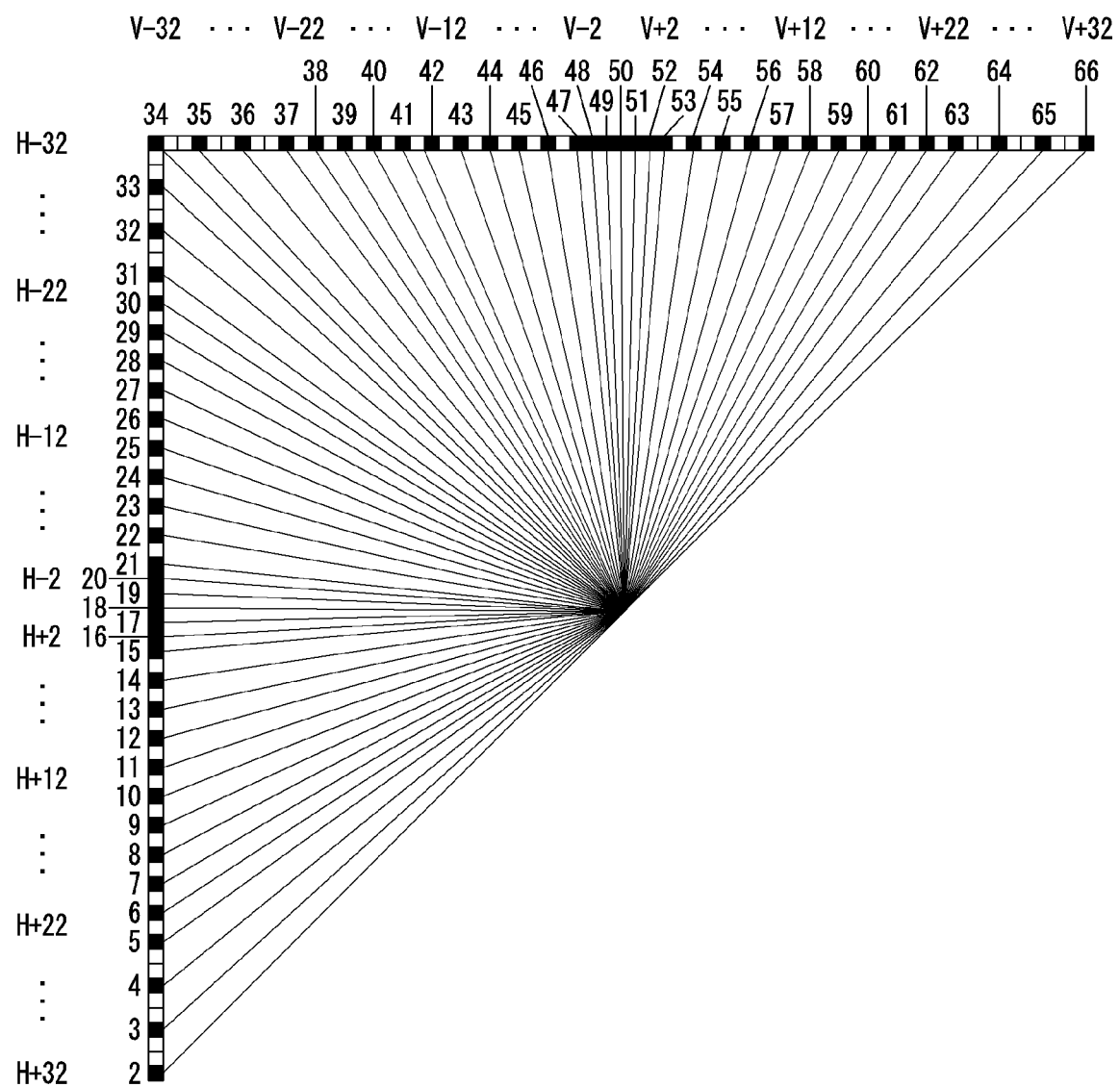

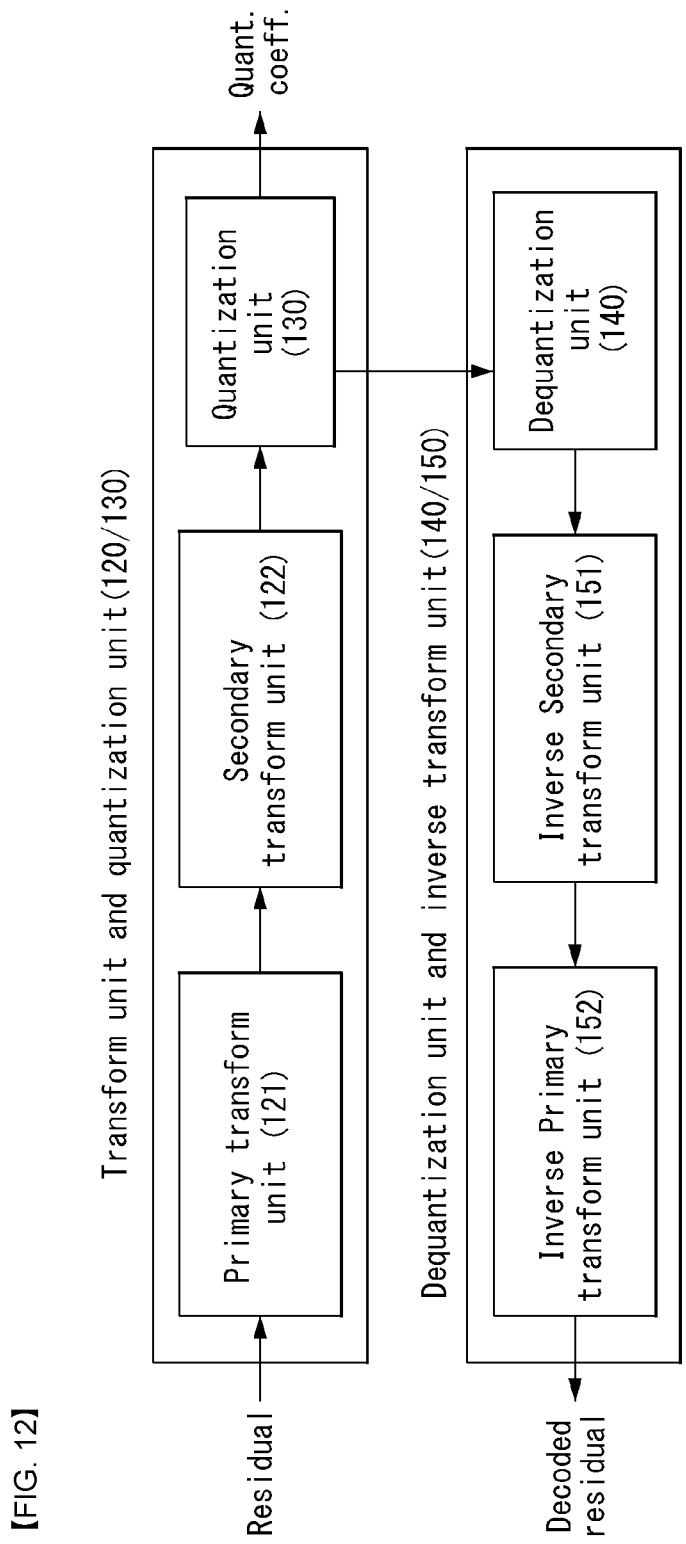
[FIG. 12]

[FIG. 13]
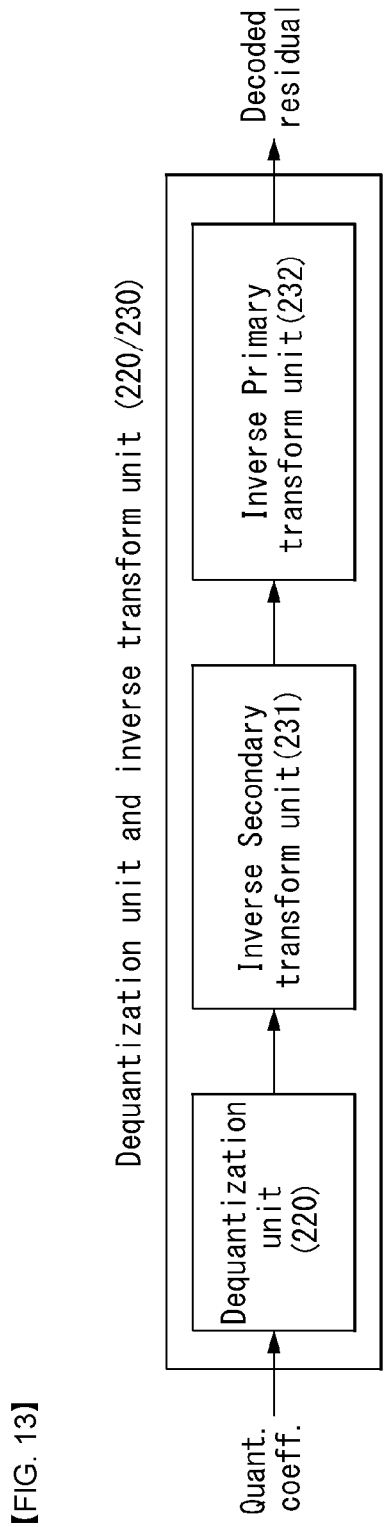

[FIG. 14A]

| Set | Index | Hor. | Ver. | Intra Pred mode |
|---|---|---|---|---|
| Set 0 | 0 | DST-7 | DST-7 | 0 |
|  | 1 | DCT-5 | DST-7 |  |
|  | 2 | DST-7 | DCT-5 |  |
|  | 3 | DCT-5 | DCT-5 |  |
| Set 1 | 0 | DST-7 | DST-7 | 1, 3, 5, 7, 9, 11, 13, 23, 25, 27, 29, 31, 33, 35, 37, 39, 41, 43, 45, 55, 57, 59, 61, 63, 65 |
|  | 1 | DST-1 | DST-7 |  |
|  | 2 | DST-7 | DST-1 |  |
|  | 3 | DST-1 | DST-1 |  |
| Set 2 | 0 | DST-7 | DST-7 | 2, 4, 6, 8, 10, 12, 24, 26, 28, 30, 32, 34, 36, 38, 40, 42, 44, 56, 58, 60, 64, 66 |
|  | 1 | DCT-8 | DST-7 |  |
|  | 2 | DST-7 | DCT-8 |  |
|  | 3 | DCT-8 | DCT-8 |  |
| Set 3 | 0 | DST-7 | DST-7 | 14, 15, 16, 17, 18, 19, 20, 21, 22 (Neighboring angles to horizontal directions) |
|  | 1 | DCT-5 | DST-7 |  |
|  | 2 | DST-7 | DCT-8 |  |
|  | 3 | DCT-5 | DCT-8 |  |
| Set 4 | 0 | DST-7 | DST-7 | 46, 47, 48, 49, 50, 51, 52, 53, 54 (Neighboring angles to vertical directions) |
|  | 1 | DCT-8 | DST-7 |  |
|  | 2 | DST-7 | DCT-5 |  |
|  | 3 | DCT-8 | DCT-5 |  |

[FIG. 14B]

|  | Idx. | Hor. | Ver. |
|---|---|---|---|
| MTS_CU_Flag = 0 | N/A | DCT-2 | DCT-2 |
| MTS_CU_Flag = 1 | 0 | DCT-8 | DCT-8 |
|  | 1 | DST-7 | DCT-8 |
|  | 2 | DCT-8 | DST-7 |
|  | 3 | DST-7 | DST-7 |

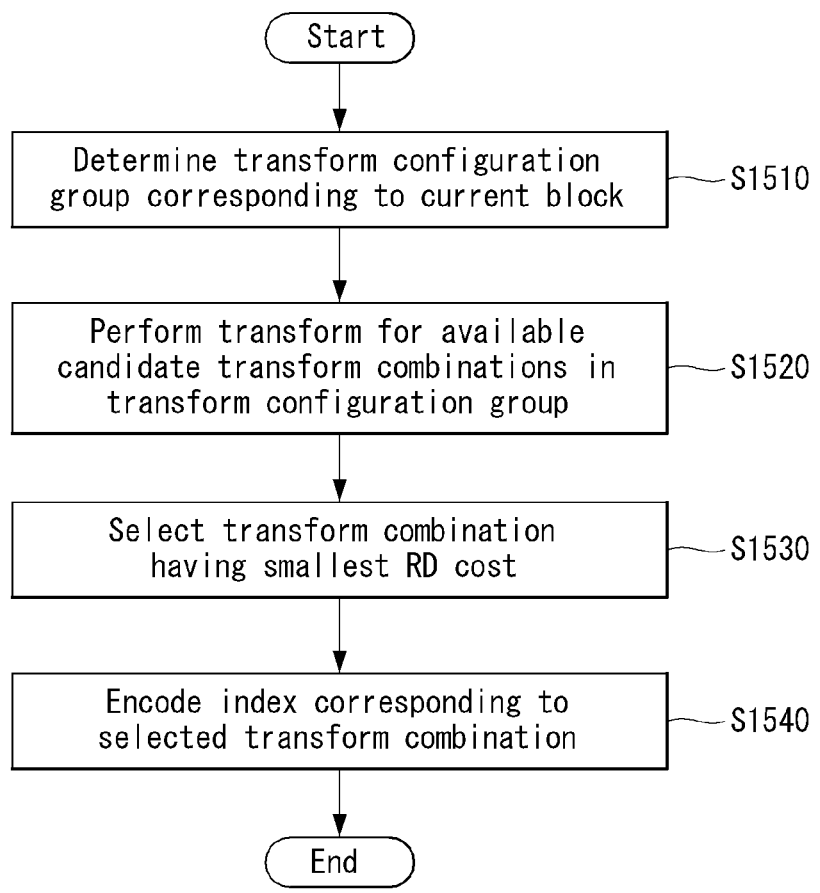
[FIG. 15]

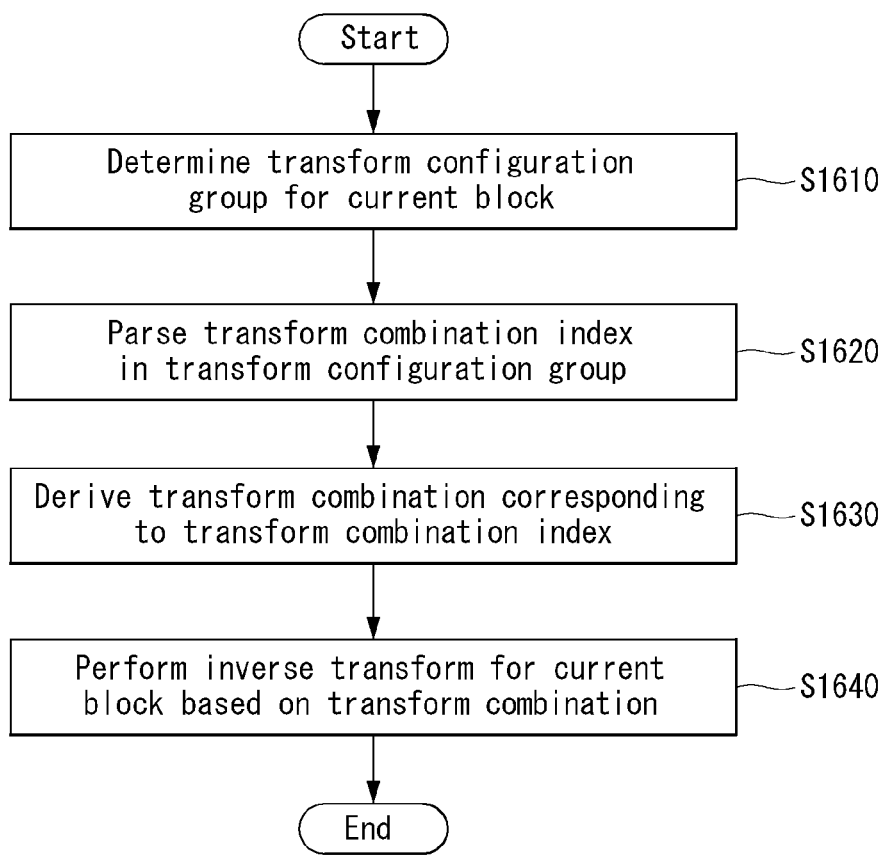
[FIG. 16]

[FIG. 17]
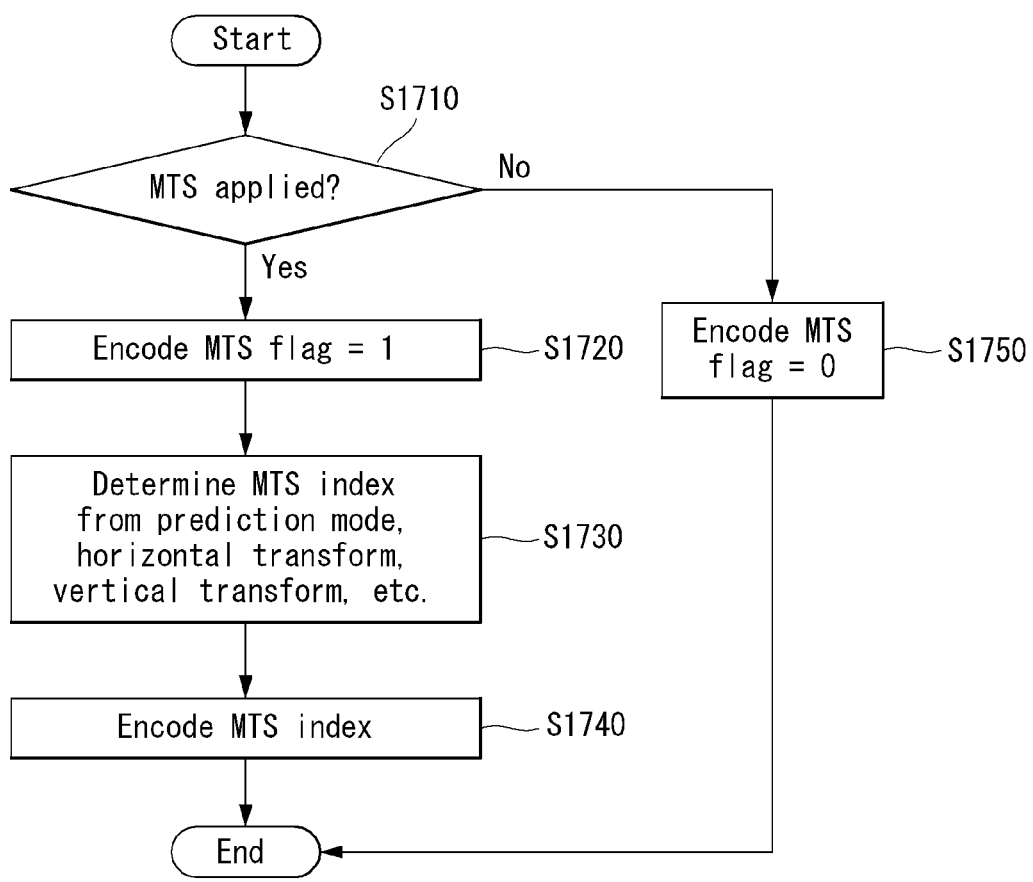

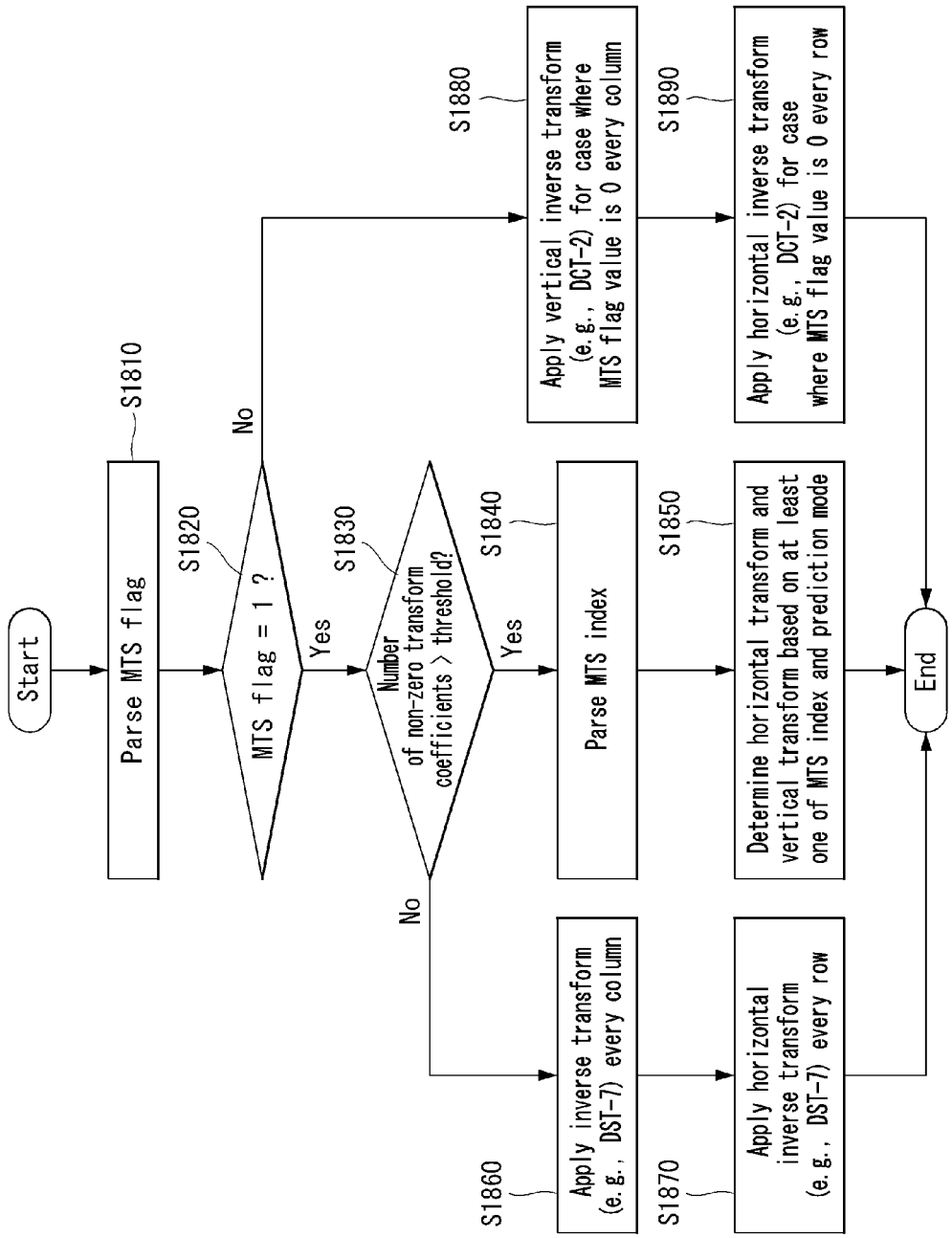
[FIG. 18]

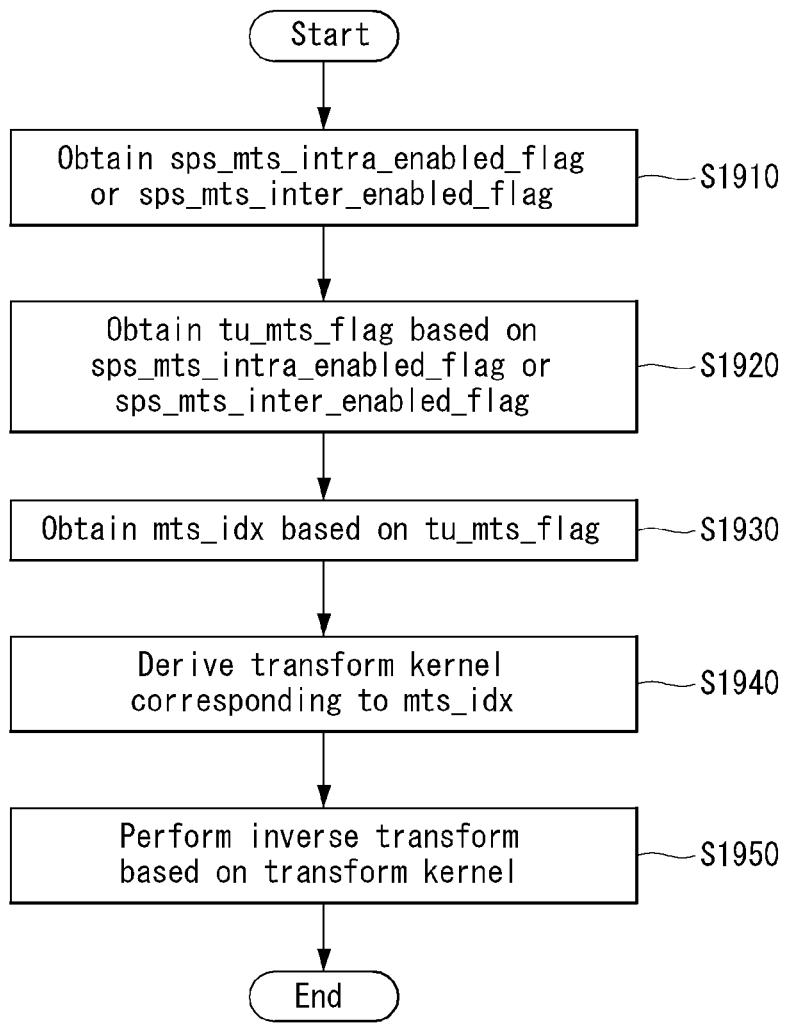
[FIG. 19]

[FIG. 20]

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

[FIG. 21]
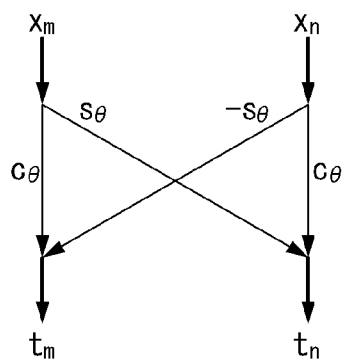

[FIG. 22]
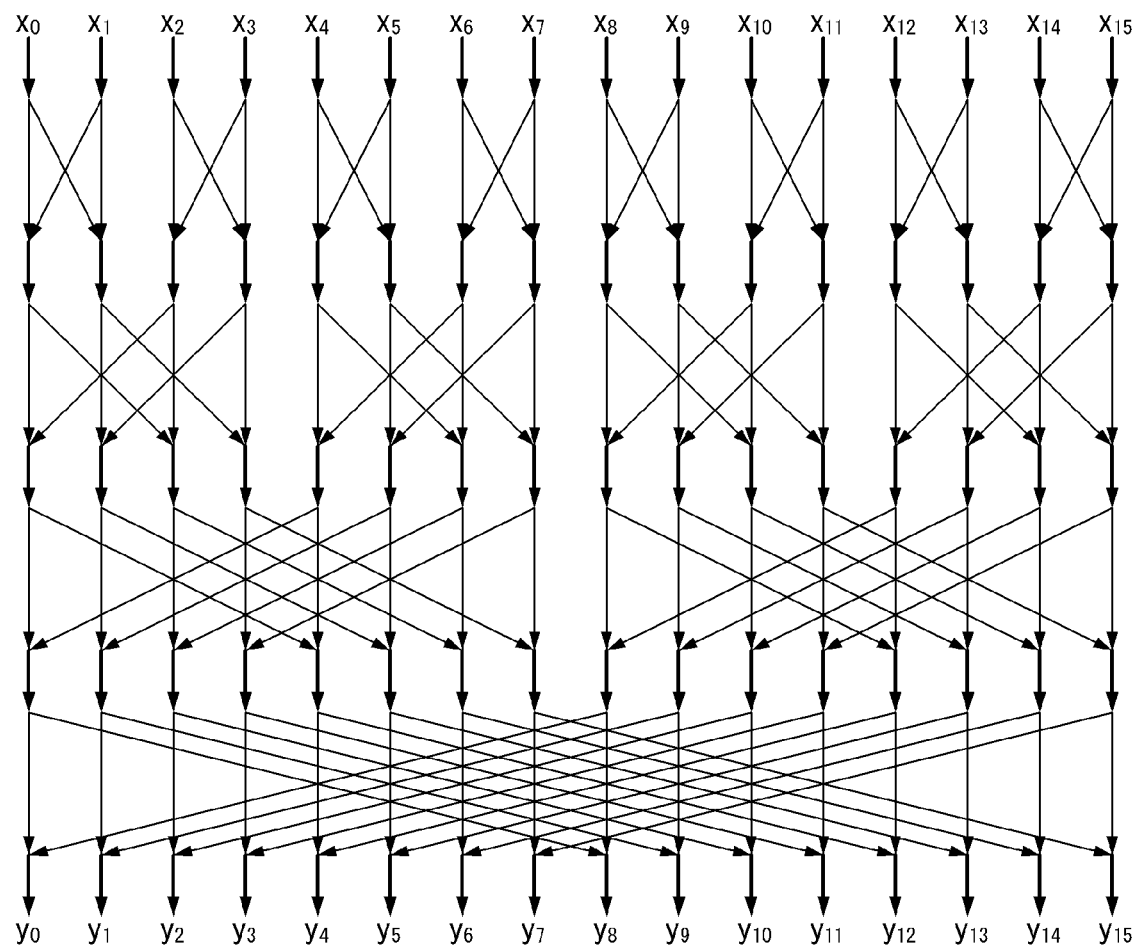

[FIG. 23]
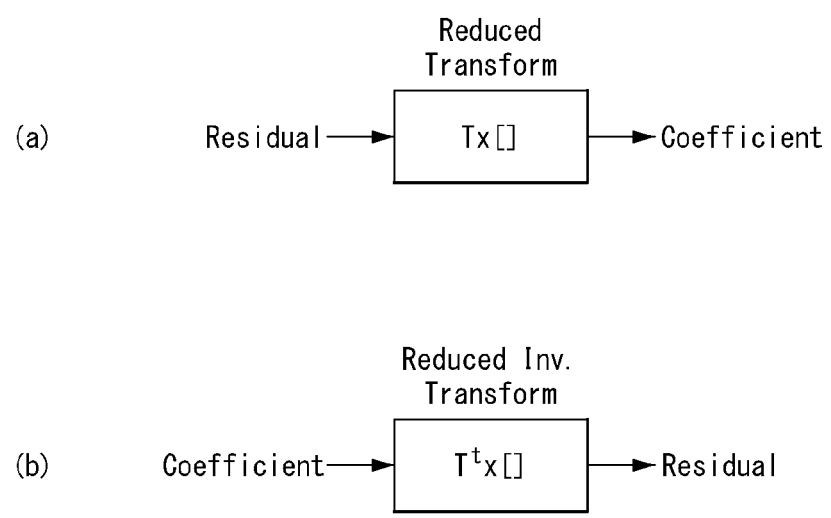

[FIG. 24]
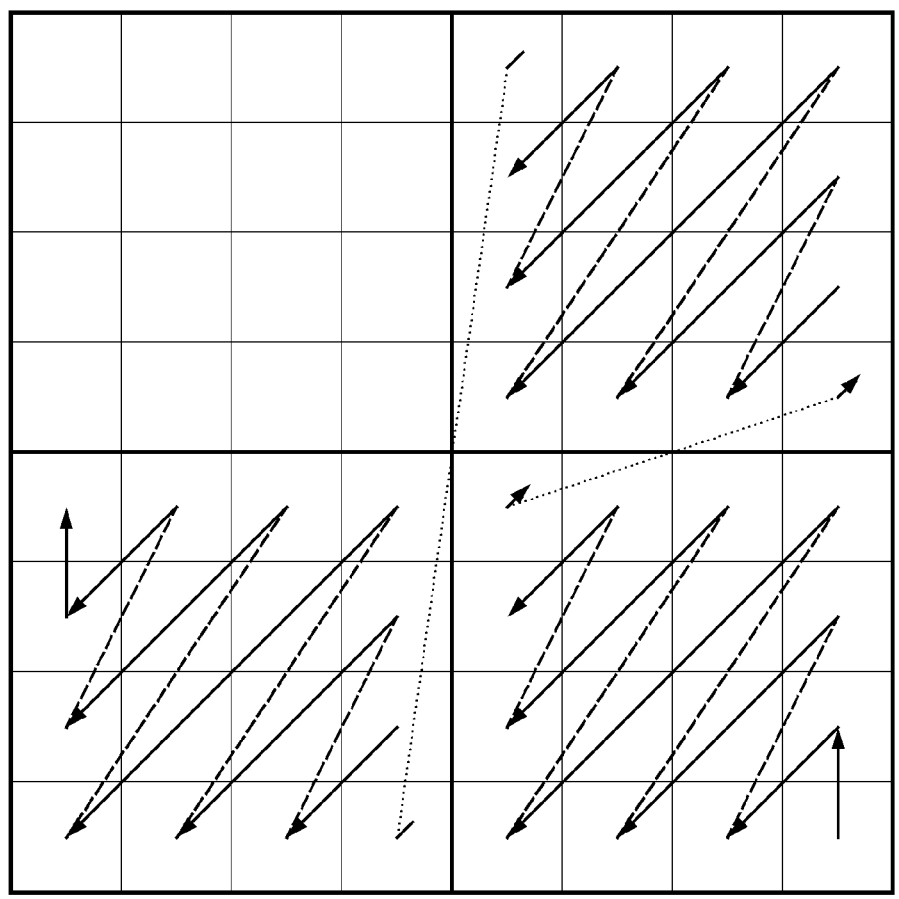

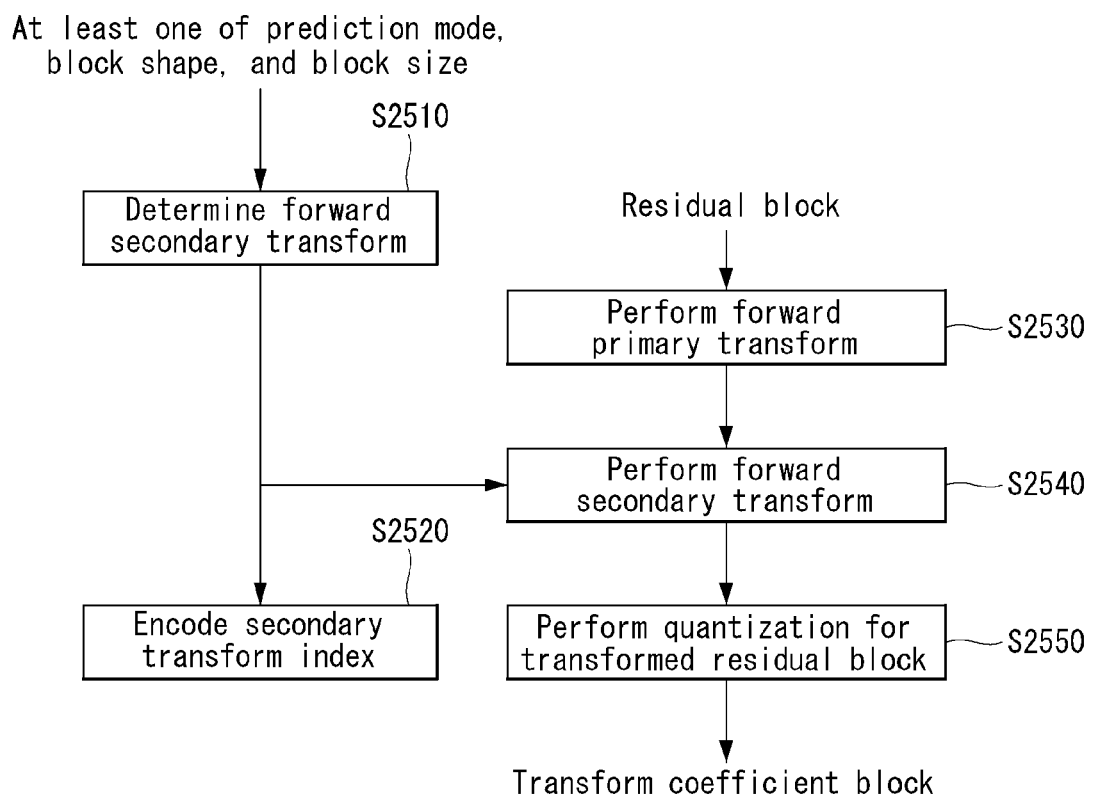
[FIG. 25]

[FIG. 26]
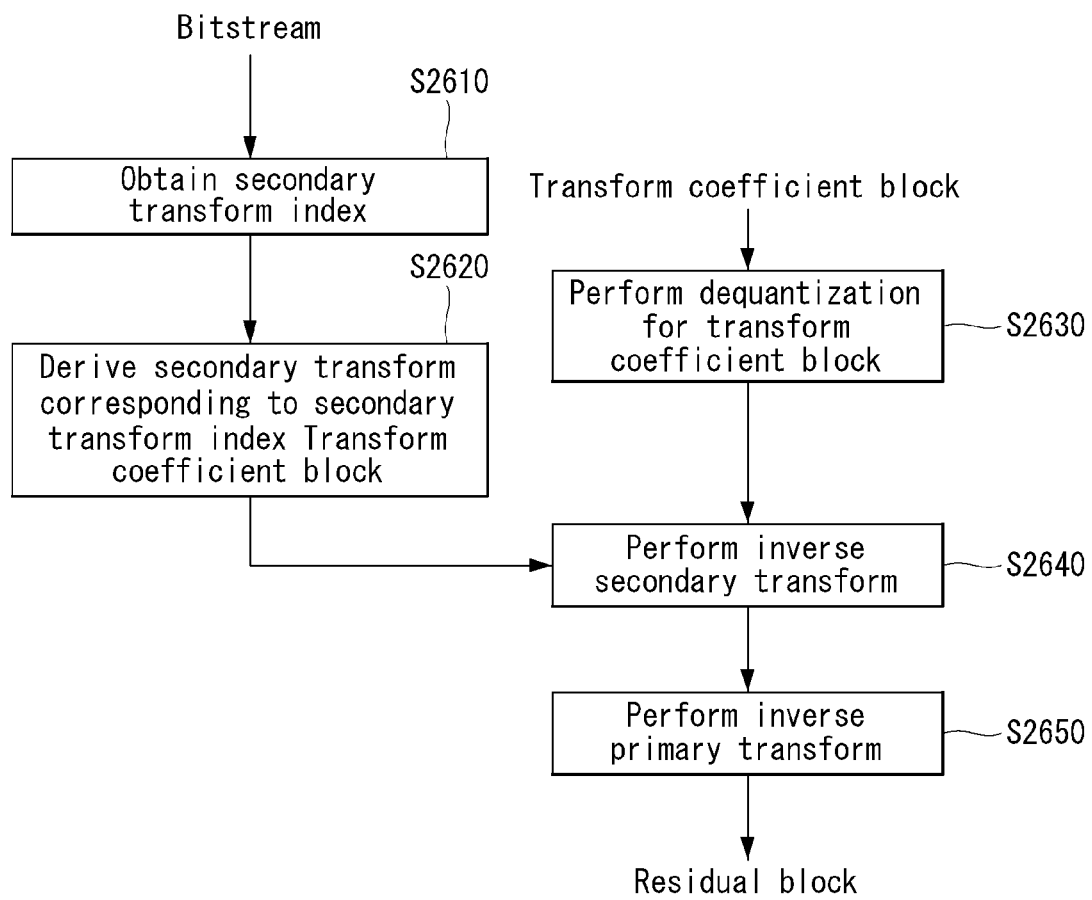

[FIG. 27]
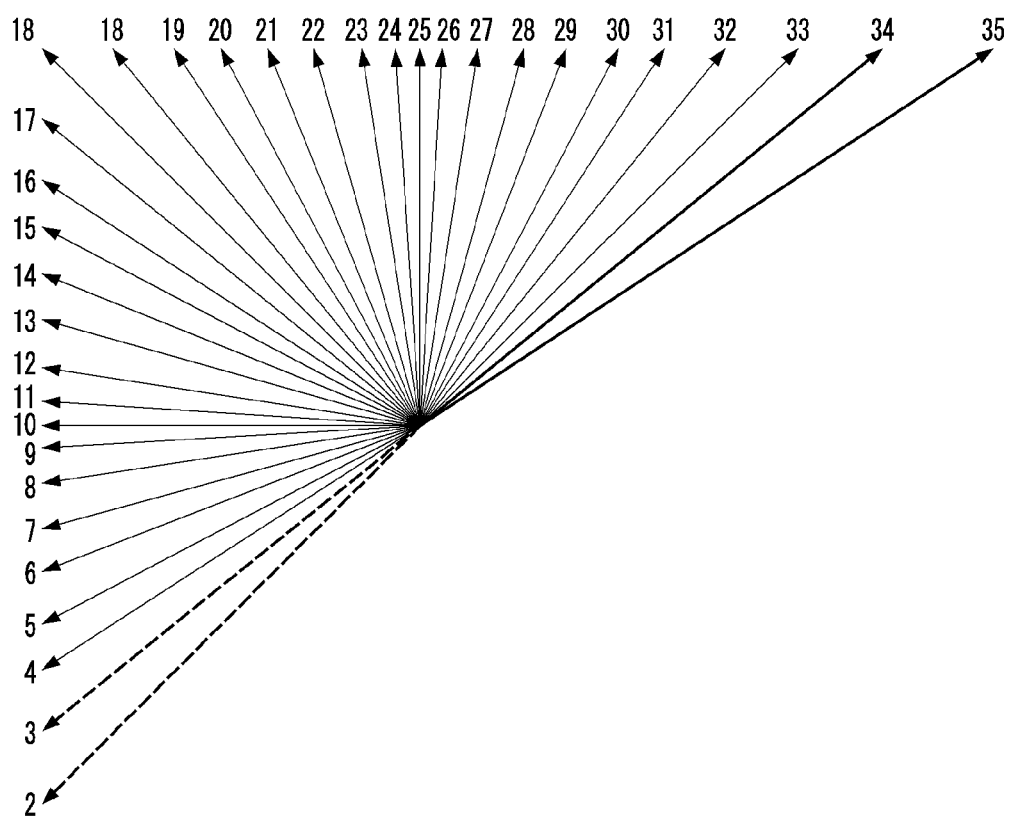

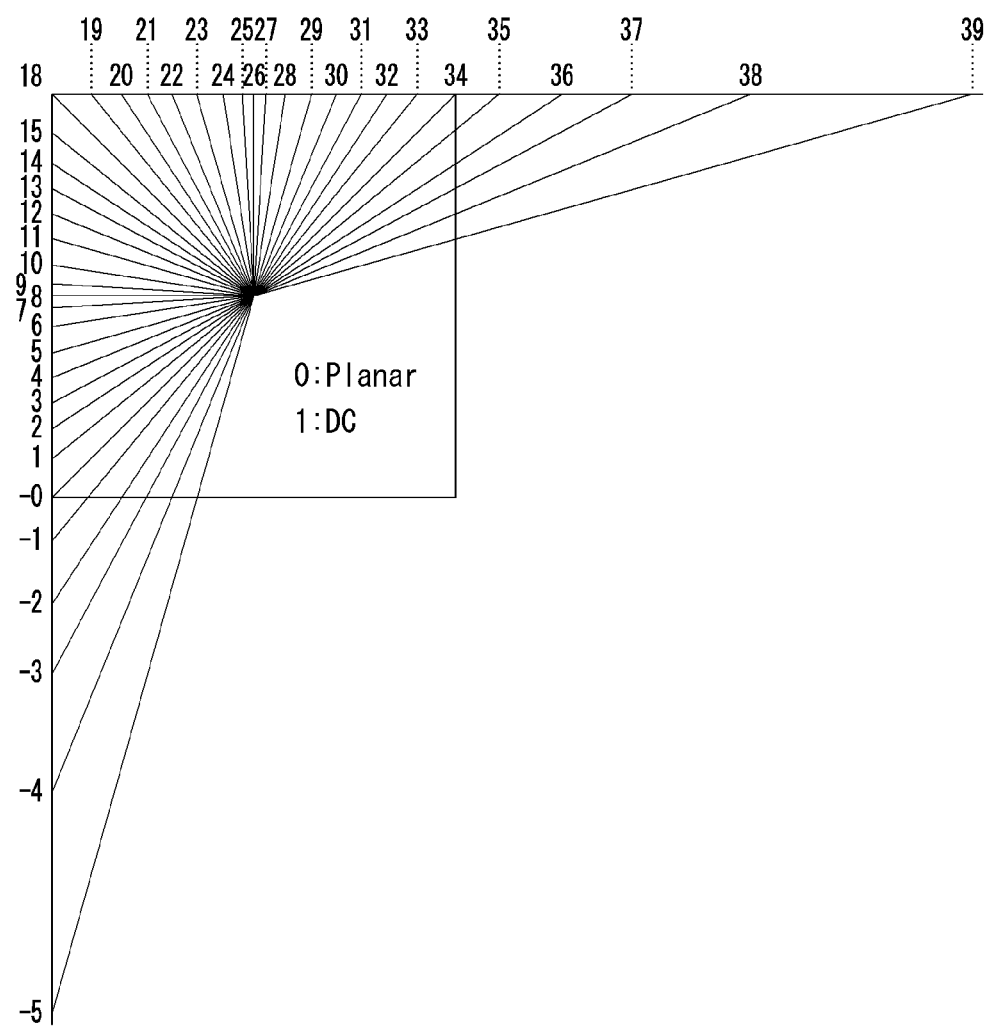
[FIG. 28]

[FIG. 29]

| 35 mode index | −5  | −4 | −3 | −2 | −1 | 35 | 36 | 37 | 38 | 39 |
|---|---|---|---|---|---|---|---|---|---|---|
| 67 mode index | −10 | −8 | −6 | −4 | −2 | 68 | 70 | 72 | 74 | 76 |

[FIG. 30]
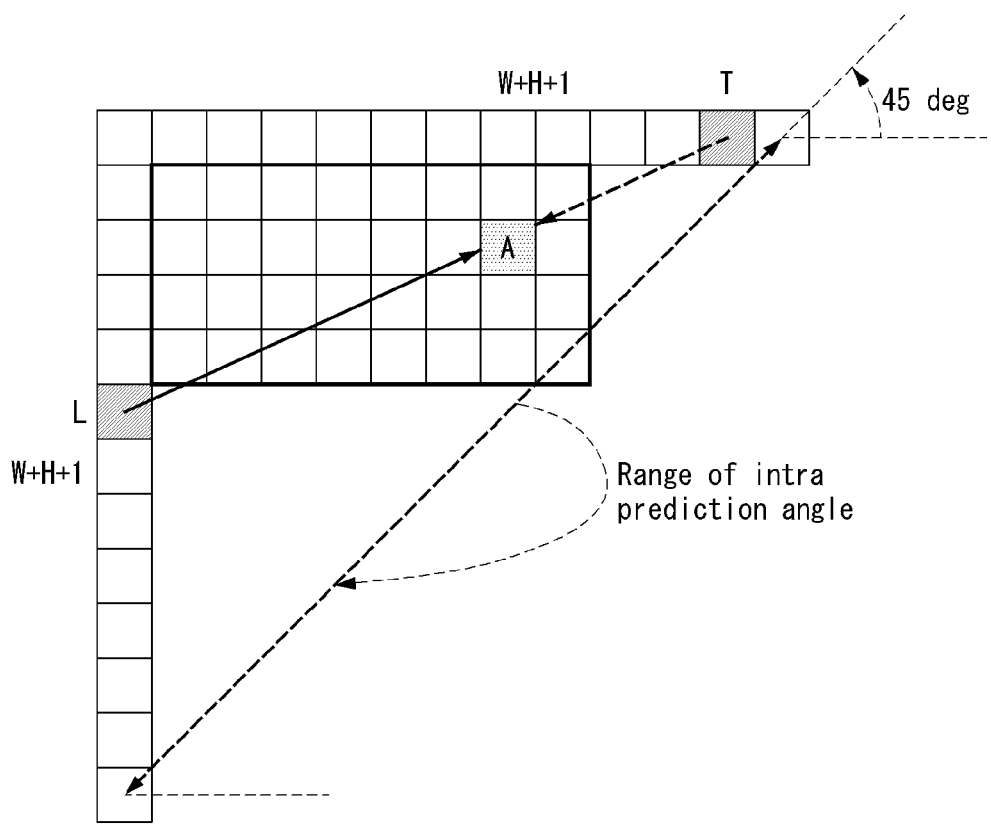

[FIG. 31]
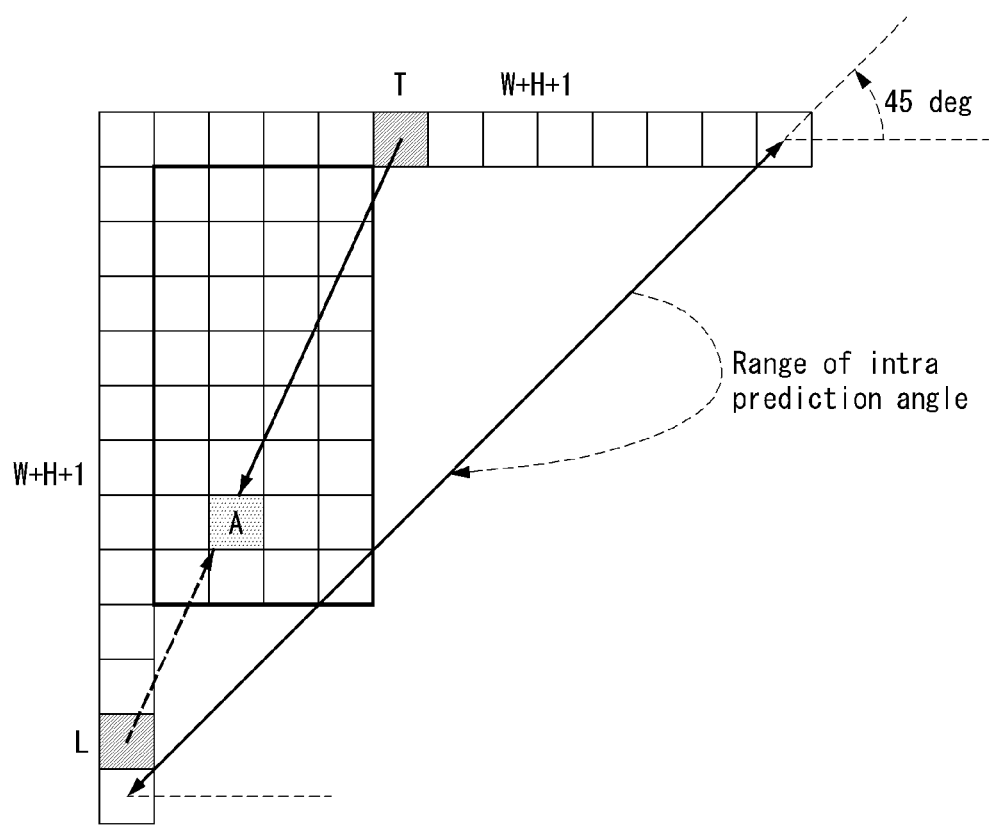

[FIG. 32]
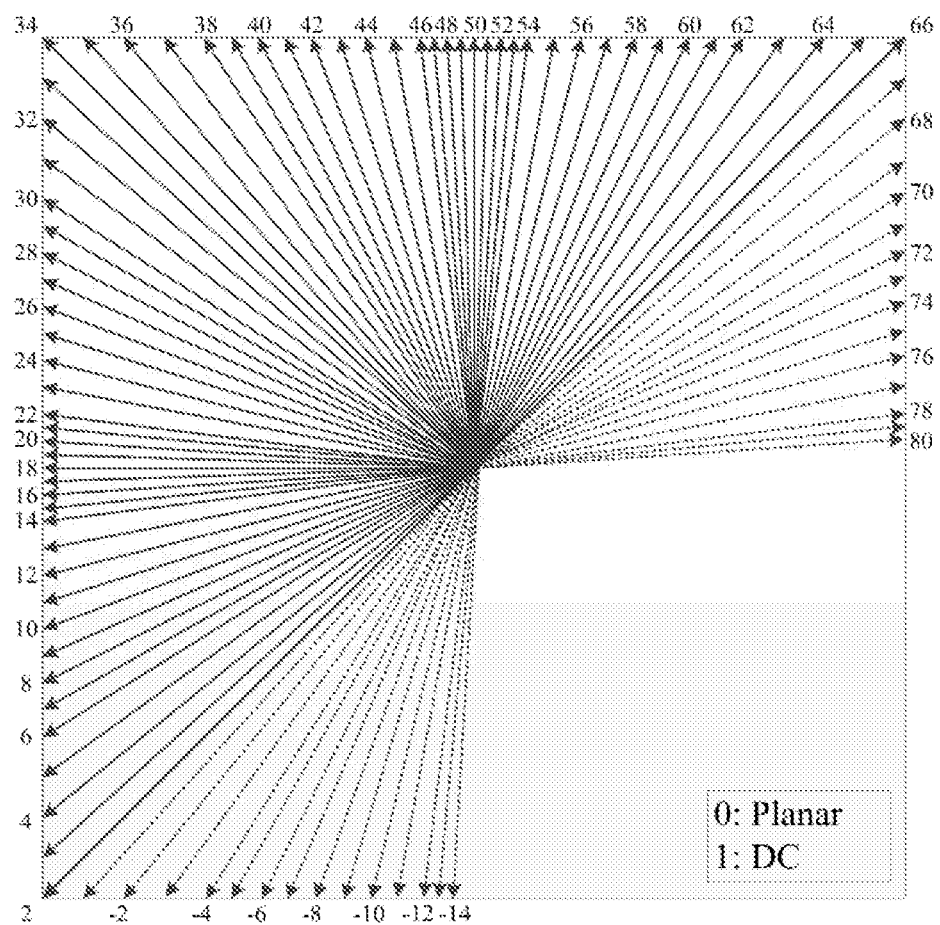

[FIG. 33A]
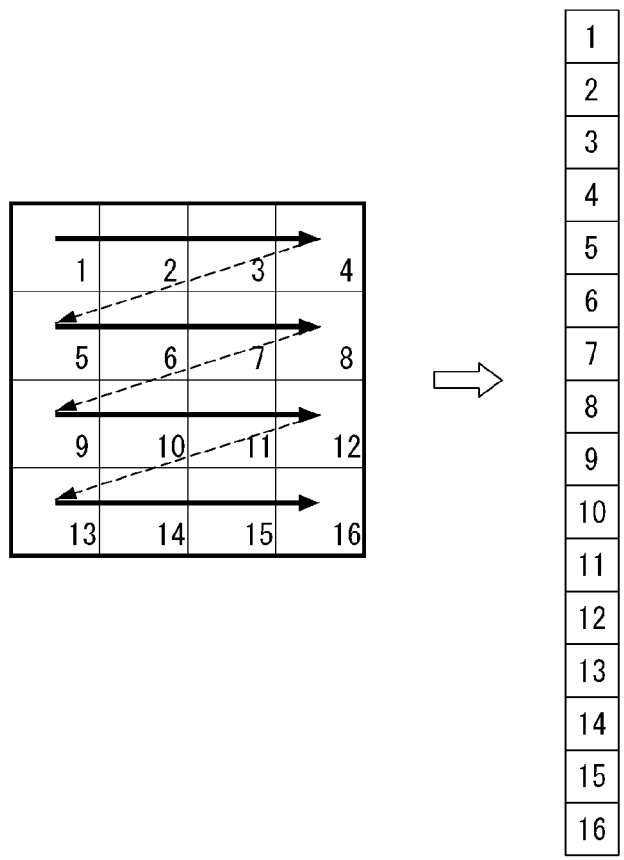

【FIG. 33B】
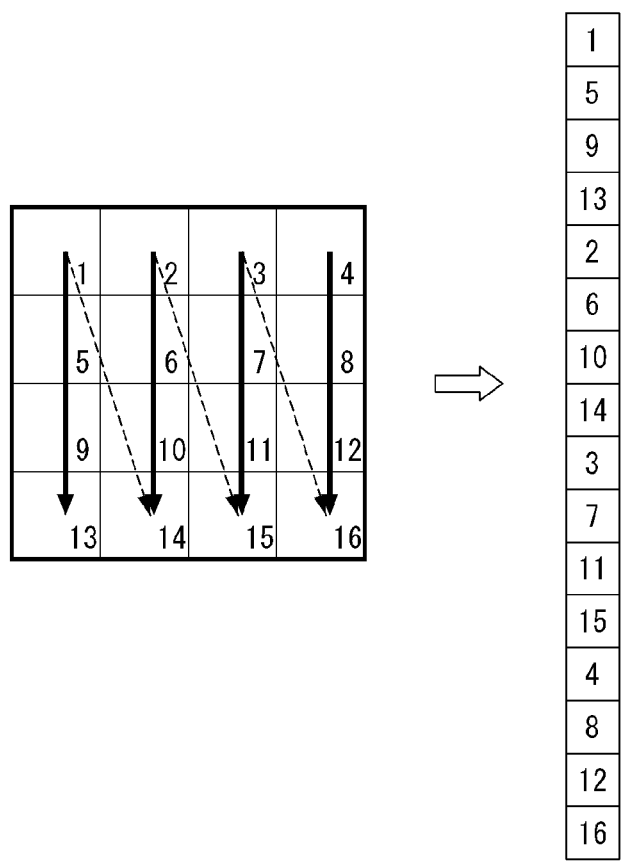

[FIG. 34A]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 44 | 43 | 42 | 41 | 40 | 39 | 38 | 37 | 36 | 35 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 35 | 36 | 37 | 38 | 39 | 40 | 41 | 42 | 43 | 44 | |

[FIG. 34B]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 2 | 2 | 2 | 2 | 2 | 2 | 2 | 2 | 2 | 2 | |

[FIG. 34C]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 35 | 35 | 35 | 35 | 35 | 35 | 35 | 35 | 35 | 35 | |

[FIG. 35A]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 2 | 2 | 2 | 2 | 6 | 6 | 6 | 10 | 10 | 10 | 10 | 10 | 14 | 14 | 14 | 18 | 18 | 18 | 18 | 22 | 22 | 22 | 22 | 26 | 26 | 26 | 26 | 30 | 30 | 30 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 30 | 30 | 30 | 26 | 26 | 26 | 22 | 22 | 22 | 18 | 18 | 18 | 14 | 14 | 14 | 10 | 10 | 10 | 10 | 10 | 10 | 6 | 6 | 6 | 2 | 2 | 2 | 2 | 2 | 2 | 2 | 2 | 2 | 2 | 2 | 2 | 2 | 2 | 2 | 2 | |

[FIG. 35B]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 0 | 2 | 2 | 2 | 6 | 6 | 6 | 10 | 10 | 10 | 10 | 10 | 14 | 14 | 14 | 18 | 18 | 18 | 22 | 22 | 22 | 26 | 26 | 26 | 26 | 26 | 30 | 30 | 30 | 30 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 30 | 30 | 26 | 26 | 26 | 22 | 22 | 18 | 18 | 14 | 14 | 14 | 10 | 10 | 10 | 10 | 10 | 6 | 6 | 6 | 2 | 2 | 2 | 35 | 35 | 35 | 35 | 35 | 35 | 35 | 35 | 35 | 35 | 35 | 35 | 35 | 35 | 35 | 35 | 35 | 35 | |

[FIG. 36A]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 2 | 2 | 2 | 2 | 2 | 2 | 2 | 10 | 10 | 10 | 10 | 10 | 10 | 10 | 10 | 18 | 18 | 18 | 18 | 18 | 18 | 18 | 18 | 26 | 26 | 26 | 26 | 26 | 26 | 34 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 34 | 34 | 26 | 26 | 26 | 26 | 26 | 18 | 18 | 18 | 18 | 18 | 18 | 18 | 18 | 10 | 10 | 10 | 10 | 10 | 10 | 10 | 10 | 18 | 18 | 18 | 18 | 18 | 18 | 18 | 18 | 26 | 26 | 26 | 26 | 26 | 26 | 34 | 34 | 34 | |

[FIG. 36B]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 0 | 2 | 2 | 2 | 2 | 2 | 10 | 10 | 10 | 10 | 10 | 10 | 10 | 10 | 10 | 18 | 18 | 18 | 18 | 18 | 18 | 18 | 26 | 26 | 26 | 26 | 26 | 26 | 26 | 34 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 34 | 26 | 26 | 26 | 26 | 26 | 26 | 26 | 18 | 18 | 18 | 18 | 18 | 18 | 18 | 10 | 10 | 10 | 10 | 10 | 10 | 10 | 10 | 10 | 2 | 2 | 2 | 2 | 2 | 35 | 35 | 35 | 35 | 35 | 35 | 35 | 35 | 35 | 35 | 35 | |

[FIG. 37A]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 2 | 2 | 2 | 2 | 2 | 2 | 2 | 2 | 2 | 2 | 2 | 2 | 2 | 2 | 2 | 2 | 2 | 18 | 18 | 18 | 18 | 18 | 18 | 18 | 18 | 18 | 34 | 34 | 34 | 34 | 34 | 34 | 34 |

| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 34 | 34 | 34 | 34 | 34 | 34 | 34 | 34 | 34 | 34 | 18 | 18 | 18 | 18 | 18 | 18 | 18 | 18 | 18 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |

[FIG. 37B]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 36 | 36 | 36 | 36 | 35 | 35 | 35 | 0 | 0 | 2 | 2 | 2 | 2 | 2 | 2 | 2 | 18 | 18 | 18 | 18 | 18 | 18 | 18 | 18 | 18 | 18 | 18 | 18 | 34 | 34 | 34 | 34 | 34 | 34 | 34 | 34 | 34 | 34 | 34 | 34 |

| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 34 | 34 | 34 | 34 | 34 | 34 | 34 | 34 | 34 | 18 | 18 | 18 | 18 | 18 | 18 | 18 | 2 | 2 | 2 | 2 | 2 | 2 | 2 | 2 | 18 | 18 | 18 | 2 | 2 | 2 | 2 | 2 | 2 | 2 | 35 | 35 | 35 | 35 | 35 | 35 | 35 | 35 | 35 |

[FIG. 38]
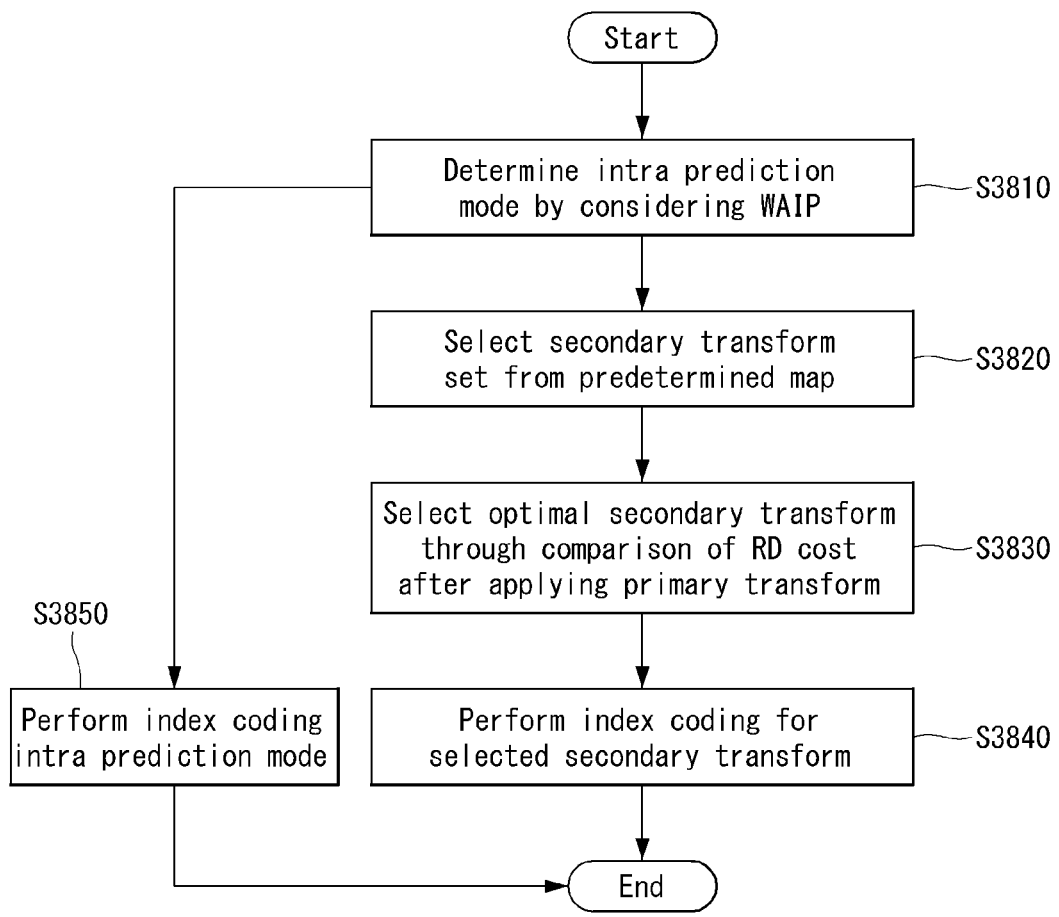

[FIG. 39]
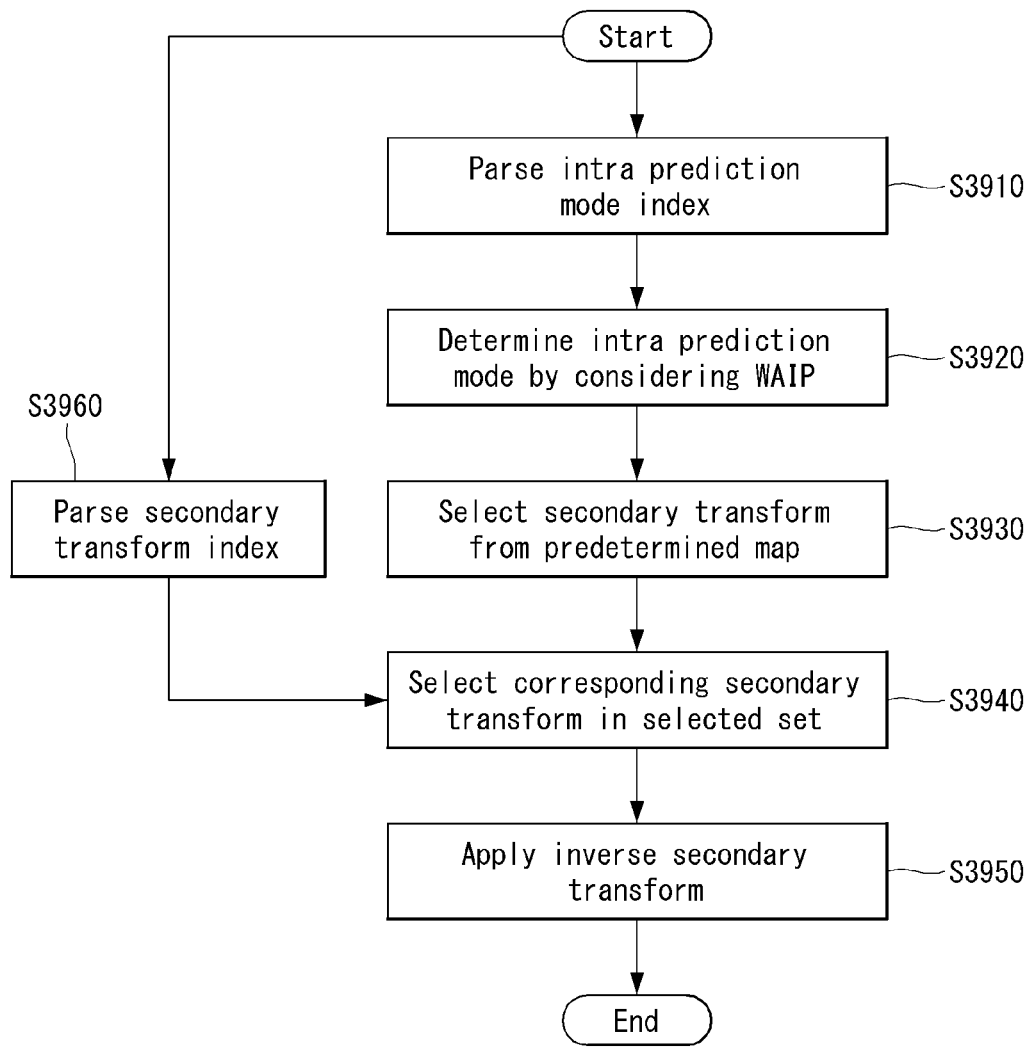

[FIG. 40]
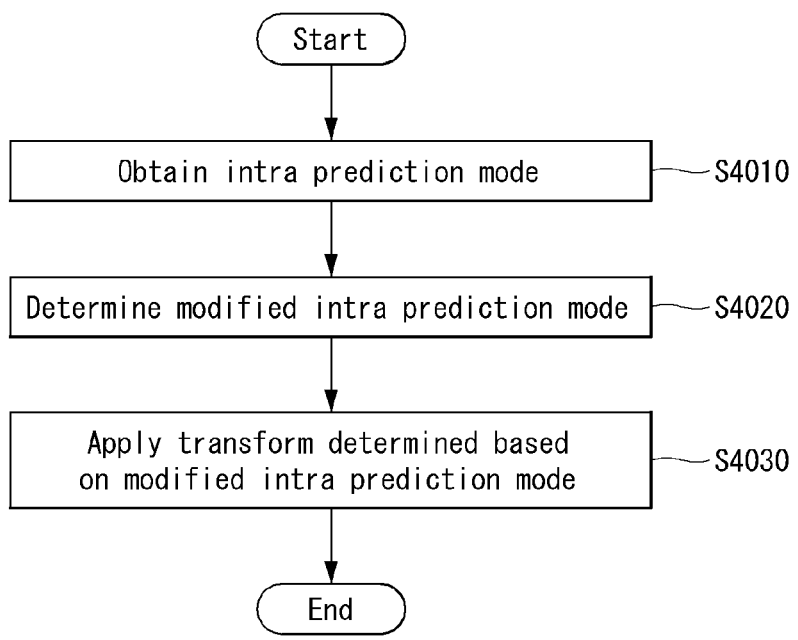

[FIG. 41]
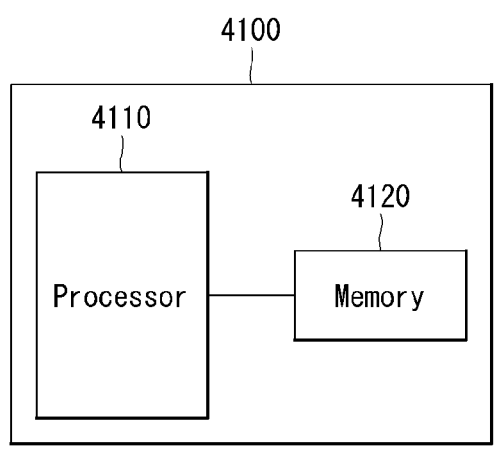

METHOD AND DEVICE FOR PROCESSING VIDEO SIGNAL BY USING INTRA-PREDICTION

CROSS-REFERENCE TO RELATED APPLICATIONS

This application is the National Stage filing under 35 U.S.C. 371 of International Application No. PCT/KR2019/018117, filed on Dec. 19, 2019, which claims the benefit of U.S. Provisional Application No. 62/782,295, filed on Dec. 19, 2018, the contents of which are all hereby incorporated by reference herein in their entirety.

TECHNICAL FIELD

The present disclosure relates to a method and a device for processing a video signal, and particularly, to a method and a device for encoding or decoding a video signal to which a wide angle intra prediction mode is applied.

BACKGROUND ART

Compression encoding means a series of signal processing techniques for transmitting digitized information through a communication line or storing information in a form suitable for a storage medium. Media including a video, an image, an audio, etc. may be a target for compression encoding. In particular, a technique for performing compression encoding on an image is referred to as image compression.

Next generation image content will have characteristics of high spatial resolution, a high frame rate and high dimensionality of a scene representation. In order to process such content, a drastic increase in memory storage, a memory access rate and processing power will result.

Therefore, there is a need to design a coding tool for processing next generation video contents more efficiently. In particular, after a high efficiency video coding (HEVC) standard, a video codec standard requires a prediction technology having higher accuracy.

DISCLOSURE

Technical Problem

A method and a device for providing an effective transform technology according to a prediction mode are required together with a prediction technique having higher accuracy.

An embodiment of the present disclosure provides a method and a device for processing a video signal, which can transform to an intra prediction mode having higher accuracy in the process of applying intra prediction.

Further, an embodiment of the present disclosure provides a method and a device for processing a video signal by using a wide angle intra prediction according to a form of a block and a condition of the intra prediction mode.

Further, an embodiment of the present disclosure provides a method and a device for processing a video signal, which can select a transform kernel applied to a block to which the wide angle intra prediction is applied.

The technical objects to be achieved by an embodiments of the present disclosure are not limited to the aforementioned technical objects, and other technical objects, which are not mentioned above, will be apparently appreciated by those skilled in the technical field to which the embodiments of the present disclosure belong from the following description.

Technical Solution

An embodiment of the present disclosure provides a method for decoding a video signal using intra prediction. A method for processing a video signal according to an embodiment of the present disclosure includes: obtaining an intra prediction mode of a current block from the video signal; determining a modified intra prediction mode from the intra prediction mode for the current block based on a width and a height of the current block and the intra prediction mode; and applying a transform determined based on the modified intra prediction mode. Here, when the width is larger than the height, and the intra prediction mode is equal to or larger than 2 and smaller than a first reference value, the modified intra prediction mode may be determined by adding 65 to the intra prediction mode, and when the height is larger than the width, and the intra prediction mode is larger than a second reference value and equal to or smaller than 66, the modified intra prediction mode may be determined by subtracting 67 from the intra prediction mode, and each of the first reference value and the second reference value may be determined based on a ratio of the width to the height.

In an embodiment, when the obtained intra prediction mode corresponds to a non-directional prediction mode or the width is equal to the height, the obtained intra prediction mode may not be modified and the transform for the current block may be performed.

In an embodiment, the method for processing a video signal may include: determining a non-separable transform set index based on the modified intra prediction mode, deriving a non-separable transform matrix based on the non-separable transform set index and a non-separable transform index, and applying the non-separable transform matrix to the current block.

In an embodiment, the applying of the non-separable transform matrix may include applying the non-separable transform matrix to a top-left region of the current block, and the top-left region may be determined based on the width and the height.

In an embodiment, when the modified intra prediction mode is smaller than 0, the non-separable transform set index may be determined as 1, when the modified intra prediction mode is equal to or larger than 0 and equal to or smaller than 1, the non-separable transform set index may be determined as 0, when the modified intra prediction mode is equal to or larger than 2 and equal to or smaller than 12, the non-separable transform set index may be determined as 1, when the modified intra prediction mode is equal to or larger than 13 and equal to or smaller than 23, the non-separable transform set index may be determined as 2, when the modified intra prediction mode is equal to or larger than 24 and equal to or smaller than 44, the non-separable transform set index may be determined as 3, when the modified intra prediction mode is equal to or larger than 45 and equal to or smaller than 55, the non-separable transform set index may be determined as 2, and when the modified intra prediction mode is equal to or larger than 56 and equal to or smaller than 80, the non-separable transform set index may be determined as 1.

In an embodiment, both the width and the height are equal to or larger than 8, the non-separable transform matrix may be applied to a top-left 8×8 region of the current block, and when both the width and the height are equal to or larger than 4 and the width or the height is smaller than 8, the non-separable transform matrix may be applied to a top-left 4×4 region of the current block.

An embodiment of the present disclosure provides a device for processing a video signal. A device for processing a video signal according to an embodiment of the present disclosure includes a memory storing the video signal; and a processor connected to the memory. The processor may be configured to obtain an intra prediction mode of a current block processed in the video signal, determine a modified intra prediction mode from the intra prediction mode for the current block based on the width and height of the current block and the intra prediction mode, and generate a prediction sample of the current block based on the modified intra prediction mode, when the width is larger than the height, and the intra prediction mode is equal to or larger than 2 and smaller than a first reference value, the modified intra prediction mode may be determined by adding 65 to the intra prediction mode, and when the height is larger than the width, and the intra prediction mode is larger than a second reference value and equal to or smaller than 66, the modified intra prediction mode may be determined by subtracting 67 from the intra prediction mode.

Another embodiment of the present disclosure provides a non-transitory computer-readable medium storing a computer-executable component configured to be executed in one or more processors of a computing device. A non-transitory computer-readable medium according to an embodiment of the present disclosure may obtain an intra prediction mode of a current block processed in the video signal, determine a modified intra prediction mode from the intra prediction mode for the current block based on the width and height of the current block and the intra prediction mode, and generate a prediction sample of the current block based on the modified intra prediction mode, when the width is larger than the height, and the intra prediction mode is equal to or larger than 2 and smaller than a first reference value, the modified intra prediction mode may be determined by adding 65 to the intra prediction mode, and when the height is larger than the width, and the intra prediction mode is larger than a second reference value and equal to or smaller than 66, the modified intra prediction mode may be determined by subtracting 67 from the intra prediction mode.

Advantageous Effects

According to an embodiment of the present disclosure, it is possible to perform intra prediction having higher accuracy.

Further, according to an embodiment of the present disclosure, prediction accuracy can be increased by using a wide angle intra prediction mode according to a form of a block and an intra prediction mode.

Further, according to an embodiment of the present disclosure, a block suitable for wide angle intra prediction can be determined by defining the form of the block for application of the wide angle intra prediction mode and the condition of the intra prediction mode.

Further, according to an embodiment of the present disclosure, transform efficiency can be increased by determining a transform kernel applied according to the intra prediction mode.

Effects which can be obtained in the present disclosure are not limited to the aforementioned effects and other unmentioned advantages will be clearly understood by those skilled in the technical field to which the embodiments of the present disclosure belong from the following description.

DESCRIPTION OF DRAWINGS

The accompany drawings, which are included to provide a further understanding of the present disclosure and are incorporated on and constitute a part of the present disclosure illustrate embodiments of the present disclosure and together with the description serve to explain the principles of the present disclosure.

FIG. 1 illustrates an example of a video coding system according to an embodiment of the present disclosure.

FIG. 2 is a schematic block diagram of an encoding apparatus in which encoding of a video/image signal is performed according to an embodiment of the present disclosure.

FIG. 3 is a schematic block diagram of a decoding apparatus in which decoding of a video signal is performed according to an embodiment of the present disclosure.

FIG. 4 is a structural diagram of a content streaming system according to an embodiment of the present disclosure.

FIG. 5 illustrates one example of multi-type tree split modes according to an embodiment of the present disclosure.

FIGS. 6 and 7 illustrate an intra prediction based video encoding method according to an embodiment of the present disclosure and an example of an intra prediction unit in an encoding apparatus according to an embodiment of the present disclosure.

FIGS. 8 and 9 illustrate an intra prediction based video/image decoding method according to an embodiment of the present disclosure and an example of an intra prediction unit in a decoding apparatus according to an embodiment of the present disclosure.

FIGS. 10 and 11 illustrate examples of a prediction direction of an intra prediction mode applicable to embodiments of the present disclosure.

FIGS. 12 and 13 schematic block diagrams of a transform unit and a quantization unit 120/130 and a dequantization unit and an inverse transform unit 140/150 in an encoding apparatus according to an embodiment of the present disclosure, and FIG. 13 is a schematic block diagram of a dequantization unit and an inverse transform unit 220/230 in a decoding apparatus.

FIGS. 14A and 14B illustrate an example of a table for determining a transform type for a horizontal direction and a vertical direction for each prediction mode according to an embodiment of the present disclosure.

FIG. 15 is a flowchart showing an encoding process in which multiple transform selection (MTS) is performed according to an embodiment of the present disclosure.

FIG. 16 is a flowchart showing a decoding process sin which the MTS is performed according to an embodiment of the present disclosure.

FIG. 17 is a flowchart for describing a process of encoding an MTS flag and an MTS index according to an embodiment of the present disclosure.

FIG. 18 is a flowchart for describing a decoding process of applying a horizontal transform or a vertical transform to a row or a column based on the MTS flag and the MTS index according to an embodiment of the present disclosure.

FIG. 19 is a flowchart of performing an inverse transform based on a transform related parameter according to an embodiment of the present disclosure.

FIG. 20 is a table showing allocation of a transform set for each intra prediction mode in an NSST according to an embodiment of the present disclosure.

FIG. 21 is a calculation flow diagram for Givens rotation according to an embodiment of the present disclosure.

FIG. 22 illustrates one round configuration in 4×4 NSST constituted by a Givens rotation layer and permutations according to an embodiment of the present disclosure.

FIG. 23 is a block diagram for describing operations of a forward reduced transform and an inverse reduced transform according to an embodiment of the present disclosure.

FIG. 24 is a diagram illustrating a process of performing an inverse scan from $64^{th}$ to $17^{th}$ according to an inverse scan order according to an embodiment of the present disclosure.

FIG. 25 is a flowchart of encoding a video signal through a primary transform and a secondary transform according to an embodiment of the present disclosure.

FIG. 26 is a flowchart of decoding a video signal through an inverse secondary transform and an inverse primary transform according to an embodiment of the present disclosure.

FIG. 27 illustrates an example in which 2 wide angle modes are additionally configured in 35 intra prediction modes according to an embodiment of the present disclosure.

FIG. 28 illustrates an example in which 10 wide angle modes are additionally configured in 35 intra prediction modes according to an embodiment of the present disclosure.

FIG. 29 illustrates an example of an index mapping table between wide angle modes added in 35 intra prediction modes and 67 intra prediction modes according to an embodiment of the present disclosure.

FIGS. 30 and 31 illustrate examples of intra prediction for a non-square block according to an embodiment of the present disclosure.

FIG. 32 illustrates an example of a case in which 14 wide angle modes are added in each of an upper direction and a lower direction as a wide angle intra prediction mode according to an embodiment of the present disclosure.

FIG. 33 illustrates an example of an order of sorting pixels when a 2D block is modified to a 1D vector according to an embodiment of the present disclosure, and FIG. 33A illustrates a row-first order and FIG. 33B illustrates an example of a column-first order.

FIG. 34 illustrates an example of a mapping table of 35 transform sets and the intra prediction mode according to an embodiment of the present disclosure, and FIG. 34A illustrates an example of a case of symmetrically allocating a transform set to each wide angle mode, FIG. 34B illustrates an example of a case of allocating transform set #2 to all wide angle modes, and FIG. 34C illustrates an example of a case of allocating the same additional transform set to all wide angle modes.

FIG. 35 illustrates an example of a mapping table of 10 transform sets and the intra prediction mode according to an embodiment of the present disclosure, and FIG. 35A illustrates an example of a case of allocating transform set #2 to each wide angle mode and FIG. 35B illustrates an example of a case of allocating the same additional transform set to all wide angle modes.

FIG. 36 illustrates an example of a mapping table of 6 transform sets and the intra prediction mode according to an embodiment of the present disclosure, and FIG. 36A illustrates an example of a case of allocating transform set #2 to each wide angle mode and FIG. 36B illustrates an example of a case of allocating the same additional transform set to all wide angle modes.

FIG. 37 illustrates an example of a mapping table of 4 transform sets and the intra prediction mode according to an embodiment of the present disclosure, and FIG. 37A illustrates an example of a case of allocating transform set #2 to each wide angle mode and FIG. 37B illustrates an example of a case of allocating the same additional transform set to all wide angle modes.

FIG. 38 illustrates an example of a flowchart of performing a transform considering wide angle intra prediction (WAIP) in an encoder according to an embodiment of the present disclosure.

FIG. 39 illustrates an example of a flowchart of performing the transform considering the WAIP in a decoding apparatus 200 according to an embodiment of the present disclosure.

FIG. 40 illustrates an example of a flowchart for processing a video signal by using intra prediction according to an embodiment of the present disclosure.

FIG. 41 illustrates an example of a block diagram of a device for processing a video signal according to an embodiment of the present disclosure.

MODE FOR DISCLOSURE

Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which embodiments of the present disclosure may be practiced. The following detailed description includes specific details in order to provide a thorough understanding of the present disclosure. However, those skilled in the art appreciate that the embodiments of the present disclosure may be practiced without these specific details.

In some cases, in order to prevent a concept of the present disclosure from being ambiguous, known structures and devices may be omitted or illustrated in a block diagram format based on core function of each structure and device.

Further, although general terms widely used currently are selected as the terms in the present disclosure as much as possible, a term that is arbitrarily selected by the applicant is used in a specific case. Since the meaning of the term will be clearly described in the corresponding part of the description in such a case, it is understood that the present disclosure will not be simply interpreted by the terms only used in the description of the present disclosure, but the meaning of the terms should be figured out.

Specific terminologies used in the description below may be provided to help the understanding of the present disclosure. Furthermore, the specific terminology may be modified into other forms within the scope of the technical concept of the present disclosure. For example, a signal, data, a sample, a picture, a frame, a block, etc may be properly replaced and interpreted in each coding process.

In the present disclosure, a 'processing unit' refers to a unit on which encoding/decoding process such as prediction, transform and/or quantization is performed. The processing unit may also be interpreted as the meaning including a unit for a luminance component and a unit for a chrominance component. For example, the processing unit may correspond to a block, a coding unit (CU), a prediction unit (PU) or a transform unit (TU).

Further, the processing unit may be interpreted as the unit for the luma component and the unit for the chroma component. For example, the processing unit may correspond to a coding tree block (CTB), a coding block (CB), CU, PU, or a transform block (TB) for the luma component. Alternatively, the processing unit may correspond to the CTB, the CB, the PU, or the TB for the chroma component. Further, the present disclosure is not limited thereto and the processing unit may be interpreted as a meaning including the unit for the luma component and the unit for the chroma component.

Further, the processing unit is not particularly limited to a square block, but may be configured as a polygonal shape having three or more vertexes.

In addition, hereinafter, in the present disclosure, a pixel and the like will be collectively referred to as a sample. In addition, using the sample may mean using a pixel value and the like.

FIG. 1 illustrates an example of a video coding system according to an embodiment of the present disclosure.

The video coding system may include a source device 10 and a receiving device 20. The source device 10 may transfer encoded video/image information or data to the receiving device 20 through a digital storage medium or network in a file or streaming form.

The source device 10 may include a video source 11, an encoding apparatus 12, and a transmitter 13. The receiving device 20 may include a receiver 21, a decoding apparatus 22, and a renderer 23. The encoding apparatus 10 may be called a video/image encoding apparatus and the decoding apparatus 20 may be called a video/image decoding apparatus. The transmitter 13 may be included in the encoding apparatus 12. The receiver 21 may be included in the decoding apparatus 22. The renderer 23 may include a display unit and the display unit may be configured as a separate device or an external component.

A video source may obtain a video/image through a capturing, synthesizing, or generating process of the video/image. The video source may include a video/image capture device and/or a video/image generation device. The video/image capture device may include, for example, one or more cameras, video/image archives including previously captured video/images, and the like. The video/image generation device may include, for example, a computer, a tablet, and a smart phone and may (electronically) generate the video/image. For example, a virtual video/image may be generated by the computer, etc., and in this case, the video/image capturing process may be replaced by a process of generating related data.

The encoding apparatus 12 may encode an input video/image. The encoding apparatus 12 may perform a series of procedures including prediction, transform, quantization, and the like for compression and coding efficiency. The encoded data (encoded video/image information) may be output in the bitstream form.

The transmitter 13 may transfer the encoded video/image information or data output in the bitstream to the receiver of the receiving device through the digital storage medium or network in the file or streaming form. The digital storage medium may include various storage media including a Universal Serial Bus (USB), Secure Digital (SD), a compact disk (CD), a Digital Video Disk (DVD), a Bluray, a hard disk drive (HDD), a solid state drive (SSD), and the like. The transmitter 13 may include an element for generating a media file through a predetermined file format and may include an element for transmission through a broadcast/communication network. The receiver 21 may extract a bitstream and transfer the extracted bitstream to the decoding apparatus 22.

The decoding apparatus 22 performs a series of procedures including dequantization, inverse transform, prediction, etc., corresponding to an operation of the encoding apparatus 12 to decode the video/image.

The renderer 23 may render the decoded video/image. The rendered video/image may be displayed by the display unit.

FIG. 2 is a schematic block diagram of an encoding apparatus in which encoding of a video/image signal is performed according to an embodiment of the present disclosure. The encoding apparatus 100 of FIG. 2 may correspond to the encoding apparatus 12 of FIG. 1.

Referring to FIG. 2, the encoding apparatus 100 may include an image division unit 110, a subtraction unit 115, a transform unit 120, a quantization unit 130, a dequantization unit 140, an inverse transform unit 150, an addition unit 155, a filtering unit 160, a memory 170, an inter-prediction unit 180, an intra-prediction unit 185, and an entropy encoding unit 190. The inter-prediction unit 180 and the intra-prediction unit 185 may be collectively referred to as a prediction unit. In other words, the prediction unit may include the inter-prediction unit 180 and the intra-prediction 185. The transform unit 120, the quantization unit 130, the dequantization unit 140, and the inverse transform unit 150 may be included in a residual processing unit. The residual processing unit may further include the subtraction unit 115. The image division unit 110, the subtraction unit 115, the transform unit 120, the quantization unit 130, the dequantization unit 140, the inverse transform unit 150, the addition unit 155, the filtering unit 160, the inter-prediction unit 180, the intra-prediction unit 185, and the entropy encoding unit 190 may be constituted by one hardware component (e.g., encoder, or processor) according to an embodiment. Further, the memory 170 may be constituted by one hardware component (e.g., the memory or the digital storage medium) according to an embodiment, and the memory 170 may include a decoded picture buffer 175.

The image division unit 110 may divide an input image (or picture or frame) input into the encoding apparatus 100 into one or more processing units. As an example, the processing unit may be referred to as a coding unit (CU). In this case, the coding unit may be recursively divided according to a quad-tree binary-tree (QTBT) structure from a coding tree unit (CTU) or a largest coding unit (LCU). For example, one coding unit may be divided into a plurality of coding units having a deeper depth based on a quadtree structure and/or a binary-tree structure. In this case, for example, the quadtree structure may be first applied and the binary-tree structure may be applied later. Alternatively, the binary-tree structure may also be first applied. A coding procedure according to the present disclosure may be performed based on a final coding unit which is not divided any longer. In this case, a largest coding unit may be directly used as the final coding unit based on coding efficiency depending on an image characteristic or as necessary, the coding unit is recursively divided into coding units having a still deeper depth, and as a result, a coding unit having an optimal size may be used as the final coding unit. Here, the coding procedure may include procedures including prediction, transform, and reconstruction to be described below. As another example, the processing unit may further include a prediction unit (PU) or a transform unit (TU). In this case, each of the prediction unit and the transform unit may be divided or partitioned from the final coding unit described above. The prediction unit may be a unit of sample prediction and the transform unit may be a unit of deriving a transform coefficient and/or a unit of deriving a residual signal from the transform coefficient.

The unit may be used in combination with a term such as a block or region in some cases. In a general case, an M×N block may indicate a set of samples or transform coefficients constituted by M columns and N rows. The sample may generally indicate a pixel or a value of the pixel, indicate only a pixel/pixel value of a luma component, and indicate only a pixel/pixel value of a chroma component. In the case of the sample, one picture (or image) may be used as a term corresponding to the pixel or pel.

The encoding apparatus 100 subtracts a prediction signal (or a prediction block or a prediction sample array) output from the inter-prediction unit 180 or the intra-prediction unit 185 from the input image signal to generate a residual signal (or a residual block or a residual sample array) and the generated residual signal is transmitted to the transform unit 120. In this case, as illustrated, in the encoding apparatus 100, a unit subtracting a prediction signal (prediction block or prediction sample array) from the input image signal (original block or original sample array) may be referred to as the subtraction unit 115. The prediction unit may perform prediction for a processing target block (hereinafter, referred to as a current block) and generate a predicted block including prediction samples for the current block. The prediction unit may determine whether intra prediction is applied or inter prediction is applied in units of the block or CU. The prediction unit may generate various information on prediction, such as prediction mode information and transfer the generated various information to the entropy encoding unit 190 as described below in describing each prediction mode. The information on the prediction may be encoded by the entropy encoding unit 190 and outputted in the form of the bitstream.

The intra-prediction unit 185 may predict the current block by referring to samples in the current picture. The referred samples may be positioned in a neighbor of the current block or positioned apart from the current block according to the prediction mode. In the intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to a minuteness degree of the prediction direction. However, this is an example and directional prediction modes of a number equal thereto or more or less therethan may be used according to a configuration. The intra-prediction unit 185 may determine the prediction mode applied to the current block by using the prediction mode applied to the neighboring block.

The inter-prediction unit 180 may derive a prediction block for the current block based on a reference block (reference sample array) specified by a motion vector on the reference picture. In this case, in order to reduce an amount of motion information transmitted in the inter-prediction mode, the motion information may be predicted in units of a block, a subblock, or a sample based on a correlation of the motion information between the neighboring block and the current block. The motion information may include the motion vector and the reference picture index. The motion information may further include inter-prediction direction (L0 prediction, L1 prediction, Bi prediction, etc.) information. In the case of the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, the inter-prediction unit 180 may configure a motion information candidate list based on the neighboring blocks and generate information indicating which candidate is used in order to derive the motion vector and/or the reference picture index of the current block. The inter prediction may be performed based on various prediction modes and for example, in the case of a skip mode and a merge mode, the inter-prediction unit 180 may use the motion information of the neighboring block as the motion information of the current block. In the case of the skip mode, the residual signal may not be transmitted unlike the merge mode. In the case of a motion vector prediction (MVP) mode, the motion vector of the neighboring block is used as a motion vector predictor and a motion vector difference is signaled to indicate the motion vector of the current block.

A prediction signal generated through the inter-prediction unit 180 or the intra-prediction unit 185 may be used for generating a reconstruction signal or used for generating the residual signal.

The transform unit 120 may generate transform coefficients by applying a transform technique to the residual signal. For example, the transform technique may include at least one of Discrete Cosine Transform (DCT), Discrete Sine Transform (DST), Karhunen-Loeve Transform (KLT), Graph-Based Transform (GBT), or Conditionally Non-linear Transform (CNT). Here, when relationship information between pixels is expressed by a graph, the GBT means a transform obtained from the graph. The CNT means a transform which generates the prediction signal by using all previously reconstructed pixels and is obtained based on the generated prediction signal. Further, a transform process may be applied to a square pixel block having the same size and applied even to a non-square block having a variable size.

The quantization unit 130 may quantize the transform coefficients and transmit the quantized transform coefficients to the entropy encoding unit 190 and the entropy encoding unit 190 may encode a quantized signal (information on the quantized transform coefficients) and output the encoded quantized signal as the bitstream. Information on the quantized transform coefficients may be referred to as residual information. The quantization unit 130 may rearrange block-type quantized transform coefficients in a 1-dimensional vector type based on a coefficient scan order and generate information on the quantized transform coefficients based on the 1-dimensional vector type quantized transform coefficients. The entropy encoding unit 190 may perform various encoding methods including, for example, exponential Golomb, context-adaptive variable length coding (CAVLC), context-adaptive binary arithmetic coding (CABAC), and the like. The entropy encoding unit 190 may encode information (e.g., values of syntax elements, etc.) required for reconstructing a video/image together or separately in addition to the quantized transform coefficients. The encoded information (e.g., video/image information) may be transmitted or stored in units of a network abstraction layer (NAS) unit in the form of the bitstream. The bitstream may be transmitted via a network or stored in a digital storage medium. Here, the network may include a broadcasting network and/or a communication network and the digital storage medium may include various storage media including USB, SD, CD, DVD, Blu-ray, HDD, SSD, and the like. A transmitter (not illustrated) transmitting and/or a storage (not illustrated) storing a signal outputted from the entropy encoding unit 180 may be configured as an internal/external element of the encoding apparatus 100 or the transmitter may be a component of the entropy encoding unit 190.

The quantized transform coefficients outputted from the quantization unit 130 may be used for generating the prediction signal. For example, dequantization and inverse transform are applied to the quantized transform coefficients by the dequantization unit 140 and the inverse transform unit 150 in a loop to reconstruct the residual signal. The addition unit 155 adds the reconstructed residual signal to the prediction signal output from the inter-prediction unit 180 or the intra-prediction unit 185 to generate a reconstructed signal (a reconstructed picture, a reconstructed block, or a reconstructed sample array). Like the case of applying the skip mode, when there is no residual for the processing target block, the prediction block may be used as the reconstructed block. The addition unit 155 may be referred to as a reconstruction unit or a reconstructed block generation unit. The reconstructed signal may be used for intra prediction of a next processing target block in the current picture and used for inter prediction of a next picture through filtering as described below.

The filtering unit 160 may enhance a subjective/objective image quality by applying the filtering to the reconstructed signal. For example, the filtering unit 160 may generate a modified reconstructed picture by applying various filtering methods to the reconstructed picture and transmit the modified reconstructed picture to the decoded picture buffer 175. The various filtering methods may include, for example, deblocking filtering, a sample adaptive offset, an adaptive loop filter, a bilateral filter, and the like. The filtering unit 160 may generate various information on the filtering and transfer the generated various information to the entropy encoding unit 190 as described below in describing each filtering method. The information on the filtering may be encoded by the entropy encoding unit 190 and outputted in the form of a bitstream.

The inter-prediction unit 180 may use the modified reconstructed picture transmitted to the decoded picture buffer 175 as the reference picture. When the inter prediction is applied therethrough, the encoding apparatus 100 may avoid a prediction mismatch in the encoding apparatus 100 and the decoding apparatus 200 and also enhance encoding efficiency.

The decoded picture buffer 175 may store the modified reconstructed picture in order to use the modified reconstructed picture as the reference picture in the inter-prediction unit 180.

FIG. 3 is a schematic block diagram of a decoding apparatus in which decoding of a video signal is performed according to an embodiment of the present disclosure. The decoding apparatus 200 of FIG. 3 may correspond to the decoding apparatus 22 of FIG. 1.

Referring to FIG. 3, the decoding apparatus 200 may be configured to include an entropy decoding unit 210, a dequantization unit 220, an inverse transform unit 230, an addition unit 235, a filtering unit 240, a memory 250, an inter-prediction unit 260, and an intra-prediction unit 265. The inter-prediction unit 260 and the intra-prediction unit 265 may be collectively referred to as a prediction unit. In other words, the prediction unit may include the inter-prediction unit 180 and the intra-prediction 185. The dequantization unit 220 and the inverse transform unit 230 may be collectively referred to as a residual processing unit. In other words, the residual processing unit may include the dequantization unit 220 and the inverse transform unit 230. The entropy decoding unit 210, the dequantization unit 220, the inverse transform unit 230, the addition unit 235, the filtering unit 240, the inter-prediction unit 260, and the intra-prediction unit 265 may be constituted by one hardware component (e.g., a decoder or a processor) according to an embodiment. Further, the decoded picture buffer 250 may be implemented by one hardware component (for example, a memory or a digital storage medium) according to an embodiment. Further, the memory 250 may include the DPB 175 and may be configured by the digital storage medium.

When a bitstream including video/image information is inputted, the decoding apparatus 200 may reconstruct an image to correspond to the process in which the video/image information is processed in the encoding apparatus 100 of FIG. 2. For example, the decoding apparatus 200 may perform decoding by using a processing unit applied in the encoding apparatus 100. Accordingly, the processing unit while decoding may be, for example, a coding unit and the coding unit may be partitioned from a coding tree unit or a largest coding unit according to a quadtree structure and/or binary-tree structure. In addition, a reconstructed image signal decoded and outputted by the decoding apparatus 200 may be reproduced by a reproduction apparatus.

The decoding apparatus 200 may receive a signal outputted from the encoding apparatus 100 of FIG. 1 in the form of the bitstream and the received signal may be decoded by the entropy decoding unit 210. For example, the entropy decoding unit 210 may derive information (e.g., video/image information) required for image reconstruction (or picture reconstruction) by parsing the bitstream. For example, the entropy decoding unit 210 may decode information in the bitstream based on a coding method such as exponential Golomb coding, CAVLC, or CABAC and output a value of a syntax element required for the image reconstruction and quantized values of transform coefficients for residual. More specifically, in a CABAC entropy decoding method, a bin corresponding to each syntax element is received in the bitstream, a context model is determined by using decoding target syntax element information and decoding information of the neighboring block and the decoding target block or information on a symbol/bin decoded in a previous step, and arithmetic decoding of the bin is performed by predicting a generation probability of the bin according to the determined context model to generate a symbol corresponding to the value of each syntax element. In this case, in a CABAC entropy decoding method, after the context model is determined, the context model may be updated by using the information of the decoded symbol/bin for a context model of a next symbol/bin. Information on prediction among the information decoded by the entropy decoding unit 210 may be provided to the prediction unit (the inter-prediction unit 260 and the intra-prediction unit 265) and a residual value subject to entropy decoding by the entropy decoding unit 210, i.e., the quantized transform coefficients and related parameter information may be input into the dequantization unit 220. Further, the information on the filtering among the information decoded by the entropy decoding unit 210 may be provided to the filtering unit 240. Meanwhile, a receiver (not illustrated) receiving the signal outputted from the encoding apparatus 100 may be further configured as an internal/external element of the decoding apparatus 200 or the receiver may be a component of the entropy decoding unit 210.

The dequantization unit 220 dequantizes the quantized transform coefficients to output the transform coefficients. The dequantization unit 220 may rearrange the quantized transform coefficients in a 2-dimensional block type. In this case, the rearrangement may be performed based on a coefficient scan order performed by the encoding apparatus 100. The dequantization unit 220 may dequantize the quantized transform coefficients by using a quantization parameter (e.g., quantization step size information) and obtain the transform coefficients.

The inverse transform unit 230 may output a residual signal (residual block or residual sample array) by applying the inverse transform to the transform coefficient.

The prediction unit may perform prediction for the current block and generate a predicted block including prediction samples for the current block. The prediction unit may determine whether the intra prediction or the inter prediction is applied to the current block based on the information on the prediction output from the entropy decoding unit 210 and determine a specific intra/inter-prediction mode.

The intra-prediction unit 265 may predict the current block by referring to samples in the current picture. The referred samples may be positioned in a neighbor of the current block or positioned apart from the current block according to the prediction mode. In the intra prediction, the prediction modes may include a plurality of non-directional modes and a plurality of directional modes. The intra-prediction unit 265 may determine the prediction mode applied to the current block by using the prediction mode applied to the neighboring block.

The inter-prediction unit 260 may derive a prediction block for the current block based on a reference block (reference sample array) specified by a motion vector on the reference picture. In this case, in order to reduce an amount of motion information transmitted in the inter-prediction mode, the motion information may be predicted in units of a block, a subblock, or a sample based on a correlation of the motion information between the neighboring block and the current block. The motion information may include the motion vector and the reference picture index. The motion information may further include information on an inter-prediction direction (L0 prediction, L1 prediction, Bi prediction, etc.). In the case of the inter prediction, the neighboring block may include a spatial neighboring block which is present in the current picture and a temporal neighboring block which is present in the reference picture. For example, the inter-prediction unit 260 may configure a motion information candidate list based on the neighboring blocks and derive the motion vector and/or the reference picture index of the current block based on received candidate selection information. The inter prediction may be performed based on various prediction modes and the information on the prediction may include information indicating the mode of the inter prediction for the current block.

The addition unit 235 adds the obtained residual signal to a predicted signal (a prediction block or a predicted sample array) output from the inter-prediction unit 260 or the intra-prediction unit 265 to generate a reconstructed signal (a reconstructed picture, a reconstructed block, or a reconstructed sample array). Like the case of applying the skip mode, when there is no residual for the processing target block, the prediction block may be used as the reconstructed block.

The addition unit 235 may be referred to as a reconstruction unit or a reconstructed block generation unit. The generated reconstructed signal may be used for intra prediction of a next processing target block in the current picture and used for inter prediction of a next picture through a filtering as described below.

The filtering unit 240 may enhance a subjective/objective image quality by applying filtering to the reconstructed signal. For example, the filtering unit 240 may generate a modified reconstructed picture by applying various filtering methods to the reconstructed picture and transmit the modified reconstructed picture to the decoded picture buffer 250. The various filtering methods may include, for example, deblocking filtering, a sample adaptive offset (SAO), an adaptive loop filter, a bilateral filter (ALF), and the like.

The inter-prediction unit 260 may use the modified reconstructed picture transmitted to the decoded picture buffer 250 as the reference picture.

In the present disclosure, the embodiments described in the filtering unit 160, the inter-prediction unit 180, and the intra-prediction unit 185 of the encoding apparatus 100 may be applied to be similar to or correspond even to the filtering unit 240, the inter-prediction unit 260, and the intra-prediction unit 265 of the decoding apparatus 200, respectively.

FIG. 4 is a structural diagram of a content streaming system according to an embodiment of the present disclosure.

The content streaming system to which the present disclosure is applied may generally include an encoding server 410, a streaming server 420, a web server 430, a media storage 440. a user device 450, and a multimedia input device 460.

The encoding server 410 compresses contents input from multimedia input devices including a smartphone, a camera, a camcorder, etc., into digital data to serve to generate the bitstream and transmit the bitstream to the streaming server 420. As another example, when the multimedia input devices 460 including the smartphone, the camera, the camcorder, etc., directly generate the bitstream, the encoding server 410 may be omitted.

The bitstream may be generated by the encoding method or the bitstream generating method to which the present disclosure is applied and the streaming server 420 may temporarily store the bitstream in the process of transmitting or receiving the bitstream.

The streaming server 420 transmits, to the user device 450, multimedia data based on a user request through the web server 430 and the web server 430 serves as a mediator that informs a user which service exists. When the user requests a desired service to the web server 430, the web server 430 transfers the service to the streaming server 420 and the streaming server 420 transmits the multimedia data to the user. In this case, the content streaming system may include a separate control server and in this case, the control server serves to control a command/response between respective devices in the content streaming system.

The streaming server 420 may receive contents from the media storage 440 and/or the encoding server 410. For example, the streaming server 420 may receive, from the encoding server 410, the contents in real time. In this case, the streaming server 420 may store the bitstream for a predetermined time in order to provide a smooth streaming service.

For example, the user device 450 may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch or a smart glass, a head mounted display (HMD), a digital TV, a desktop computer, and a digital signage.

Each server in the content streaming system may be operated as a distributed server and in this case, data received by each server may be distributed and processed.

Block Partitioning

A video/image coding method according to the present disclosure may be performed based on various detailed technologies and respective detailed technologies are schematically described below. It is apparent to those skilled in the art that technologies described below may be associated with related procedures including prediction, residual processing (transform, quantization, etc.), syntax element coding, filtering, partitioning/dividing, and the like in a video/image encoding/decoding procedure described above and/or below.

Respective pictures constituting video data may be divided into a sequence of coding tree units (CTUs). The CTU may correspond to a coding tree block (CTB). Further, the CTU may include a coding tree block of luma samples and two coding tree blocks of the chroma samples corresponding to the luma samples. In other words, in respect to a picture including three sample arrays, the CTU may include an N×N block of the luma samples and two corresponding blocks of the chroma samples.

FIG. 5 illustrates one example of multi-type tree split modes according to an embodiment of the present disclosure.

The CTU may be split into CUs based on a quad-tree (QT) structure. The quadtree structure may be referred to as a quaternary tree structure. This is to reflect various local characteristics. Meanwhile, in the present disclosure, the CTU may be split based on the multi-type tree structure including binary-tree (BT) and ternary-tree (TT) in addition to quadtree.

Four splitting types illustrated in FIG. 5 may include vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).

A leaf node of the multi-type tree structure may correspond to the CU. Prediction and transform procedures may be performed for each of the CUs. In the present disclosure, in general, the CU, the PU, and the TU may have the same block size. However, when a maximum supported transform length is smaller than a width or height of a color component of the CU, the CU and the TU may have different block sizes.

In another example, the CU may be split by a different method from the QT structure, the BT structure, or the TT structure. In other words, unlike a case where the CU of a lower depth is split into ¼ size of the CU of an upper depth according to the QT structure, the CU of the lower depth is split into ½ size of the CU of the upper depth according to the BT structure, or the CU of the lower depth is split into ¼ or ½ size of the CU of the upper depth according to the TT structure, the CU of the lower depth may be split into ⅕, ⅓, ⅜, ⅗, ⅔, or ⅝ size of the CU of the upper depth and the method for splitting the CU is not limited thereto.

Prediction

In order to reconstruct a current processing unit in which decoding is performed, decoded parts of a current picture or other pictures including the current processing unit may be used.

A picture (slice) using only the current picture for reconstruction, i.e., performing only the intra prediction may be referred to as an intra picture or an I-picture (I-slice), a picture (slice) using one motion vector and one reference index in order to predict each unit may be referred to as a predictive picture or P-picture (P-slice), and a picture (slice) using two or more motion vectors and reference indexes may be referred to as a bi-predictive picture or B-picture (B-slice).

The inter prediction means a prediction method of deriving a sample value of the current block based on data elements (e.g., the sample value or motion vector) of pictures other than the current picture. In other words, the intra prediction means a method for predicting the sample value of the current block by referring to reconstructed regions in other reconstructed pictures other than the current picture.

Hereinafter, the intra prediction (or in-screen prediction) will be described in more detail.

Intra Prediction (or In-Screen Prediction)

The intra prediction means a prediction method that derives the sample value of the current block from a data element (e.g., a sample value, etc.) of the same decoded picture (or slice). In other words, the intra prediction means a method for predicting the sample value of the current block by referring to reconstructed regions in the current picture.

The intra prediction may represent prediction of generating a prediction sample for the current block based on a reference sample outside the current block in a picture (hereinafter, referred to as the current picture) to which the current block belongs.

In embodiments of the present disclosure, a detailed technique of the prediction method described in FIGS. 2 and 3 above is described and the embodiment of the present disclosure may correspond to an intra prediction based video/image encoding method of FIG. 11 and the intra prediction unit 185 in an encoding apparatus 100 of FIG. 7 to be described below. Furthermore, an embodiment of the present disclosure may correspond to an intra prediction based video/image decoding method of FIG. 8 and an apparatus of an intra prediction unit 265 in the decoding apparatus 200 of FIG. 9 to be described below. Data encoded by FIGS. 11 and 13 may be stored in a memory included in the encoding apparatus 100 or the decoding apparatus 200 in the form of a bitstream, or a memory functionally coupled to the encoding apparatus 100 or the decoding apparatus 200.

When the intra prediction is applied to the current block, neighboring reference samples to be used for the intra prediction of the current block may be derived. The neighboring reference samples of the current block may include a sample adjacent to a left boundary of the current block having a size of nW×nH and a total of 2×nH samples adjacent to a bottom left side, a sample adjacent to an upper boundary of the current block, and a total of 2×nW adjacent to a top right side, and one sample adjacent to a top left side of the current block. Alternatively, the neighboring reference samples of the current block may include a plurality of columns of upper neighboring samples of a plurality of rows of left neighboring samples. Furthermore, the neighboring reference samples of the current block may include samples located on left or right vertical lines and upper or lower horizontal lines adjacent to the current block.

However, some of the neighboring reference samples of the current block may not yet be decoded or may not be available. In this case, the decoding apparatus 200 may configure the neighboring reference samples to be used for the prediction by substituting samples which are not available as the available samples. Alternatively, the neighboring reference samples to be used for the prediction may be configured through interpolation of the available samples. For example, samples located on a vertical line adjacent to the right side of the current block and samples located on a horizontal line adjacent to the lower side of the current block may be substituted based on samples located on the left vertical line of the current block and samples located on the upper horizontal line of the current block or configured through the interpolation.

When the neighboring reference samples are derived, i) prediction samples may be derived based on an average or interpolation of the neighboring reference samples of the current block, and ii) the prediction sample may be derived based on a reference sample which exists in a specific (prediction) direction for the prediction sample among the neighboring reference samples of the current block. A prediction mode such as i) may be referred to as a non-directional prediction mode or a non-angular prediction mode, and a prediction mode such as ii) may be referred to as a directional prediction mode or an angular prediction mode. In addition, the prediction sample may be generated through interpolation of a first neighboring sample located in the prediction direction of the intra prediction mode of the current block and a second neighboring sample located in an opposite direction to the prediction direction based on the prediction sample of the current block. As such, a prediction technique based on linear interpolation between the reference samples located in the prediction direction and the opposite direction to the prediction direction based on the prediction sample of the current block may be referred to as linear interpolation intra prediction (LIP). Furthermore, a temporary prediction sample of the current block may be derived based on filtered neighboring reference samples, and the prediction sample of the current block may be derived through a weighted sum of at least one reference sample derived according to the intra prediction mode among the conventional neighboring reference samples, i.e., the filtered neighboring reference samples and temporary prediction samples. Prediction through the weighted sum of a plurality of samples may be referred to as position dependent intra prediction combination (PDPC).

Meanwhile, post-filtering may be performed on the derived prediction sample as necessary. Specifically, an intra prediction procedure may include an intra prediction mode determining step, a neighboring reference sample deriving step, an intra prediction mode based prediction sample deriving step, and may include a post-processing filtering step for the derived prediction sample as necessary.

A video encoding procedure based on the intra prediction and an intra prediction unit 185 in the encoding apparatus 100 may be expressed as illustrated in FIGS. 6 and 7.

FIGS. 6 and 7 illustrate an intra prediction based video encoding method according to an embodiment of the present disclosure and an example of the intra prediction unit 185 in the encoding apparatus 100 according to an embodiment of the present disclosure.

In FIG. 6, step S610 may be performed by the intra prediction unit 185 of the encoding apparatus 100, and steps S620 and S630 may be performed by a residual processing unit. Specifically, step S620 may be performed by a subtraction unit 115 of the encoding apparatus 100, and step S630 is performed by an entropy encoding unit 190 using residual information derived by the residual processing unit and prediction information derived by the intra prediction unit 185. The residual information as information on residual samples may include information on quantized transform coefficients for the residual samples.

As described above, the residual samples may be derived as transform coefficients by the transform unit 120 of the encoding apparatus 100 and the derived transform coefficients may be derived as transform coefficients quantized by the quantization unit 130. Information on the quantized transform coefficients may be encoded by the entropy encoding unit 190 through a residual coding procedure.

In step S610, the encoding apparatus 100 may perform intra prediction for the current block. The encoding apparatus 100 determines the intra prediction mode for the current block, derives the neighboring reference samples of the current block, and generates the prediction samples in the current block based on the intra prediction mode and the neighboring reference samples. Here, the determination procedure of the intra prediction mode, the derivation procedure of the neighboring reference sample, and the generation procedure of the prediction samples may be simultaneously performed or sequentially performed. For example, the intra prediction unit 100 of the encoding apparatus 100 may include a prediction mode determination unit 186, a reference sample derivation unit 187, and a prediction sample generation unit 188, and the prediction mode determination unit 186 may determine the prediction mode for the current block, the reference sample derivation unit 187 may derive the neighboring reference sample of the current block, and the prediction sample generation unit 188 may derive motion samples of the current block. Meanwhile, although not illustrated, when a prediction sample filtering procedure to be described below is performed, the intra prediction unit 185 may further include a prediction sample filter unit (not illustrated). The encoding apparatus 100 may determine a prediction mode to be applied to the current block among a plurality of intra prediction modes. The encoding apparatus 100 may compare rate-distortion cost (RD cost) for the intra prediction modes and determine an optimal intra prediction mode for the current block.

Meanwhile, the encoding apparatus 100 may perform filtering for the prediction sample. The filtering for the prediction sample may be called post filtering. Filtering for some or all of the prediction samples may be performed by the prediction sample filtering procedure. In some cases, the prediction sample filtering may be omitted.

In step S620, the encoding apparatus 100 may generate the residual sample for the current block based on the (filtered) prediction sample. Thereafter, in step S630, the encoding apparatus 100 may encode video data including prediction mode information including the intra prediction mode and information on the residual samples. The encoded video data may be output in the form of a bitstream. The outputted bitstream may be transferred to the decoding apparatus 200 via a storage medium or a network.

Meanwhile, the encoding apparatus 100 described above may generate a reconstructed picture including reconstructed samples and reconstructed blocks based on the reference samples and the residual samples. The derivation of the reconstructed picture by the encoding apparatus 100 is to derive the same prediction result as being performed by the decoding apparatus 200 by the encoding apparatus 100, thereby increasing coding efficiency. Moreover, a subsequent procedure such as in-loop filtering may be performed for the reconstructed picture.

FIGS. 8 and 9 illustrate an intra prediction based video/image decoding method according to an embodiment of the present disclosure and an example of an intra prediction unit 265 in a decoding apparatus 200 according to an embodiment of the present disclosure.

Referring to FIGS. 8 and 9, the decoding apparatus 200 may perform an operation corresponding to the operation performed by the encoding apparatus 100. The decoding apparatus 200 may derive the prediction sample by performing prediction for the current block based on the received prediction information.

Specifically, in step S810, the decoding apparatus 200 may determine the intra prediction mode for the current block based on the prediction mode information obtained from the encoding apparatus 100. In step S820, the decoding apparatus 200 may derive the neighboring reference sample of the current block. In step S830, the decoding apparatus 200 may generate the prediction sample in the current block based on the intra prediction mode and the neighboring reference samples. Furthermore, the decoding apparatus 200 may perform the prediction sample filtering procedure, and the prediction sample filtering procedure may be referred to as post filtering. Some or all of the prediction samples may be filtered by the prediction sample filtering procedure. In some cases, the prediction sample filtering procedure may be omitted.

In step S840, the decoding apparatus 200 may generate the residual sample based on the residual information obtained from the encoding apparatus 100. In step S8050, the decoding apparatus 200 may generate the reconstructed sample for the current block based on the (filtered) prediction samples and the residual samples and generate the reconstructed picture using the generated reconstructed samples.

Here, the intra prediction unit 265 of the decoding apparatus 200 may include a prediction mode determination unit 266, a reference sample derivation unit 267, and a prediction sample generation unit 268, and the prediction mode determination unit 266 may determine the intra prediction mode of current block based on the prediction mode generated by the prediction mode determination unit 186 of the encoding apparatus 100, the reference sample derivation unit 267 may derive the neighboring reference sample of the current block, and the prediction sample generation unit 268 may derive the prediction sample of the current block. Meanwhile, although not illustrated, when the prediction sample filtering procedure is performed, the intra prediction unit 265 may further include a prediction sample filter unit (not illustrated).

The prediction mode information used for the prediction may include a flag (e.g., prev_intra_luma_pred_flag) indicating whether a most probable mode (MPM) is applied to the current block or the remaining mode is applied. When the MPM is applied to the current block, the prediction mode information may further include an index (mpm_idx) indicating one of intra prediction mode candidates (MPM candidates). The intra prediction mode candidates (MPM candidates) may be configured as an MPM candidate list or an MPM list. Furthermore, when the MPM is not applied to the current block, the prediction mode information may further include remaining mode information (e.g., rem_inra_luma_pred_mode) indicating one of the remaining intra prediction modes other than the intra prediction mode candidates (MPM candidates).

Meanwhile, the decoding apparatus 200 may determine the intra prediction mode of the current block based on the prediction information. The prediction mode information may be encoded/decoded through a coding method to be described below. For example, the prediction mode information may be encoded or decoded through entropy coding (e.g., CABAC, CAVLC) based on a truncated binary code.

FIGS. 10 and 11 illustrate examples of a prediction direction of an intra prediction mode according to an embodiment of the present disclosure.

Referring to FIG. 10, the intra prediction mode may include 2 non-directional intra prediction modes and 33 intra directional prediction modes. The non-directional intra prediction modes may include a planar intra prediction mode and a DC intra prediction mode, and the directional intra prediction mode may include intra prediction modes #2 to #34. The planar intra prediction mode may be referred to as a planner mode, and the DC intra prediction mode may be referred to as a DC mode.

Meanwhile, in order to capture an arbitrary edge direction presented in a natural video, the directional intra prediction mode may include 33 to 65 directional intra prediction modes of FIG. 10 as illustrated in FIG. 10. In FIG. 11, the non-directional intra prediction modes may include a planar mode and a DC mode, and the directional intra prediction modes may include intra prediction modes #2 to #66. As illustrated in FIG. 11, extended directional intra prediction may be applied to blocks of all sizes, and may be applied to both a luma component and a chroma component.

Furthermore, the intra prediction mode may be 2 non-directional intra prediction modes and 129 intra directional prediction modes. Here, the non-directional intra prediction modes may include a planar mode and a DC mode, and the directional intra prediction mode may include intra prediction modes #2 to #130.

FIGS. 12 and 13 schematic block diagrams of a transform unit and a quantization unit 120/130 and a dequantization unit and an inverse transform unit 140/150 in an encoding apparatus according to an embodiment of the present disclosure, and FIG. 13 is a schematic block diagram of a dequantization unit and an inverse transform unit 220/230 in a decoding apparatus.

Referring to FIG. 12 above, the transform unit and the quantization unit 120/130 may include a primary transform unit 121, a secondary transform unit 122, and a quantization unit 130. The dequantization unit and the inverse transform unit 140/150 may include a dequantization unit 140, an inverse secondary transform unit 151, and an inverse primary transform unit 152.

Referring to FIG. 13, the dequantization unit and the inverse transform unit 220/230 may include a dequantization unit 220, an inverse secondary transform unit 231, and an inverse primary transform unit 232.

In the present disclosure, when the transform is performed, the transform may be performed through a plurality of steps. For example, two steps of the primary transform and the secondary transform may be applied as illustrated in FIG. 12 or more transform steps may be used according to an algorithm. Here, the primary transform may also be referred to as a core transform.

The primary transform unit 121 may apply the primary transform to the residual signal and here, the primary transform may be predefined as a table in the encoder and/or the decoder.

Further, in the case of the primary transform, combinations of various transform types (DCT-2, DST-7, and DCT-8) of the MTS may also be used. For example, as in the tables illustrated in FIGS. 14A and 14B, the transform type may be determined.

The secondary transform unit 122 may apply the secondary transform to the primary transformed signal, and here, the secondary transform may be predefined as a table in the encoder and/or the decoder.

In an embodiment, as the secondary transform, a non-separable secondary transform (NSST) may be conditionally applied. For example, the NSST may be applied only to a block to which the in-screen prediction is applied, and an applicable transform set may be configured every prediction mode group.

In this case, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may include two transforms. In respect to the remaining direction modes, each transform set may include three transforms.

The quantization unit 130 may perform quantization on a secondary-transformed signal.

The inverse quantization unit and the inverse transform unit 140/150 inversely perform the aforementioned process, and a redundant description thereof is omitted.

FIG. 13 is a schematic block diagram of the dequantization unit and the inverse transform unit 220/230 in the decoding apparatus 200.

Referring to FIG. 13, the dequantization unit and the inverse transform unit 220/230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the obtained transform coefficient. Here, the inverse secondary transform represents an inverse transform of the secondary transform described in FIG. 12.

The inverse primary transform unit 232 performs an inverse primary transform for the inverse secondary transformed signal (or block) and obtains the residual signal. Here, the inverse primary transform represents an inverse transform of the primary transform to be described in FIG. 12.

In an embodiment, in the case of the primary transform, combinations of various transform types (DCT-2, DST-7, and DCT-8) of the MTS may also be used. For example, as in the tables illustrated in FIGS. 14A and 14B, the transform type may be determined.

FIGS. 14A and 14B illustrate an example of a table for determining a transform type for a horizontal direction and a vertical direction for each prediction mode according to an embodiment of the present disclosure. FIG. 14A illustrates an example of a table for determining a transform type for a horizontal/vertical direction in the intra prediction mode and FIG. 14B illustrates an example of a table for determining the transform type for the horizontal/vertical direction in the inter prediction mode. FIGS. 14A and 14B as examples of combination tables for determining the transform type illustrate MTS combinations applied to joint exploration model (JEM) and another combination may also be used. For example, the table of FIG. 14B may be used for both the intra prediction and the inter prediction. Hereinafter, an example applied to the JEM will be primarily described with reference to FIGS. 14A and 14B.

In the JEM, a syntax element EMT_CU_flag (or MTS_CU_flag) is introduced, and as a result, application of the MTS may be turned on/off by the block unit (by the CU unit in the case of HEVC). In other words, when MTS_CU_flag is 0 in the intra prediction mode, DCT-2 or DST-7 (for the 4×4 block) in legacy high efficiency video coding (HEVC) and when MTS_CU_flag is 1, an MTS combination presented in FIG. 14A is used. An available MTS combination may vary depending on the intra prediction mode as illustrated in FIG. 14A. For example, DST-7 and DCT-5 are used in the horizontal direction and DST-7 and DCT-8 are used in the vertical direction with respect to modes 14, 15, 16, 17, 18, 19, 20, 21, and 22, and as a result, a total of four available combinations are permitted. Therefore, signaling of information on which combination among four combinations is required. One of four combinations is selected through 2-bit MTS_TU_index. FIG. 14B illustrates an MTS combination applicable in the inter prediction mode and unlike FIG. 14A, a combination possible only by DST-7 and DCT-8 is determined. According to an embodiment of the present disclosure, EMT_CU_flag may be used instead of MTS_CU_flag. For example, when the intra prediction mode is applied, Set 2 of FIG. 14A may be used and when inter prediction mode is applied, FIG. 14B may be used.

FIG. 15 is a flowchart showing an encoding process in which the MTS is performed according to an embodiment of the present disclosure.

In the present disclosure, an embodiment in which transforms are separately applied to the horizontal direction and the vertical direction is basically described, but the transform combination may be constituted even by non-separable transforms.

Alternatively, the transform combination may be constituted even by a mixture of separable transforms and non-separable transforms. In this case, when the non-separable transform is used, row/column transform selection or horizontal/vertical direction selection may not be required and only when the separable transform is selected, the transform combinations of FIG. 14A or 14B may be used.

Further, schemes proposed in the present disclosure may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for initially transforming a residual block and the secondary transform may mean a transform for applying the transform to a block generated as a result of the primary transform. According to an embodiment of the present disclosure, when the size of the transform block is equal to or greater than 4×4, the secondary transform may be applied to the top-left 4×4 or 8×8 region of the transform block according to the width and the height of the transform block. In the present disclosure, a case where the size of the block is equal to or greater than M×N refers to a case where a row (horizontal) length of the block is equal to or greater than M and a column (vertical) length is equal to or greater than N.

First, the encoding apparatus 100 may determine the transform configuration group corresponding to the current block (S1510). Here, the transform configuration group may be constituted by the combinations illustrated in FIGS. 14A and 14B above.

The encoding apparatus 100 may perform a transform for candidate transform combinations available in the transform configuration group (S1520).

According to a result of performing the transform, the encoding apparatus 100 may determine or select a transform combination having smallest rate distortion (RD) cost (S1530).

The encoding apparatus 100 may encode a transform combination index corresponding to the selected transform combination (S1540).

FIG. 16 is a flowchart showing a decoding process in which the MTS is performed according to an embodiment of the present disclosure.

First, the decoding apparatus 200 may determine the transform configuration group for the current block (S1610). The decoding apparatus may parse (or obtain) a transform combination index from a video signal and here, the transform combination index may correspond to any one of a plurality of transform combinations in the transform configuration group (S1620). For example, the transform configuration group may include DCT-2, DST-7, or DCT-8. The transform combination index may be referred to as the MTS index. As an embodiment, the transform configuration group may be configured based on at least one of a prediction mode, a block size, or a block shape of the current block.

The decoding apparatus 200 may derive the transform combination corresponding to the transform combination index (S1630). Here, the transform combination may be constituted by the horizontal transform and the vertical transform, and may include at least one of the DCT-2, the DST-7 or the DCT-8. Further, the transform combination may adopt the transform combination described in FIG. 14A or 14B. That is, the transform combination may also be configured by other transform combinations depending on other embodiments in the present disclosure.

The decoding apparatus 200 may perform the inverse transform for the current block based on the derived transform combination (S1640). When the transform combination is constituted by a row (horizontal) transform and a column (vertical) transform, the row (horizontal) transform may be first applied and then the column (vertical) transform may be applied. However, an embodiment of the present disclosure is not limited thereto and the transform order may be reversely applied or when the transform combination is constituted by non-separable transforms, the non-separable transform may be immediately applied.

In an embodiment, when the vertical transform or the horizontal transform is the DST-7 or the DCT-8, the decoding apparatus 200 may apply the inverse transform of the DST-7 or the inverse transform of the DCT-8 to each column and then apply the inverse transform of the DST-7 or the inverse transform of the DCT-8 to each row. Further, in respect to the vertical transform or the horizontal transform, different transform may be applied to each row and/or to each column.

In an embodiment, the transform combination index may be obtained based on the MTS flag indicating whether the MTS is performed. That is, the transform combination index may be obtained only when the MTS is performed according to the MTS flag. Further, the decoding apparatus 200 may check whether the number of non-zero coefficients is greater than a threshold. In this case, the transform combination index may be obtained only when the number of non-zero transform coefficients is greater than the threshold.

In an embodiment, the MTS flag or the MTS index may be defined in at least one level of the sequence, the picture, the slice, the block, the coding unit, the transform unit, or the prediction unit.

In an embodiment, the inverse transform may be applied only when both a width and a height of the transform block are equal to or smaller than 32.

On the other hand, as another embodiment, a process of determining the transform configuration group and a process of parsing the transform combination index may be performed at the same time. Alternatively, step S1610 is preconfigured in the encoding apparatus 100 and/or the decoder 200, so step S1610 may be omitted.

FIG. 17 is a flowchart for describing a process of encoding an MTS flag and an MTS index according to an embodiment of the present disclosure.

The encoding apparatus 100 may determine whether the MTS is applied to the current block (S1710).

When the MTS is applied, the encoding apparatus 100 may encode the MTS flag to 1 (S1720).

In addition, the encoding apparatus 100 may determine the MTS index based on at least one of the prediction mode, the horizontal transform, and the vertical transform of the current block (S1730). Here, the MTS index may mean an index indicating any one of the plurality of transform combinations for each intra prediction mode and the MTS index may be transmitted every transform block.

When the MTS index is determined, the encoding apparatus 100 may encode the MTS index determined in step S1730 (S1740).

Meanwhile, when the MTS is not applied, the encoding apparatus 100 may encode the MTS flag to 0 (S1750).

FIG. 18 is a flowchart for describing a decoding process of applying a horizontal transform or a vertical transform to a row or a column based on the MTS flag and the MTS index according to an embodiment of the present disclosure.

The decoding apparatus 200 may parse the MTS flag from the bitstream (S1810). Here, the MTS flag may indicate whether the MTS flag is applied to the current block.

The decoding apparatus 200 may check whether the MTS is applied to the current block based on the MTS flag (S1820). For example, the decoding apparatus 200 may check whether the MTS flag is 1.

When the MTS flag is 1, the decoding apparatus 200 may check whether the number of non-zero transform coefficients is greater than (or equal to or greater than) a threshold (S1830). For example, the threshold for the transform may be set to 2, which may be set differently based on the block size or the size of the transform block.

When the number of non-zero transform coefficients is greater than the threshold, the decoding apparatus 200 may parse the MTS index (S1840). Here, the MTS index means an index indicating any one of a plurality of transform combinations for each intra prediction mode or inter prediction mode. The MTS index may be transmitted every transform block. Further, the MTS index may mean an index indicating any one transform combination defined in a preconfigured transform combination table and here, the preconfigured transform combination table may be configured in FIG. 14A or 14B above, but an embodiment of the present disclosure is not limited thereto.

The decoding apparatus 200 may derive or determine the horizontal transform and the vertical transform based on at least one of the MTS index and the prediction mode (S1850). Further, the decoding apparatus 200 may derive the transform combination corresponding to the MTS index. For example, the decoding apparatus 200 may derive or determine the horizontal transform and the vertical transform corresponding to the MTS index.

Meanwhile, when the number of non-zero transform coefficients is not greater than a threshold, the decoding apparatus 200 may apply a preconfigured vertical inverse transform every column (S1860). For example, the vertical inverse transform may be an inverse transform of DST-7. Further, the vertical inverse transform may be an inverse transform of DCT-8.

In addition, the decoding apparatus 200 may apply a preconfigured horizontal inverse transform every row (S1870). For example, the horizontal inverse transform may be an inverse transform of DST-7. Further, the horizontal inverse transform may be an inverse transform of DCT-8.

That is, when the number of non-zero transform coefficients is not greater than the threshold, a transform type preconfigured by the encoding apparatus 100 or the decoding apparatus 200 may be used. For example, a transform type (e.g., DCT-2, etc.) that is not defined in the transform combination table illustrated in FIG. 14A or 14B, but is widely used, may be used.

Meanwhile, when the MTS flag is 0, the decoding apparatus 200 may apply the preconfigured vertical inverse transform every column (S1880). For example, the vertical inverse transform may be an inverse transform of DCT-2.

In addition, the decoding apparatus 200 may apply the preconfigured horizontal inverse transform every row (S1890). For example, the horizontal inverse transform may be an inverse transform of DCT-2. That is, when the MTS flag is 0, the transform type preconfigured in the encoder or decoder may be used. For example, the transform type that is not defined in the transform combination table illustrated in FIG. 14A or 14B, but is widely used may be used.

FIG. 19 is a flowchart of performing an inverse transform based on a transform related parameter according to an embodiment of the present disclosure.

The decoding apparatus 200 to which an embodiment of the present disclosure is applied may acquire sps_mts_intra_enabled_flag or sps_mts_inter_enabled_flag (S1910). Here, sps_mts_intra_enabled_flag indicates whether tu_mts_flag is present in a syntax (residual coding syntax) for encoding a residual signal of a coding unit (intra coding unit) to which intra prediction is applied. For example, when sps_mts_intra_enabled_flag=0, tu_mts_flag is not present in the syntax for encoding the residual signal of the coding unit to which the intra prediction is applied and when sps_mts_intra_enabled_flag=1, tu_mts_flag is present in the syntax for encoding the residual signal of the coding unit to which the intra prediction is applied. In addition, sps_mts_inter_enabled_flag indicates whether tu_mts_flag is present in a syntax (residual coding syntax) for encoding a residual signal of a coding unit (inter coding unit) to which inter prediction is applied. For example, when sps_mts_inter_enabled_flag=0, tu_mts_flag is not present in the syntax for encoding the residual signal of the coding unit to which the inter prediction is applied and when sps_mts_inter_enabled_flag=1, tu_mts_flag is present in the syntax for encoding the residual signal of the coding unit to which the inter prediction is applied.

The decoding apparatus 200 may obtain tu_mts_flag based on sps_mts_intra_enabled_flag or sps_mts_inter_enabled_flag (S1920). For example, when sps_mts_intra_enabled_flag=1 or sps_mts_inter_enabled_flag=1, the decoding apparatus 200 may obtain tu_mts_flag. Here, tu_mts_flag indicates whether the MTS is applied to a residual sample of a luma transform block (luma transform unit). For example, when tu_mts_flag=0, the MTS is not applied to the residual sample of the luma transform block and when tu_mts_flag=1, the MTS is applied to the residual sample of the luma transform block. At least one of the embodiments described in the present disclosure may be applied to tu_mts_flag=1.

The decoding apparatus 200 may obtain mts_idx based on tu_mts_flag (S1930). For example, when tu_mts_flag=1, the decoder may obtain mts_idx. Here, mts_idx indicates which transform kernel is applied to luma residual samples along the horizontal and/or vertical direction of a current transform block. For example, at least one of the embodiments of the present disclosure may be applied to mts_idx. As a specific example, at least one of the embodiments of FIG. 14A or 14B above may be applied.

The decoding apparatus 200 may derive a transform kernel corresponding to mts_idx (S1940). For example, the transform kernel corresponding to mts_idx may be divided into the horizontal transform and the vertical transform, and defined.

As another example, different transform kernels may be applied to the horizontal transform and the vertical transform. However, an embodiment of the present disclosure is not limited thereto, and the same transform kernel may be applied to the horizontal transform and the vertical transform.

In an embodiment, mts_idx may be defined as shown in Table 1 below.

TABLE 1

| mts_idx[x0][y0] | trTypeHor | trTypeVer |
| --- | --- | --- |
| 0 | 0 | 0 |
| 1 | 1 | 1 |
| 2 | 2 | 1 |
| 3 | 1 | 2 |
| 4 | 2 | 2 |

In Table 1, trTypeHor and trTypeVer represent a horizontal-direction transform and a vertical-direction transform, respectively. Further, a transform type corresponding to index #0 may be DCT-2, a transform type corresponding to index #1 may be DST-7 (or DCT-8), and a transform type corresponding to index #2 may be DCT-8 (or DST-7).

In addition, the decoding apparatus 200 may perform the inverse transform based on the transform kernel derived in step S1940 (S1950).

In FIG. 19, an embodiment is primarily described in which tu_mts_flag is obtained to determine whether to apply MTS and mts_idx is obtained according to a tu_mts_flag value which is obtained later to determine the transform kernel, but an embodiment of the present disclosure is not limited thereto. As an example, the decoding apparatus 200 parses mts_idx directly without parsing tu_mts_flag to determine the transform kernel. In this case, Table 1 described above may be used. That is, when the mts_idx value indicates 0, DCT-2 may be applied in the horizontal/vertical direction and when the mts_idx value indicates a value other than 0, DST-7 and/or DCT-8 may be applied according to the mts_idx value.

As another embodiment of the present disclosure, a decoding process of performing the transform process is described.

The decoder 200 may confirm a transform size nTbS. Here, the transform size nTbS may be a variable representing horizontal sample sizes of scaled transform coefficients.

The decoding apparatus 200 may confirm a transform kernel type trType.

Here, the transform kernel type trType may be a variable representing the type of transform kernel and various embodiments of the present disclosure may be applied. The transform kernel type trType may include a horizontal transform kernel type trTypeHor and a vertical transform kernel type trTypeVer.

Referring to Table 1, when the transform kernel type trType is 0, the transform kernel type may represent the DCT2, when the transform kernel type trType is 1, the transform kernel type may represent the DST-7, and when the transform kernel type trType is 2, the transform kernel type may represent the DCT-8.

The decoding apparatus 200 may perform a transform matrix multiplication based on at least one of the transform size nTbS or the transform kernel type.

For another example, when the transform kernel type is 1 and the transform size is 4, a previously determined transform matrix 1 may be applied when a transform matrix multiplication is performed.

For another example, when the transform kernel type is 1 and the transform size is 8, a previously determined transform matrix 2 may be applied when a transform matrix multiplication is performed.

For another example, when the transform kernel type is 1 and the transform size is 16, a previously determined transform matrix 3 may be applied when a transform matrix multiplication is performed.

For another example, when the transform kernel type is 1 and the transform size is 32, a previously defined transform matrix 4 may be applied.

Likewise, when the transform kernel type is 2 and the transform size is 4, 8, 16, and 32, previously defined transform matrices 5, 6, 7, and 8 may be applied, respectively.

Here, each of the predefined transform matrices (1) to (8) may correspond to any one of various types of transform matrices. As an example, the transform matrix of the type illustrated in FIG. 14A or 14B may be applied.

The decoding apparatus 200 may derive a transform sample based on the transform matrix multiplication.

Each of the above embodiments may be used, but an embodiment of the present disclosure is not limited thereto, and may be used in combination with the above embodiments and other embodiments of the present disclosure.

FIG. 20 is a table showing allocation of a transform set for each intra prediction mode in an NSST according to an embodiment of the present disclosure.

The secondary transform unit 122 may apply the secondary transform to the primary transformed signal, and here, the secondary transform may be predefined as a table in the encoding apparatus 100 and/or the decoding apparatus 200.

In an embodiment, as the secondary transform, the NSST may be conditionally applied. For example, the NSST may be applied only to the intra prediction block and may have a transform set applicable to each prediction mode group.

According to an embodiment of the present disclosure, when the size of the transform block is equal to or greater than 4×4, the NSST may be applied to the top-left 4×4 or 8×8 region of the transform block according to the width and the height of the transform block.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode may have a different transform set and the corresponding transform set may include two transforms. In respect to the remaining directional modes, each transform set may include three transforms. However, an embodiment of the present disclosure is not limited thereto, and each transform set may include a plurality of transforms.

FIG. 21 is a calculation flow diagram for Givens rotation according to an embodiment of the present disclosure.

As an embodiment, the NSST may not be applied to the entire primary transformed block but may be applied only to a top-left 8×8 region. For example, when the block size is 8×8 or more, 8×8 NSST may be applied and when the block size is less than 8×8, 4×4 NSST may be applied and in this case, the block may be divided into 4×4 blocks and then, the 4×4 NSST may be applied to each of the divided blocks. According to an embodiment of the present disclosure, when the size of the transform block is equal to or greater than 4×4, the NSST may be applied only to the top-left 4×4 region of the transform block. As described above, a case where the size of the block is equal to or greater than M×N (M×N or more) refers to a case where a row (horizontal) length of the block is equal to or greater than M and a column (vertical) length is equal to or greater than N. Meanwhile, a case where the size of the block is smaller than M×N (less than M×N) means a case where the row (horizontal) length of the (bock is smaller than M or the column (vertical) length is smaller than N.

As another embodiment, even in the case of 4×N/N×4 (N>=16), the 4×4 NSST may be applied.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 1 below and a matrix product is shown in Equation 2 below.

$$R_\theta = \begin{bmatrix} \cos\theta & -\sin\theta \\ \sin\theta & \cos\theta \end{bmatrix}$$ [Equation 1]

$$t_m = x_m \cos\theta - x_n \sin\theta$$
$$t_n = x_m \sin\theta + x_n \sin\theta$$ [Equation 2]

As illustrated in FIG. 21, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

FIG. 22 illustrates one round configuration in 4×4 NSST constituted by a Givens rotation layer and permutations according to an embodiment of the present disclosure.

Referring to FIG. 22, it is illustrated that four Givens rotation layers are sequentially processed in the case of the 4×4 NSST. As illustrated in FIG. 22, the output data for one Givens rotation layer is transferred as the input data for the next Givens rotation layer through a determined permutation (i.e., shuffling).

As illustrated in FIG. 22, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

Furthermore, according to an embodiment, the NSST may be substituted with a reduced secondary transform (RST) to be described hereinafter.

FIG. 23 is a block diagram for describing operations of a forward reduced transform and an inverse reduced transform according to an embodiment of the present disclosure.

Reduced Secondary Transform (RST)

When it is assumed that an orthogonal matrix representing one transform has an N×N form, a reduced transform (hereinafter, referred to as 'RT') leaves only R transform basis vectors among N transform basis vectors (R<N). A matrix for forward RT generating the transform coefficients is given by Equation 3 below.

$$T_{RxN} = \begin{bmatrix} t_{11} & t_{12} & t_{13} & & t_{1N} \\ & & & \cdots & \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$ [Equation 3]

Since a matrix for an inverse RT becomes a transpose matrix of the forward RT matrix, the application of the forward RT and the inverse RT is illustrated as in FIG. 23.

When a case of applying the RT to the top-left 8×8 block of the transform block which goes through the primary transform is assumed, the RT may be referred to as an 8×8 reduced secondary transform (8×8 RST).

When the R value of Equation 3 is 16, the forward 8×8 RST has a 16×64 matrix form and the inverse 8×8 RST has a 64×16 matrix form.

Further, the transform set configuration illustrated in FIGS. 34A to 37B may be applied to the 8×8 RST. That is, a corresponding 8×8 RST may be applied according to the transform set in FIGS. 34A to 37B.

As an embodiment, when one transform set includes two or three transforms according to the intra prediction mode, one of a maximum of 4 transforms including a case of not applying the secondary transform may be configured to be selected. Here, one transform may be regarded as an identity matrix.

When indexes of 0, 1, 2, and 3 are assigned to four transforms, respectively, a syntax element called an NSST index may be signaled for each transform block, thereby designating a corresponding transform. That is, in the case of the NSST, the 8×8 NSST may be designated for the 8×8 top-left block through the NSST index and the 8×8 RST may be designated in an RST configuration. Further, in this case, index #0 may be allocated to a case where the identity matrix, i.e., the secondary transform is not applied.

When the forward 8×8 RST shown in Equation 3 is applied, 16 valid transform coefficients are generated, and as a result, it may be regarded that 64 input data constituting an 8×8 region are reduced to 16 output data. From the perspective of a two-dimensional region, only a one-quarter region is filled with the valid transform coefficient. Accordingly, a 4×4 top-left region in FIG. 24 may be filled with 16 output data obtained by applying the forward 8×8 RST.

Further, as described above, a low frequency non-separable transform (LFNST) in which the non-separable transform is applied to a low-frequency region (e.g., top-left 4×4 region of the transform block) may be used as the secondary transform.

FIG. 24 is a diagram illustrating a process of performing an inverse scan from $64^{th}$ to $17^{th}$ according to an inverse scan order according to an embodiment of the present disclosure.

FIG. 24 illustrates scanning from the $17^{th}$ coefficient to the $64^{th}$ coefficient when the forward scan order starts from 1 (in the forward scan order). However, FIG. 16 illustrates the inverse scan and this illustrates performing the inverse scanning from the $64^{th}$ coefficient to the $17^{th}$ coefficient.

Referring to FIG. 24, the top-left 4×4 region is a region of interest (ROI) to which the valid transform coefficient is allocated and the remaining region is empty. That is, a value of 0 may be allocated to the remaining region by default.

If there is a valid transform coefficient other than 0 in a region other than the ROI region of FIG. 24, this means that the 8×8 RST is not applied, and as a result, in this case, NSST index coding corresponding thereto may be omitted.

Conversely, if there is no non-zero transform coefficient in the region other than the ROI region of FIG. 24 (if the 8×8 RST is applied, when 0 is allocated to the region other than the ROI), there is a possibility that the 8×8 RST will be applied, and as a result, the NSST index may be coded.

As such, conditional NSST index coding may be performed after the residual coding process because it is necessary to check the existence of the non-zero transform coefficient.

According to an embodiment of the present disclosure, when the size of the transform block is equal to or greater than 4×4, the NSST may be applied to the top-left 4×4 or 8×8 region of the transform block.

FIG. 25 is a flowchart of encoding a video signal through a primary transform and a secondary transform according to an embodiment of the present disclosure.

The encoding apparatus 100 may determine (or select) the forward secondary transform based on at least one of the prediction mode, the block shape, and/or the block size of the current block (S2510). In this case, a candidate of the forward secondary transform may include at least one of the embodiments of FIGS. 34 to 37. Further, according to an embodiment of the present disclosure, the encoding apparatus 100 may determine a forward secondary transform by considering a modified intra prediction mode by applying a wide angle intra prediction mode as described below.

The encoding apparatus 100 may determine an optimal forward secondary transform through Rate Distortion optimization. The optimal forward secondary transform may correspond to one of a plurality of transforms and a transform selected among the plurality of transforms may be indicated by a transform index. For example, for the RD optimization, the encoding apparatus 100 may compare results of performing all of the forward secondary transform, quantization, residual coding, etc., for respective candidates.

The encoding apparatus 100 may signal a secondary transform index corresponding to the optimal forward secondary transform (S2520). Here, the secondary transform index may adopt other embodiments described in the present disclosure.

For example, the secondary transform index may adopt the transform set configuration of FIG. 20. Since one transform set includes two or three transforms according to the intra prediction mode, one of a maximum of four transforms may be configured to be selected in addition to a case of not applying the secondary transform. When indexes of 0, 1, 2, and 3 are assigned to the four transforms, respectively, the encoding apparatus 100 may designate a transform to be applied by signaling the secondary transform index every transform coefficient block. In this case, the encoding apparatus 100 may allocate index #0 to a case where the identity matrix, i.e., the secondary transform is not applied. Further, the secondary transform index may be configured as in an index mapping table for the case where the wide angle intra prediction mode is applied as illustrated in FIGS. 34 to 37.

As another embodiment, the signaling of the secondary transform index may be performed in any one step of 1) before residual coding, 2) in the middle of residual coding (after coding the non-zero transform coefficient position), or 3) after residual coding. The embodiments will be described below in detail.

1) Method for Signaling Secondary Transform Index Before Residual Coding

The encoding apparatus 100 may determine the forward secondary transform.

The encoding apparatus 100 may code the secondary transform index corresponding to the forward secondary transform.

The encoding apparatus 100 may code a position of a last non-zero transform coefficient.

The encoding apparatus 100 may perform residual coding for syntax elements other than the position of the last non-zero transform coefficient.

2) Method for Signaling Secondary Transform Index in Middle of Residual Coding

The encoding apparatus 100 may determine the forward secondary transform.

The encoding apparatus 100 may code the position of the last non-zero transform coefficient.

When the non-zero transform coefficient is not located in a specific region, the encoding apparatus 100 may code the secondary transform index corresponding to the forward secondary transform. Here, in the case where the reduced secondary transform is applied, the specific region represents a remaining region other than the position where the non-zero transform coefficient may exist when the transform coefficients are arranged according to the scan order. However, an embodiment of the present disclosure is not limited thereto.

The encoding apparatus 100 may perform residual coding for syntax elements other than the position of the last non-zero transform coefficient.

3) Method for Signaling Secondary Transform Index Before Residual Coding

The encoding apparatus 100 may determine the forward secondary transform.

The encoding apparatus 100 may code the position of the last non-zero transform coefficient.

The encoding apparatus 100 may perform residual coding for syntax elements other than the position of the last non-zero transform coefficient.

When the non-zero transform coefficient is not located in a specific region, the encoding apparatus 100 may code the secondary transform index corresponding to the forward secondary transform after the residual coding. Here, in the case where the reduced secondary transform is applied, the specific region represents a remaining region other than the position where the non-zero transform coefficient may exist when the transform coefficients are arranged according to the scan order. However, an embodiment of the present disclosure is not limited thereto.

Meanwhile, the encoding apparatus 100 may perform the forward primary transform for the current block (residual block) (S2530). Here, step S2510 and/or step S2520 may be similarly applied to the forward primary transform.

The encoding apparatus 100 may perform the forward secondary transform for the current block by using the optimal forward secondary transform (S2540). For example, the forward secondary transform may be a reduced secondary transform. The reduced secondary transform means a transform in which N residual data (N×1 residual vectors) are input and L (L<N) transform coefficient data (L×1 transform coefficient vectors) are output.

As an embodiment, the reduced secondary transform may be applied to a specific region of the current block. For example, when the current block is N×N, the specific region may mean a top-left N/2×N/2 region. However, an embodiment of the present disclosure is not limited thereto and may be differently configured according to at least one of the prediction mode, the block shape, or the block size. For example, when the current block is N×N, the specific region may mean a top-left M×M region (M N). Further, a low frequency non-separable transform may be applied to at least a partial region (e.g., top-left 4×4 region) corresponding to a low-frequency region of the transform block as the secondary transform.

Meanwhile, the encoding apparatus 100 performs quantization for the current block to generate a transform coefficient block (S2550).

The encoding apparatus 100 performs entropy encoding for the transform coefficient block to generate a bitstream.

FIG. 26 is a flowchart of decoding a video signal through an inverse secondary transform and an inverse primary transform according to an embodiment of the present disclosure.

The decoding apparatus 200 may obtain a secondary transform index from the bitstream (S2610). Here, the secondary transform index may adopt other embodiments described in the present disclosure. For example, the secondary transform index may be determined based on index mapping tables illustrated in FIGS. 34 to 37.

As another embodiment, the obtaining of the secondary transform index may be performed in any one step of 1) before residual decoding, 2) in the middle of the residual decoding (after last non-zero transform coefficient position decoding), or 3) after the residual decoding.

The decoding apparatus 200 may derive the secondary transform corresponding to the secondary transform index (S2620). In this case, a relationship between the secondary transform and the secondary transform index may be configured as in one of the examples of FIGS. 34 to 37.

However, steps S2610 and S2620 are an embodiment, and an embodiment of the present disclosure is not limited thereto. For example, the decoding apparatus 200 may not obtain the secondary transform index, but derive the secondary transform based on at least one of the prediction mode, the block shape, and/or the block size of the current block.

Meanwhile, the decoding apparatus 200 may obtain the transform coefficient block by entropy-decoding the bitstream and perform dequantization for the transform coefficient block (S2630).

The decoding apparatus 200 may perform the inverse secondary transform for the dequantized transform coefficient block (S2640). For example, the inverse secondary transform may be the inverse reduced secondary transform. The reduced secondary transform means a transform in which N data (N×1 vector) and L (L<N) transform coefficient data (L×1 transform coefficient vector), and the inverse reduced secondary transform means a transform in which L transform coefficient data (L×1 transform coefficient vector) are inputted and N (L<N) data are outputted.

As an embodiment, the reduced secondary transform may be applied to a specific region of the current block. For example, when the current block is N×N, the specific region may mean a top-left N/2×N/2 region. However, an embodiment of the present disclosure is not limited thereto and may be differently configured according to at least one of the prediction mode, the block shape, or the block size.

For example, when the current block is N×N, the specific region may mean a top-left M×M region (M N) or M×L (M N, L N).

Further, a low frequency non-separable transform applied to a low frequency region (e.g., top-left 4×4 region) of a transform block including the dequantized transform coefficients may be as the secondary transform.

In addition, the decoding apparatus 200 may perform the inverse primary transform for a result of the inverse secondary transform (S2650).

and a method and apparatus for applying a secondary transform upon a change into a wide angle mode due to WAIP.

An embodiment of the present disclosure provides a method and apparatus for allocating a secondary transform set to a wide angle mode when WAIP is applied.

Furthermore, an embodiment of the present disclosure provides a method and apparatus for applying a corresponding secondary transform by transposing transform input data (or without transposing transform input data) based on a changed prediction direction when the prediction direction is changed because a condition in which WAIP is applied is satisfied.

Embodiments of the present disclosure can improve compression performance by applying a suitable secondary transform set to each wide angle mode according to the application of a wide angle intra prediction mode and arranging input data based on the wide angle mode, when encoding or decoding a still image or a moving image.

Hereinafter, a non-separable transform described hereinafter may correspond to the aforementioned low frequency non-separable transform (LFNST), non-separable secondary transform (NSST), and/or reduced secondary transform (RST).

As described above, an intra prediction method includes a planar mode which is a non-directional prediction mode, a DC mode, and a plurality of directional prediction modes having di rationalities, respectively. The legacy video compression standard (e.g., HEVC) uses 35 intra prediction modes, and 33 intra prediction modes among 35 intra prediction modes correspond to a directional prediction mode. In a versatile video coding (VVC) standard or JEM which is currently discussed, 67 intra prediction modes are considered, but are being used, and 67 intra prediction modes include the planar mode, the DC mode, and 65 directional intra prediction modes. A constitution of 67 intra prediction modes may be expressed as in FIG. 11.

Table 2 below shows an example of a mapping table for 67 intra prediction modes of 35 intra prediction modes.

TABLE 2

| 35모드 인덱스 | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 67모드 인덱스 | 0 | 1 | 2 | 4 | 6 | 8 | 10 | 12 | 14 | 16 | 18 | 20 | 22 | 24 | 26 | 28 | 30 | 32 |
| 35모드 인덱스 | 18 | 19 | 20 | 21 | 22 | 23 | 24 | 25 | 26 | 27 | 28 | 29 | 30 | 31 | 32 | 33 | 34 | |
| 67모드 인덱스 | 34 | 36 | 38 | 40 | 42 | 44 | 46 | 48 | 50 | 52 | 54 | 56 | 58 | 60 | 62 | 64 | 66 | |

35 mode index
67 mode index

The decoding apparatus 200 generates the residual block through step S2650, and a reconstructed block by adding the residual block and the prediction block.

Hereinafter, a method and a device for performing efficient transform while further enhancing prediction accuracy by considering a wide angle intra prediction mode in the process of performing the intra prediction and the transform will be described.

Hereinafter, embodiments of the present disclosure to be described later relate to a still image or moving image encoding/decoding method and apparatus, and more particularly, to secondary transform set mapping for a wide angle mode when wide angle intra prediction (WAIP) is applied Mapping each of indexes legacy 35 intra prediction modes to indexes of 67 intra prediction modes may be configured as in Table 2.

As in Table 2, even in constituting 67 modes, index #0 and index #1 correspond to the planar mode and the DC mode, respectively. Hereinafter, in the present disclosure, a case of configuring the intra prediction by 35 intra prediction modes will be referred to as '35 mode' or '35 mode constitution', and a case of configuring the intra prediction by 67 intra prediction modes will be referred to as '67 mode' or '67 mode constitution'.

FIG. 27 illustrates an example in which 2 wide angle modes are additionally configured in 35 intra prediction modes according to an embodiment of the present disclosure.

An example wide angle intra prediction described through an embodiment of the present disclosure may be illustrated in FIG. 27. FIG. 27 illustrates an example of a case where two wide angle modes 35 and 36 are added in a right direction after mode #34 in the 35 mode constitution.

FIG. 28 illustrates an example in which 10 wide angle modes are additionally constituted in 35 intra prediction modes according to an embodiment of the present disclosure.

FIG. 28 illustrates an example of a case where 5 wide angle modes are added in a lower direction and 5 wide angle modes are added in an upper direction in 35 modes. Modes added in the lower direction have indexes of −1, −2, −3, −4, and −5 from the top and modes added in the upper direction have indexes of 35, 36, 37, 38, and 39 from the left. In 67 modes, 10 modes may be added to each of lower and upper sides together with the modes added in 35 modes. In this case, lower 10 modes may have indexes of −1, −2, . . . , −10 and upper 10 modes may have indexes of 67, 68, . . . , 76. A mapping table between 35 modes and 67 modes for added modes may be configured as in FIG. 29.

FIG. 29 illustrates an example of an index mapping table between wide angle modes added in 35 intra prediction modes and 67 intra prediction modes according to an embodiment of the present disclosure.

Among 67 modes, indexes corresponding to wide angle modes not included in FIG. 29 are −1, −3, −5, −7, −9, 67, 69, 71, 73, and 75, which may be present between #2 and #−2, between #−2 and #−4, between #−4 and #−6, between #−6 and #−8, between #−8 and #−10, between #66 and #68, between #68 and #70, between #70 and #72, between #72 and #74, and between #74 and #76, respectively based on 67 modes.

According to an embodiment of the present disclosure, when a specific condition is satisfied, a modified intra prediction mode (wide angle intra prediction mode) may be used instead of a specific intra prediction mode. For example, prediction using mode #35 instead of mode #2 based on 35 modes may be performed.

When a width (horizontal length) of A transform block (or transform unit) is written as nWidth and a height (vertical length) is written as nHeight, an index (predModeIntra) of the intra prediction mode may be transformed as in Table 3 below.

A configuration of a condition in which the modified intra prediction mode is used and an index of the modified intra prediction mode according to application of the wide angle intra prediction mode according to Table 3 are described as below.

(a) When a ratio of a width of a transform block divided by a height (nWidth/nHeight) is smaller than or equal to 2, and an index of an intra mode (predModeIntra) is greater than or equal to 2 and is smaller than or equal to 4 (nWidth/nHeight<=2 and 2<=predModeIntra<=4), an index of a modified intra prediction mode is set as a value obtained by adding 33 to the index of the intra prediction mode (predModeIntra=predModeIntra+33).

(b) When the ratio of the width of the transform block divided by the height (nWidth/nHeight) is greater than 2, and the index of the intra mode (predModeIntra) is greater than or equal to 2 and is smaller than or equal to 6 (nWidth/nHeight>2 and 2<=predModeIntra<=6), the index of the modified intra prediction mode is set as a value obtained by adding 33 to the index of the intra prediction mode (predModeIntra=predModeIntra+33).

(c) When the ratio of the height of the transform block divided by the width (nHeight/nWidth) is smaller than or equal to 2, and the index of the intra mode (predModeIntra) is greater than or equal to 32 and is smaller than or equal to 34 (nHeight/nWidth<=2 and 32<=predModeIntra<=34), the index of the modified intra prediction mode is set as a value obtained by subtracting 35 from the index of the intra prediction mode (predModeIntra=predModeIntra−35).

(d) When the ratio of the height of the transform block divided by the width (nHeight/nWidth) is greater than 2, and the index of the intra mode (predModeIntra) is greater than or equal to 30 and is smaller than or equal to 34 (nHeight/nWidth>2 and 30<=predModeIntra<=34), the index of the modified intra prediction mode is set as a value obtained by subtracting 35 from the index of the intra prediction mode (predModeIntra=predModeIntra−35).

In Table 3, an intra prediction mode modified for cases (c) and (d) becomes negative, and −1 is allocated to a direction just below mode #2 based on FIG. 28 and an index value decreases one by one downwards.

Based on 67 modes, the configuration of the condition in which the modified intra prediction mode is used and the index of the modified intra prediction mode according to the application of the wide angle intra prediction mode may be shown in Table 4 below.

TABLE 3

When nWidth is not equal to nHeight, predModeIntra is mapped as follows:

(a) if nWidth/nHeight <= 2 and 2 <= predModeIntra <= 4, predModeIntra = predModeIntra + 33
(b) if nWidth/nHeight > 2 and 2 <= predModeIntra <= 6, predModeIntra = predModeIntra + 33
(c) if nHeight/nWidth <= 2 and 32 <= predModeIntra <= 34, predModeIntra = predModeIntra − 35
(d) if nHeight/nWidth > 2 and 30 <= predModeIntra <= 34, predModeIntra = predModeIntra − 35

TABLE 4

When nWidth is not equal to nHeight, predModeIntra is mapped as follows:

(a) if nWidth/nHeight <= 2 and 2 <= predModeIntra <= 7, predModeIntra = predModeIntra + 65
(b) if nWidth/nHeight > 2 and 2 <= predModeIntra <= 11, predModeIntra = predModeIntra + 65
(c) if nHeight/nWidth <= 2 and 61 <= predModeIntra <= 66, predModeIntra = predModeIntra − 67
(d) if nHeight/nWidth > 2 and 57 <= predModeIntra <= 66, predModeIntra = predModeIntra − 67

(a) When a ratio of a width of a transform block divided by a height (nWidth/nHeight) is smaller than or equal to 2, and an index of an intra mode (predModeIntra) is greater than or equal to 2 and is smaller than or equal to 7 (nWidth/nHeight<=2 and 2<=predModeIntra<=7), an index of a modified intra prediction mode is set as a value obtained by adding 65 to an index of an intra prediction mode (predModeIntra=predModeIntra+65).

(b) When the ratio of the width of the transform block divided by the height (nWidth/nHeight) is greater than 2, and the index of the intra mode (predModeIntra) is greater than or equal to 2 and is smaller than or equal to 11 (nWidth/nHeight>2 and 2<=predModeIntra<=11), the index of the modified intra prediction mode is set as a value obtained by adding 65 to the index of the intra prediction mode (predModeIntra=predModeIntra+65).

(c) When the ratio of the height of the transform block divided by the width (nHeight/nWidth) is smaller than or equal to 2, and the index of the intra mode (predModeIntra) is greater than or equal to 61 and is smaller than or equal to 66 (nHeight/nWidth<=2 and 61<=predModeIntra<=66), the index of the modified intra prediction mode is set as a value obtained by subtracting 67 from the index of the intra prediction mode (predModeIntra=predModeIntra−67).

(d) When the ratio of the height of the transform block divided by the width (nHeight/nWidth) is greater than 2, and the index of the intra mode (predModeIntra) is greater than or equal to 57 and is smaller than or equal to 66 (nHeight/nWidth>2 and 57<=predModeIntra<=66), the index of the modified intra prediction mode is set as a value obtained by subtracting 67 from the index of the intra prediction mode (predModeIntra=predModeIntra−67).

That is, in (a) and (b) of Table 4, when the intra prediction mode is equal to or larger than 2 and is smaller than a first reference value while the width of the transform block is larger than the height, a value obtained by adding 65 to the intra prediction mode is determined as the modified intra prediction mode. Here, when a ratio of dividing the width of the transform block by the height is equal to or smaller than 2, the first reference value may be set to 8 (in the case of (a)) and when the ratio of dividing the width of the transform block by the height is larger than 2, the first reference value may be set to 12 (in the case of (b)).

That is, in (c) and (d) of Table 4, when the intra prediction mode is equal to or larger than a second reference value and is equal to or smaller than 66 while the width of the transform block is smaller than the height, a value obtained by subtracting 67 from the intra prediction mode is determined as the modified intra prediction mode. Here, when a ratio of dividing the height of the transform block by the width is equal to or smaller than 2, the second reference value may be set to 61 (in the case of (c)) and when the ratio of dividing the height of the transform block by the width is larger than 2, the second reference value may be set to 57 (in the case of (d)).

A case where the wide angle intra prediction method may be advantageously applied will be described with reference to FIGS. 30 and 31.

FIGS. 30 and 31 illustrate examples of intra prediction for a non-square block according to an embodiment of the present disclosure.

When the width of the block is larger than the height as illustrated in FIG. 30, reference samples located at the upper side are generally closer to positions in a block to be predicted than reference samples located at the left side, so it may be more accurate to perform the prediction in a bottom-left direction than to perform the prediction in a top-right direction. On the contrary, when the height of the block is larger than the width as illustrated in FIG. 31, left reference samples are conversely generally closer to the positions in the block to be predicted than upper reference samples, so it may be more accurate to perform the prediction in the top-right direction than to perform the prediction in the bottom-left direction. Accordingly, it may be more advantageous than transform the index of the intra prediction mode. Intra prediction modes to be transformed are organized with respect to 35 modes and 67 modes, and may be shown in Tables 5 and 6 below.

TABLE 5

| Condition | Replaced intra prediction modes |
| --- | --- |
| W/H == 2 | Modes 2, 3, 4 |
| W/H > 2 | Modes 2, 3, 4, 5, 6 |
| W/H == 1 | None |
| H/W == 1/2 | Modes 32, 33, 34 |
| H/W < 1/2 | Modes 30, 31, 32, 33, 34 |

TABLE 6

| Condition | Replaced intra prediction modes |
| --- | --- |
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Table 5 shows intra prediction modes to be transformed in the 35 mode constitution and Table 6 shows intra prediction modes to be transformed in the 67 mode constitution. In Tables 5 and 6, W represents the width of the transform block and H represents the height of the transform block.

In an embodiment, as the index of the wide angle intra prediction mode, an index before index transform is coded. That is, even when intra prediction mode #2 is transformed to intra prediction mode #67 in the 67 mode constitution, 2 which is the index of the previous mode is coded.

As described above, if a wide angle intra prediction mode is applied, as illustrated in FIG. 22, a direction corresponding to the wide angle intra prediction mode is added in the existing an intra prediction. Prediction modes added on the lower side are represented as $ML_1$ to $ML_N$, and prediction modes added on the upper side are represented as $ML_1$ to $ML_N$. For example, a mode closest to the No. 2 mode is $ML_1$, and indices (1 to N) corresponding to respective prediction modes in the lower direction are increased (prediction mode values $ML_1$ to $ML_N$ are decreased), and the lowest mode is represented as $ML_N$. With respect to the 35 mode and the 67 mode, modes closest to the Nos. 34 and 66 are represented as $MT_1$, indices (1 to M) are increased to the right, and the rightmost mode is represented as $MT_M$.

In an embodiment of the present disclosure, the number of prediction modes added according to application of wide angle intra prediction is not limited, but may be variously configured. As illustrated in FIG. 32, 14 (N=14) may be added in the lower direction and 14 (M=14) may be added in the upper direction.

A method for mapping the legacy intra prediction mode to the wide angle prediction mode may be variously implemented, and Table 7 below shows expression of the mapping meted to the wide angle intra prediction mode in the form of a pseudo code.

TABLE 7

```
if (Planar mode or DC mode) {
  Not modified to wide angle mode
}
else {
  width = prediction unit width
  height = prediction unit height
  modeShift[] = { 0, 6, 10, 12, 14, 15 }
  deltaSize = abs(log2(width) - log2(height))
  predMode = Current mode value (one of 2 to 66)
  if (width > height and predMode < 2 + modeShift[deltaSize])
  {
    predMode = predMode + 65
  }
  else if (height > width and predMode > 66 - modeShift[deltaSize])
  {
    predMode = predMode - 67
  }
}
```

In the pseudo code of Table 7, mode shift as an array of C-language form is approached like modeshift[0], modeshift[1], . . . , modeshift[5], log 2 represents a function to return a log value (e.g., log 2(4)=2) having a bottom of 2, and abs( ) represents a function to return an absolute value for an input factor. Even when M and N values are greater than 10, mapping of the intra prediction mode for the wide angle intra prediction may be implemented by the pseudo code of Table 7.

For example, if width>height, width/height=2, 2<=predMode<8, predMode+65 may be outputted as the modified intra prediction mode.

Further, if width>height, width/height=4, 2<=predMode<12, predMode+65 may be outputted as the modified intra prediction mode.

Further, if width>height, width/height=8, 2<=predMode<14, predMode+65 may be outputted as the modified intra prediction mode.

Further, if width>height, width/height=16, 2<=predMode<16, predMode+65 may be outputted as the modified intra prediction mode.

Further, if height>width, height/width=2, 60<predMode<=66, predMode-67 may be outputted as the modified intra prediction mode.

Further, if height>width, height/width=4, 56<predMode<=66, predMode-67 may be outputted as the modified intra prediction mode.

Further, if height>width, height/width=8, 54<predMode<=66, predMode-67 may be outputted as the modified intra prediction mode.

Further, if height>width, height/width=16, 52<predMode<=66, predMode-67 may be outputted as the modified intra prediction mode.

In Table 7, deltaSize may be expressed as another variable (e.g., whRatio). If width/height or height/width is equal to or smaller than 16 (if deltaSize is equal to or smaller than 4), the array modeShift may be expressed as below.

If width>height,modeShift=(whRatio>1)?(8+2*whRatio):8

If width>height,modeShift=(whRatio>1)?(60-2*whRatio):60

Here, "(condition) ? A:B" means a function to output A when the condition is satisfied and B when the condition is not satisfied.

When a case where a ratio of the width to height (or height to the width) is equal to or smaller than 16 is organized, a condition for outputting the value by obtaining 65 to the legacy prediction mode as the modified prediction mode is a case where i) the width is greater than the height, ii) the prediction mode is equal to or greater than 2, and iii) the prediction mode is smaller than (whRatio>1) ? (8+2*whRatio):8. Further, a condition for outputting a value obtained by subtracting 67 from the legacy prediction mode as the modified prediction mode is a case where i) the height is greater than the width, ii) the prediction mode is equal to or smaller than 66, and iii) the prediction mode is greater than (whRatio>1) ? (60-2*whRatio):60.

In other words, in the case where the value obtained by adding 65 to the legacy prediction mode as the modified intra prediction mode, i) the width may be greater than the height and ii) the prediction mode may be equal to or greater than 2 and the prediction mode may be smaller than the first reference value, and here, the first reference value may be set to 8 when whRatio(=abs(log 2(width/height))) is 0 (smaller than 1) and the first reference value may be set to (8+2*whRatio) when whRatio is equal to or greater than 1.

In other words, in the case where the value obtained by subtracting 67 from the legacy prediction mode as the modified intra prediction mode, i) the height may be greater than the width and ii) the prediction mode may be equal to or smaller than 66 and the prediction mode may be greater than the second reference value, and here, the second reference value may be set to 60 when whRatio(=abs(log 2(width/height))) is 0 (smaller than 1) and the second reference value may be set to 60-2*whRatio when whRatio is equal to or greater than 1.

FIG. 33 illustrates an example of an order of sorting pixels when a 2D block is modified to a 1D vector according to an embodiment of the present disclosure, and FIG. 33A illustrates a row-first order and FIG. 33B illustrates an example of a column-first order.

The secondary transform may be mapped to Modes $ML_1$ to $ML_N$ and modes $MT_1$ to $MT_M$ as illustrated in FIG. 20. In FIG. 20, the same secondary transform set may be applied to a directional mode pair (e.g., #32 and #36) which is symmetric around a diagonal direction (mode #34 in the 67 mode constitution and mode #18 in the 35 mode constitution), and the same or similar scheme may be applied to $ML_1$ to $ML_N$ and $MT_1$ to $MT_M$ which are the wide angle intra prediction modes. For example, when M=N, and $ML_a$ and $MT_a$ are symmetric to each other around the diagonal direction (a=1, . . . , N), the same transform set may be applied to $ML_a$ and $MT_a$.

However, 2D input data is first transposed for the $MT_a$ mode and then the secondary transform for $ML_a$ is applied.

In other words, as illustrated in FIGS. 33A and 33B, if the 2D input data is read in a row-first (or column-first) direction and transformed to the 1D input data and then the transform for $ML_a$ is applied, the transform for $MT_a$ is read in the column-first (or row-first) direction is read and transformed to 1D data do then the same transform as $ML_a$ is applied to $MT_a$. A number represented at each position of FIGS. 33A and 33B represents not the pixel value but an index for indicating the pixel position.

FIG. 34 illustrates an example of a mapping table of 35 transform sets and the intra prediction mode according to an embodiment of the present disclosure, FIG. 34A illustrates an example of a case of symmetrically allocating a transform set to each wide angle mode, FIG. 34B illustrates an example of a case of allocating transform set #2 to all wide angle modes, and FIG. 34C illustrates an example of a case of allocating the same additional transform set to all wide angle modes.

In FIG. 34A, the same transform set index as FIG. 2 may be allocated to modes #0 to #66, and indexes of different additional transform sets may be applied to all pairs corresponding to wide angle modes (here, the mode pair corresponds to ($ML_a$, $MT_a$), a=1, 2, . . . , 10).

Further, as illustrated in FIG. 34B, transform set index #2 may be reused for the additional wide angle modes and as illustrated in FIG. 34C, separate transform set index #35 may be allocated to the additional wide angle modes. If the number of wide angle intra prediction modes is greater than 10 in the upper direction or the lower direction (i.e., if N>10 or M>10 for modes $ML_1$ to $ML_N$ and modes $MT_1$ to $MT_M$), a mapping relationship presented in FIGS. 34A to 34C may be extended. For example, in FIG. 34A, a transform set corresponding to #(44+n) may be mapped to an intra prediction mode having (76+n) (here, n>=1) and a transform set corresponding to #(44+m) may be mapped to an intra prediction mode having (−10−m) (here, m>=1). Further, in FIG. 34B, a transform set corresponding to #2 may be mapped to an intra prediction mode having (76+n) or (−10−m) (here, m, n>=1) and in FIG. 34C, a transform set corresponding to #35 may be mapped to an intra prediction mode having (76+n) or (−10−m) (here, m, n>=1).

FIG. 35 illustrates an example of a mapping table of 10 transform sets and the intra prediction mode according to an embodiment of the present disclosure, and FIG. 35A illustrates an example of a case of allocating transform set #2 to each wide angle mode and FIG. 35B illustrates an example of a case of allocating the same additional transform set to all wide angle modes.

10 transform sets may be mapped to intra prediction modes #0 to #66 as illustrated in FIGS. 35A and 35B. Indexes illustrated in FIGS. 35A and 35B are to distinguish the transform set, and the same indexes as FIGS. 34A to 34C may correspond to the same transform set and correspond to different transform sets.

As illustrated in FIG. 35A, transform set #2 may be reused for additional wide angle intra prediction modes and as illustrated in FIG. 35B, transform set #35 may be allocated as a separate transform set. If the number of wide angle intra prediction modes is greater than 10 in the upper direction or the lower direction (i.e., if N>10 or M>10 for modes $ML_1$ to $ML_N$ and modes $MT_1$ to $MT_M$), a mapping relationship presented in FIGS. 35A and 35B may be extended. For example, in FIG. 35A, a transform set corresponding to #2 may be mapped to an intra prediction mode having (76+n) or (−10−m) (here, m, n>=1) and in FIG. 35B, a transform set corresponding to #35 may be mapped to an intra prediction mode having (76+n) or (−10−m) (here, m, n>=1).

FIG. 36 illustrates an example of a mapping table of 6 transform sets and the intra prediction mode according to an embodiment of the present disclosure, and FIG. 36A illustrates an example of a case of allocating transform set #2 to each wide angle mode and FIG. 36B illustrates an example of a case of allocating the same additional transform set to all wide angle modes.

6 transform sets may be mapped to intra prediction modes #0 to #66 as illustrated in FIGS. 36A and 36B. Indexes illustrated in FIGS. 36A and 36B are to distinguish the transform set, and the same indexes as FIGS. 34A to 35B may correspond to the same transform set and correspond to different transform sets.

As illustrated in FIG. 36A, transform set #2 may be reused for additional wide angle intra prediction modes and as illustrated in FIG. 36B, transform set #35 may be allocated as the additional wide angle intra prediction modes. If the number of wide angle intra prediction modes is greater than 10 in the upper direction or the lower direction (i.e., if N>10 or M>10 for modes $ML_1$ to $ML_N$ and modes $MT_1$ to $MT_M$), a mapping relationship presented in FIGS. 36A and 36B may be extended. For example, in FIG. 36A, a transform set corresponding to #2 may be mapped to an intra prediction mode having (76+n) or (−10−m) (here, m, n>=1) and in FIG. 35B, a transform set corresponding to #36 may be mapped to an intra prediction mode having (76+n) or (−10−m) (here, m, n>=1).

FIG. 37 illustrates an example of a mapping table of 4 transform sets and the intra prediction mode according to an embodiment of the present disclosure, and FIG. 37A illustrates an example of a case of allocating transform set #2 to each wide angle mode and FIG. 37B illustrates an example of a case of allocating the same additional transform set to all wide angle modes.

4 transform sets may be mapped to intra prediction modes #0 to #66 as illustrated in FIGS. 37A and 37B. Indexes illustrated in FIGS. 37A and 37B are to distinguish the transform set, and the same indexes as FIGS. 34 to 36 may correspond to the same transform set and correspond to different transform sets.

As illustrated in FIG. 37A, transform set #2 may be reused for additional wide angle intra prediction modes and as illustrated in FIG. 37B, transform set #35 may be allocated as the additional wide angle intra prediction modes. If the number of wide angle intra prediction modes is greater than 10 in the upper direction or the lower direction (i.e., if N>10 or M>10 for modes $ML_1$ to $ML_N$ and modes $MT_1$ to $MT_M$), a mapping relationship presented in FIGS. 37A and 37B may be extended. For example, in FIG. 37A, a transform set corresponding to #2 may be mapped to an intra prediction mode having (76+n) or (−10−m) (here, m, n>=1) and in FIG. 37B, a transform set corresponding to #37 may be mapped to an intra prediction mode having (76+n) or (−10−m) (here, m, n>=1).

In the tables of FIGS. 34 to 37, the transform set index is just a value for distinguishing the transform set (e.g., when the same transform set index is allocated to two intra prediction modes, the same transform set may be used and when different index values are allocated to two intra prediction modes, different transform sets may be used), and an index value itself is not meaningful, and in some embodiments, even any value may be used. For example, in FIG. 37A, index values 0, 2, 18, and 34 may be expressed as 0, 1, 2, and 3.

In other words, in FIG. 37A, index values 0, 2, 18, and 34 are expressed as 0, 1, 2, and 3, and when 14 wide angle intra prediction modes are extended in the upper direction and 14 wide angle intra prediction modes are extended in the lower direction as illustrated in FIG. 32, if the modified intra prediction mode is smaller than 0 and equal to or greater than −14, the non-separable transform set index may be determined as 1, if the modified intra prediction mode is equal to or greater than 0 and equal to or smaller than 1, the non-separable transform set index may be determined as 0, if the modified intra prediction mode is equal to or greater than 2 and equal to or smaller than 12, the non-separable transform set index may be determined as 1, if the modified intra prediction mode is equal to or greater than 13 and equal to or smaller than 23, the non-separable transform set index may be determined as 2, if the modified intra prediction mode is equal to or greater than 24 and equal to or smaller than 44, the non-separable transform set index may be determined as 3, if the modified intra prediction mode is equal to or greater than 45 and equal to or smaller than 55, the non-separable transform set index may be determined as 2, and if the modified intra prediction mode is equal to or greater than 56 and equal to or smaller than 80, the non-separable transform set index may be determined as 1.

FIG. 38 illustrates an example of a flowchart of performing a transform considering wide angle intra prediction (WAIP) in an encoder according to an embodiment of the present disclosure. FIG. 31 illustrates an example of an operation by the encoding apparatus 100. FIG. 31 illustrates an example of a secondary transform step performed before a quantization step after a prediction step and a primary transform step based on the encoding apparatus 100.

The encoding apparatus 100 may determine the intra prediction mode by considering the WAIP (S3810). According to an embodiment of the present disclosure, the WAIP may be applied to generate a more accurate prediction sample for the non-square block (prediction unit) as illustrated in FIG. 24 or 25. When the WAIP is applied, the modified intra prediction mode may be used instead of a specific intra prediction mode as shown in Tables 3 to 7.

Further, the encoding apparatus 100 codes an index corresponding to the applied intra prediction mode (S3850). Here, the encoding apparatus 100 may code an original intra prediction mode before modifying the index. For example, even when intra prediction mode #2 is transformed to intra prediction mode #67 in the 67 mode constitution, 2 which is the index of the previous intra prediction mode is coded.

The encoding apparatus 100 determines a secondary transform set by using a preconfigured map (S3820). Here, the preconfigured map may be the index mapping table illustrated in FIGS. 34A to 37B.

Thereafter, the encoding apparatus 100 may select a best secondary transform through comparing rate-distortion cost after applying the primary transform (S3830), and code an index for the selected secondary transform (S3840). According to an embodiment of the present disclosure, the secondary transform may be a non-separable transform applied to the top-left region (low-frequency region) of the transform block after the primary transform is applied. For the transform block to which the secondary transform is applied, the encoding apparatus 100 may output the bitstream thorough the quantization and the entropy coding. The encoding apparatus 100 may apply the primary transform to a transform block in which prediction samples are excluded from the coding unit prior to the secondary transform, and here, the primary transform may correspond to a transform separable for the row direction and the column direction.

FIG. 39 illustrates an example of a flowchart of performing the transform considering the WAIP in a decoding apparatus 200 according to an embodiment of the present disclosure. FIG. 39 illustrates an example of an operation by the decoding apparatus 200. FIG. 32 illustrates an example of an inverse secondary transform step performed before an inverse primary transform step after a dequantization step on the decoding apparatus 200.

The decoding apparatus 200 parses an index of an intra prediction mode for a transform block in which entropy decoding and dequantization in a video signal (S3910). Further, the decoding apparatus 200 parses an index of the secondary transform from a bitstream related to the video signal. Here, the index of the intra prediction mode and the index of the secondary transform may be transmitted from the encoding apparatus 100 together with the video signal.

The decoding apparatus 200 may determine the intra prediction mode by considering the WAIP (S3920). According to an embodiment of the present disclosure, the WAIP may be applied to generate a more accurate prediction sample for the non-square prediction unit as illustrated in FIG. 30 or 31. When the WAIP is applied, the modified intra prediction mode may be used instead of a specific intra prediction mode as shown in Tables 3 to 7. Further, the index of the intra prediction mode transferred from the encoding apparatus 100 may be not an index modified by the application of the WAIP but the index of the original intra prediction mode before modification. In this case, the decoding apparatus 200 may determine the index of the modified intra prediction mode after the transform is performed for the original index by referring to Tables 3 to 6.

The decoding apparatus 200 selects the secondary transform set from a preconfigured map (S3930). Here, the preconfigured map may be the index mapping table illustrated in FIGS. 34 to 37.

The decoding apparatus 200 selects the secondary transform in the selected secondary transform set (S3940), and applies the inverse secondary transform to the transform block (S3950). Here, the secondary transform may be a non-separable transform applied to the top-left region (low-frequency region) of the transform block after the primary transform is applied. Thereafter, the decoding apparatus 200 may generate the residual sample by applying the inverse primary transform to the transform block to which the inverse secondary transform is applied, and here, the inverse primary transform may correspond to the transform separable for the row direction and the column direction.

FIG. 40 illustrates an example of a flowchart for processing a video signal by using intra prediction according to an embodiment of the present disclosure. The flowchart of FIG. 40 may be performed by the encoding apparatus 100 or the decoding apparatus 200, and hereinafter, the encoding apparatus 100 and/or the decoding apparatus 200 will be collectively referred to as a coding device.

In step S4010, the coding device obtains the intra prediction mode of the current block from the video signal. More specifically, the coding device may check that the intra prediction is applied to the current block and obtain the intra prediction mode of the current block by using a method according to the MPM mode or the remaining modes. Here, the intra prediction mode may include the non-directional mode (DC mode or planar mode) and the directional mode. Further, the intra prediction mode may have 35 prediction modes as illustrated in FIG. 10 or 65 prediction modes as illustrated in FIG. 11.

In step S4020, the coding device may determine the modified intra prediction mode from the intra prediction mode of the current block based on the width, the height, and the intra prediction mode of the current block. Here, the modified intra prediction mode is a prediction mode in which M (e.g., 14) prediction modes are added in the upper direction of the legacy prediction direction and N (e.g., 14) prediction modes are added in the lower direction of the legacy prediction mode according to the wide angle intra prediction (WAIP) as illustrated in FIG. 32. For example, the modified intra prediction mode may have values of −14 to 80.

In an embodiment of the present disclosure, the modified intra prediction mode may be determined based on the shape (width or height) of the current block and the intra prediction mode as shown in Tables 3 to 7, and applied in the case of the non-square block in which the width and the height of the current block are different from each other as illustrated in FIGS. 30 and 31. Further, when the intra prediction mode applied to the current block is the non-directional prediction mode (e.g., planar mode or DC mode), the intra prediction mode is not modified.

More specifically, as shown in Table 7, when the width of the current block is greater than the height, and the intra prediction mode is equal to or greater than 2 and smaller than the first reference value, the modified intra prediction mode may be determined as a value obtained by adding 65 to the intra prediction mode. Here, the first reference value may be determined based on the ratio of the width to the height of the current block. For example, the first reference value may be determined as a value indicated by an index (deltaSize) determined according to the ratio of the width to the height of the current block in a preconfigured array (modeShift) as shown in Table 7.

Further, when the height is greater than the width, and the intra prediction mode is greater than the second reference value and equal to or smaller than 66, the modified intra prediction mode may be determined as a value obtained by subtracting 67 from the intra prediction mode. Here, the second reference value may be determined based on the ratio of the width to the height of the current block. For example, the second reference value may be determined as a value indicated by an index (deltaSize) determined according to the ratio of the width to the height of the current block in a preconfigured array (modeShift) as shown in Table 7. That is, each of a first reference value for determining a condition for modification to the wide angle intra prediction mode and the second reference value may be determined based on the ratio of the width and the height of the current block.

The index (deltaSize) may be derived into an absolute value (abs(log 2(width)−log 2(height))=abs(log 2(width/height)) of a value obtained by taking a log having a bottom of 2 for a value dividing the width of the current block by the height. That is, the first reference value and the second reference value may be derived based on the absolute value of the value obtained by taking the log having the bottom of 2 for the value obtained by dividing the width of the current block by the height.

In step S4030, the coding device may apply a transform determined based on the modified intra prediction mode. That is, the coding device may perform the transform for the block to which the wide angle intra prediction is applied.

In an embodiment, the decoding apparatus 200 may apply the non-separable transform based on the width, the height, and the modified intra prediction mode of the transform block (transform unit). For example, the decoding device 200 may determine a non-separable transform set index based on the modified intra prediction mode, derive a non-separable transform matrix based on the non-separable transform set index and the non-separable transform index, and apply the derived non-separable transform matrix. Here, the non-separable transform matrix may be applied to the top-left region of the block and the region to which the non-separable transform matrix is applied may be determined based on the width and the height of the current block. For example, when both the width and the height are equal to or greater than 8, the non-separable transform matrix may be applied and when both the width and the height are equal to or greater than 4 and the width or the height is smaller than 8, the non-separable transform matrix may be applied to the top-left 4×4 region of the current block.

Further, a non-separable transform set index indicating the non-separable transform set may be determined based on the modified intra prediction mode. For example, when the modified intra prediction mode is smaller than 0, the non-separable transform set index may be determined as 1, when the modified intra prediction mode is equal to or greater than 0 and equal to or smaller than 1, the non-separable transform set index may be determined as 0, when the modified intra prediction mode is equal to or greater than 2 and equal to or smaller than 12, the non-separable transform set index may be determined as 1, when the modified intra prediction mode is equal to or greater than 13 and equal to or smaller than 23, the non-separable transform set index may be determined as 2, when the modified intra prediction mode is equal to or greater than 24 and equal to or smaller than 44, the non-separable transform set index may be determined as 3, when the modified intra prediction mode is equal to or greater than 45 and equal to or smaller than 55, the non-separable transform set index may be determined as 2, and when the modified intra prediction mode is equal to or greater than 56 and equal to or smaller than 80, the non-separable transform set index may be determined as 1.

FIG. 41 illustrates an example of a block diagram of a device for processing a video signal according to an embodiment of the present disclosure. The video processing device may correspond to the decoding apparatus 200 or the encoding apparatus 100.

A video processing device 4100 for processing the video signal includes a memory 4120 sorting the video signal and a processor 4110 processing the video signal in connection with the memory 4120.

The processor 4110 according to an embodiment of the present disclosure may be configured as at least one processing circuit for processing the video signal, and process the video signal by executing commands for encoding or decoding the video signal. That is, the processor 4110 may encode original video data or decode an encoded video signal by executing the encoding or decoding methods.

The processor 4110 according to an embodiment of the present disclosure may be configured to obtain the intra prediction mode of the current block processed in the video signal, determine the modified intra prediction mode from the intra prediction mode of the current block based on the width, the height, and the intra prediction mode of the current block, and generate a prediction sample of the current block based on the modified intra prediction mode, and here, when the width is greater than the height, and the intra prediction mode is equal to or greater than 2 and smaller than a first reference value, the modified intra prediction mode may be determined as a value obtained by adding 65 to the intra prediction mode, and when the height is greater than the width, and the intra prediction mode is greater than a second reference value and equal to or smaller than 66, the modified intra prediction mode may be determined as a value obtained by subtracting 67 from the intra prediction mode, and each of the first reference value and the second reference value may be determined based on the ratio of the width to the height.

In an embodiment, each of the first reference value and the second reference value may be determined based on an absolute value of a log for a value obtained by dividing the width by the height.

In an embodiment, when the obtained intra prediction mode corresponds to the non-directional prediction mode or the width and the height of the current block are equal to each other, derivation of the modified intra prediction mode may be omitted or the obtained intra prediction mode may be determined as the modified intra prediction mode.

In an embodiment, the decoding device 4110 may be configured to determine the non-separable transform set index based on the modified intra prediction mode, derive the non-separable transform matrix based on the non-separable transform set index and the non-separable transform index, and apply the derived non-separable transform matrix to the current block.

In an embodiment, the processor 4110 may be configured to apply the non-separable transform matrix to the top-left region of the current block, and the top-left region to which the non-separable transform is applied may be determined based on the width and the height of the current block.

In an embodiment, when the modified intra prediction mode is smaller than 0, the non-separable transform set index may be determined as 1, when the modified intra prediction mode is equal to or greater than 0 and equal to or smaller than 1, the non-separable transform set index may be determined as 0, when the modified intra prediction mode is equal to or greater than 2 and equal to or smaller than 12, the non-separable transform set index may be determined as 1, when the modified intra prediction mode is equal to or greater than 13 and equal to or smaller than 23, the non-separable transform set index may be determined as 2, when the modified intra prediction mode is equal to or greater than 24 and equal to or smaller than 44, the non-separable transform set index may be determined as 3, when the modified intra prediction mode is equal to or greater than 45 and equal to or smaller than 55, the non-separable transform set index may be determined as 2, and when the modified intra prediction mode is equal to or greater than 56 and equal to or smaller than 80, the non-separable transform set index may be determined as 1.

In an embodiment, when both the width and the height are equal to or greater than 8, the non-separable transform may be applied to the top-left 8×8 region and when both the width and the height are equal to or greater than 4 and the width or the height is smaller than 8, the non-separable transform may be applied to the top-left 4×4 region of the current block.

In addition, the decoder and the encoder to which an embodiment of the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an (Over the top) OTT video device, an Internet streaming service providing devices, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which an embodiment of the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

The non-transitory computer-readable medium according to an embodiment of the present disclosure may be configured to obtain the intra prediction mode of the current block processed in the video signal, determine the modified intra prediction mode from the intra prediction mode of the current block based on the width, the height, and the intra prediction mode of the current block, and generate a prediction sample of the current block based on the modified intra prediction mode, and here, when the width is greater than the height, and the intra prediction mode is equal to or greater than 2 and smaller than a first reference value, the modified intra prediction mode may be determined as a value obtained by adding 65 to the intra prediction mode, and when the height is greater than the width, and the intra prediction mode is greater than a second reference value and equal to or smaller than 66, the modified intra prediction mode may be determined as a value obtained by subtracting 67 from the intra prediction mode, and each of the first reference value and the second reference value may be determined based on the ratio of the width to the height.

As described above, the embodiments described in the present disclosure may be implemented and performed on a processor, a microprocessor, a controller, or a chip. For example, functional units illustrated in each drawing may be implemented and performed on a computer, the processor, the microprocessor, the controller, or the chip.

In addition, the decoder and the encoder to which an embodiment of the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an (Over the top) OTT video device, an Internet streaming service providing devices, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which an embodiment of the present disclosure is applied may be produced in the form of a program executed by the computer, and may be stored in a computer-readable recording medium. Multimedia data having a data structure according to an embodiment of the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute an embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential characteristics of the embodiments of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

The aforementioned preferred embodiments of the present disclosure have been disclosed for illustrative purposes, and those skilled in the art may improve, change, substitute, or add various other embodiments without departing from the technical spirit and scope of the present disclosure disclosed in the attached claims.

The invention claimed is:

1. A method for decoding a video signal by an apparatus, the method comprising:
obtaining an intra prediction mode of a current block from the video signal;
determining a modified intra prediction mode from the intra prediction mode for the current block based on a width and a height of the current block and the intra prediction mode;
determining a non-separable transform set index based on the modified intra prediction mode;
deriving a non-separable transform matrix based on the non-separable transform set index and a non-separable transform index; and
applying the non-separable transform matrix to the current block,
wherein when (i) the width is larger than the height, (ii) the intra prediction mode is equal to or larger than 2, and (iii) the intra prediction mode is smaller than a first reference value, the modified intra prediction mode is determined by adding 65 to the intra prediction mode,
wherein when (i) the height is larger than the width, (ii) the intra prediction mode is larger than a second reference value, and (iii) the intra prediction mode is equal to or smaller than 66, the modified intra prediction mode is determined by subtracting 67 from the intra prediction mode, and
wherein when the modified intra prediction mode is smaller than 0, the non-separable transform set index is determined as 1, when the modified intra prediction mode is equal to or larger than 0 and equal to or smaller than 1, the non-separable transform set index is determined as 0, when the modified intra prediction mode is equal to or larger than 2 and equal to or smaller than 12, the non-separable transform set index is determined as 1, when the modified intra prediction mode is equal to or larger than 13 and equal to or smaller than 23, the non-separable transform set index is determined as 2, when the modified intra prediction mode is equal to or larger than 24 and equal to or smaller than 44, the non-separable transform set index is determined as 3, when the modified intra prediction mode is equal to or larger than 45 and equal to or smaller than 55, the non-separable transform set index is determined as 2, and when the modified intra prediction mode is equal to or larger than 56 and equal to or smaller than 80, the non-separable transform set index is determined as 1.

2. The method of claim 1, wherein the first reference value and the second reference value are determined based on an absolute value of a log for a value obtained by dividing the width by the height.

3. The method of claim 1, wherein when the obtained intra prediction mode corresponds to a non-directional prediction mode or the width is equal to the height, the intra prediction mode is not modified.

4. The method of claim 1, wherein the applying of the non-separable transform matrix includes applying the non-separable transform matrix to a top-left region of the current block, and wherein the top-left region is determined based on the width and the height.

5. The method of claim 1, wherein when both the width and the height are equal to or larger than 8, the non-separable transform matrix is applied to a top-left 8×8 region of the current block, and
wherein when both the width and the height are equal to or larger than 4 and the width or the height is smaller than 8, the non-separable transform matrix is applied to a top-left 4×4 region of the current block.

6. The method of claim 1, wherein when both the width and the height are equal to or larger than 8, the secondary transform matrix is applied to a top-left 8×8 region of the primary-transformed block, and
wherein when both the width and the height are equal to or larger than 4 and the width or the height is smaller than 8, the secondary transform matrix is applied to a top-left 4×4 region of the primary-transformed block.

7. A method of encoding a video signal by an apparatus, comprising:
determining an intra prediction mode of a current block;
determining a modified intra prediction mode from the intra prediction mode of the current block based on a width and a height of the current block and the intra prediction mode;
determining a secondary transform set index based on the modified intra prediction mode;
performing primary transform on a residual block of the current block to generate a primary-transformed block of the current block;
selecting a secondary transform matrix in a secondary transform set specified by the secondary transform set index;
performing secondary transform on the primary-transformed block based on the secondary transform matrix; and
generating a secondary transform index related to the secondary transform matrix,
wherein when (i) the width is larger than the height, (ii) the intra prediction mode is equal to or larger than 2, and (iii) the intra prediction mode is smaller than a first reference value, the modified intra prediction mode is determined by adding 65 to the intra prediction mode,
wherein when (i) the height is larger than the width, (ii) the intra prediction mode is larger than a second reference value, and (iii) the intra prediction mode is equal to or smaller than 66, the modified intra prediction mode is determined by subtracting 67 from the intra prediction mode, and
wherein when the modified intra prediction mode is smaller than 0, the secondary transform set index is determined as 1, when the modified intra prediction mode is equal to or larger than 0 and equal to or smaller than 1, the secondary transform set index is determined as 0, when the modified intra prediction mode is equal to or larger than 2 and equal to or smaller than 12, the secondary transform set index is determined as 1, when the modified intra prediction mode is equal to or larger than 13 and equal to or smaller than 23, the secondary transform set index is determined as 2, when the modified intra prediction mode is equal to or larger than 24 and equal to or smaller than 44, the secondary transform set index is determined as 3, when the modified intra prediction mode is equal to or larger than 45 and equal to or smaller than 55, the secondary transform set index is determined as 2, and when the modified intra prediction mode is equal to or larger than 56 and equal to or smaller than 80, the secondary transform set index is determined as 1.

8. The method of claim 7, wherein the first reference value and the second reference value are determined based on an absolute value of a log for a value obtained by dividing the width by the height.

9. The method of claim 7, wherein when the determined intra prediction mode corresponds to a non-directional prediction mode or the width is equal to the height, the intra prediction mode is not modified.

10. The method of claim 7, wherein the performing of the secondary transform includes applying the secondary transform matrix to a top-left region of the primary-transformed block, and
wherein the top-left region is determined based on the width and the height.

11. A non-transitory computer-readable medium for storing picture information generated by performing steps of:
determining an intra prediction mode of a current block;
determining a modified intra prediction mode from the intra prediction mode of the current block based on a width and a height of the current block and the intra prediction mode;
determining a secondary transform set index based on the modified intra prediction mode;
performing primary transform on a residual block of the current block to generate a primary-transformed block of the current block;
selecting a secondary transform matrix in a secondary transform set specified by the secondary transform set index;
performing secondary transform on the primary-transformed block based on the secondary transform matrix; and
generating a secondary transform index related to the secondary transform matrix,
wherein when (i) the width is larger than the height, (ii) the intra prediction mode is equal to or larger than 2, and (iii) the intra prediction mode is smaller than a first reference value, the modified intra prediction mode is determined by adding 65 to the intra prediction mode,
wherein when (i) the height is larger than the width, (ii) the intra prediction mode is larger than a second reference value, and (iii) the intra prediction mode is equal to or smaller than 66, the modified intra prediction mode is determined by subtracting 67 from the intra prediction mode, and
wherein when the modified intra prediction mode is smaller than 0, the secondary transform set index is determined as 1, when the modified intra prediction mode is equal to or larger than 0 and equal to or smaller than 1, the secondary transform set index is determined as 0, when the modified intra prediction mode is equal to or larger than 2 and equal to or smaller than 12, the secondary transform set index is determined as 1, when the modified intra prediction mode is equal to or larger than 13 and equal to or smaller than 23, the secondary transform set index is determined as 2, when the modified intra prediction mode is equal to or larger than 24 and equal to or smaller than 44, the secondary transform set index is determined as 3, when the modified intra prediction mode is equal to or larger than 45 and equal to or smaller than 55, the secondary transform set index is determined as 2, and when the modified intra prediction mode is equal to or larger than 56 and equal to or smaller than 80, the secondary transform set index is determined as 1.

\* \* \* \* \*